US010768447B2

(12) United States Patent
Blum

(10) Patent No.: US 10,768,447 B2
(45) Date of Patent: Sep. 8, 2020

(54) THERMALLY INFLUENCED CHANGEABLE TINT DEVICE

(71) Applicant: Essilor International, Charenton-le-Pont (FR)

(72) Inventor: Ronald D. Blum, Roanoke, VA (US)

(73) Assignee: Essilor International, Charenton-le-Pont (FR)

( * ) Notice: Subject to any disclaimer, the term of this patent is extended or adjusted under 35 U.S.C. 154(b) by 0 days.

(21) Appl. No.: 14/440,158

(22) PCT Filed: Nov. 1, 2013

(86) PCT No.: PCT/US2013/068043
§ 371 (c)(1),
(2) Date: May 1, 2015

(87) PCT Pub. No.: WO2014/071179
PCT Pub. Date: May 8, 2014

(65) Prior Publication Data
US 2015/0286073 A1 Oct. 8, 2015

Related U.S. Application Data

(60) Provisional application No. 61/846,029, filed on Jul. 14, 2013, provisional application No. 61/825,879, (Continued)

(51) Int. Cl.
*G02C 7/10* (2006.01)
*G02C 11/08* (2006.01)
*G02F 1/01* (2006.01)
(52) U.S. Cl.
CPC ............. *G02C 7/102* (2013.01); *G02C 7/101* (2013.01); *G02C 11/08* (2013.01); *G02F 1/0126* (2013.01)

(58) Field of Classification Search
CPC ........ G02C 7/101; G02C 7/102; G02C 11/08; G02F 1/0126
(Continued)

(56) References Cited

U.S. PATENT DOCUMENTS 3,152,215 A * 10/1964 Barstow .................. G02B 5/23
2/431
3,723,349 A 3/1973 Heseltine et al.
(Continued)

FOREIGN PATENT DOCUMENTS

CN 1956686 5/2007
CN 101666918 * 3/2010
(Continued)

OTHER PUBLICATIONS

Evans et al. "The generic enhancement of photochromic dye switching speeds in a rigid polymer matrix" Nature Materials, vol. 4, pp. 249-253, Mar. 2005.*
(Continued)

Primary Examiner — George G King
(74) Attorney, Agent, or Firm — Oblon, McClelland, Maier & Neustadt, L.L.P.

(57) ABSTRACT

A device is provided. The device includes a base ophthalmic optic, a changeable tint element disposed over the base ophthalmic element, and a transparent heating element adapted to heat the changeable tint element. The transparent heating element is preferably adapted to heat the entire area of the changeable tint element.

8 Claims, 46 Drawing Sheets

Related U.S. Application Data filed on May 21, 2013, provisional application No. 61/721,110, filed on Nov. 1, 2012, provisional application No. 61/721,114, filed on Nov. 1, 2012.

(58) Field of Classification Search
USPC .................................... 351/159.66, 41–178
See application file for complete search history.

(56) References Cited

U.S. PATENT DOCUMENTS

| | | | |
|---|---|---|---|
| 5,212,583 | A | 5/1993 | Vali et al. |
| 5,459,533 | A | 10/1995 | McCooeye et al. |
| 5,525,430 | A * | 6/1996 | Chahroudi ........ B32B 17/10486 |
| | | | 359/241 |
| 6,084,702 | A | 7/2000 | Byker et al. |
| 6,433,913 | B1 * | 8/2002 | Bauer ................... G02C 7/101 |
| | | | 156/107 |
| 6,580,413 | B1 * | 6/2003 | Walsh ..................... G02F 1/132 |
| | | | 345/105 |
| 6,795,226 | B2 | 9/2004 | Agrawal et al. |
| 7,126,741 | B2 | 10/2006 | Wagner et al. |
| 2003/0210377 | A1 * | 11/2003 | Blum ................... G02B 27/017 |
| | | | 351/159.4 |
| 2007/0291345 | A1 | 12/2007 | Kumar et al. |
| 2008/0061222 | A1 * | 3/2008 | Powers .................. B82Y 15/00 |
| | | | 250/226 |
| 2010/0232003 | A1 | 9/2010 | Baldy et al. |
| 2010/0283957 | A1 | 11/2010 | Matera et al. |
| 2012/0235900 | A1 * | 9/2012 | Border ..................... G02B 5/23 |
| | | | 345/156 |
| 2013/0271811 | A1 * | 10/2013 | Lam ........................ E06B 9/24 |
| | | | 359/266 |
| 2014/0021195 | A1 * | 1/2014 | Kim ......................... H05B 3/84 |
| | | | 219/553 |

FOREIGN PATENT DOCUMENTS

| | | | | |
|---|---|---|---|---|
| CN | 101765494 | | 6/2010 | |
| JP | S62-10629 | | 1/1987 | |
| JP | H04-68339 | | 3/1992 | |
| WO | WO 94/07175 | | 3/1994 | |
| WO | WO9511127 | * | 4/1995 | |
| WO | WO-2011099831 A2 | * | 8/2011 | ............... H05B 3/84 |

OTHER PUBLICATIONS

Wikipedia page "Photodiode" https://en.wikipedia.org/wiki/Photodiode (Year: 2010).*
International Search Report and Written Opinion dated May 14, 2014 in International Application No. PCT/US13/68043.

* cited by examiner

| Material | Thickness | Volume Resistivity (Ohm-cm) | Thermal capacity (kJ/kgK) |
|---|---|---|---|
| ITO | 20-30 nm | $<10^{-3}$ | 0.2 |
| SiOx | 150-180 nm | $10^{10}$-$10^{12}$ | 0.5 |
| Hard coat | 2-3 microns | $10^{13}$-$10^{15}$ | 1.0-1.2 |
| Photofusion | 50 microns | $\sim 10^{14}$ | 1.0-1.5 |
| Transitions Old | 120 microns | $\sim 10^{14}$ | 1.0-1.5 |
| Transitions (new) | 250 microns | $\sim 10^{14}$ | 1.0-1.5 |

FIG. 22

| Photochromic Product | Layer Thickness | Resistance | Energy needed to switch 20X daily | Add Energy loss due to leakage (in 24 hrs) | Total Energy needed to switch 20X (daily) | Days between recharging |
|---|---|---|---|---|---|---|
| Zeiss | 50 microns | $5 \times 10^{10}$ ohms | 1.11 mWhr | 1mWhr | 2.11mWhr | 5 days |
| Transition new | 250 microns | $25 \times 10^{10}$ ohms | 5.56 mWhr | 1mWhr | 6.56mWhr | 2 days |
| Transition old | 120 microns | $12 \times 10^{10}$ ohms | 2.78 mWhr | 1mWhr | 3.78mWhrs | 3 days |

FIG. 23

| Photochromic Product | Layer Thickness | Resistance | Energy needed to switch 20X daily | Add Energy loss due to leakage (in 24 hrs) | Total Energy needed to switch 20X daily | Days between recharging |
|---|---|---|---|---|---|---|
| Transition new | 250 microns | $25 \times 10^{10}$ ohms | 11.11 mWhrs | 1mWhr | 12.11 mWhr | 1 day |
| Transition old | 120 microns | $12 \times 10^{10}$ ohms | 5.25 mWhrs | 1mWhr | 6.25 mWhrs | 2 days |
| Zeiss | 50 microns | $5 \times 10^{10}$ ohms | 2.22 mWhrs | 1mWhr | 3.22 mWhr | 3 days |

FIG. 24

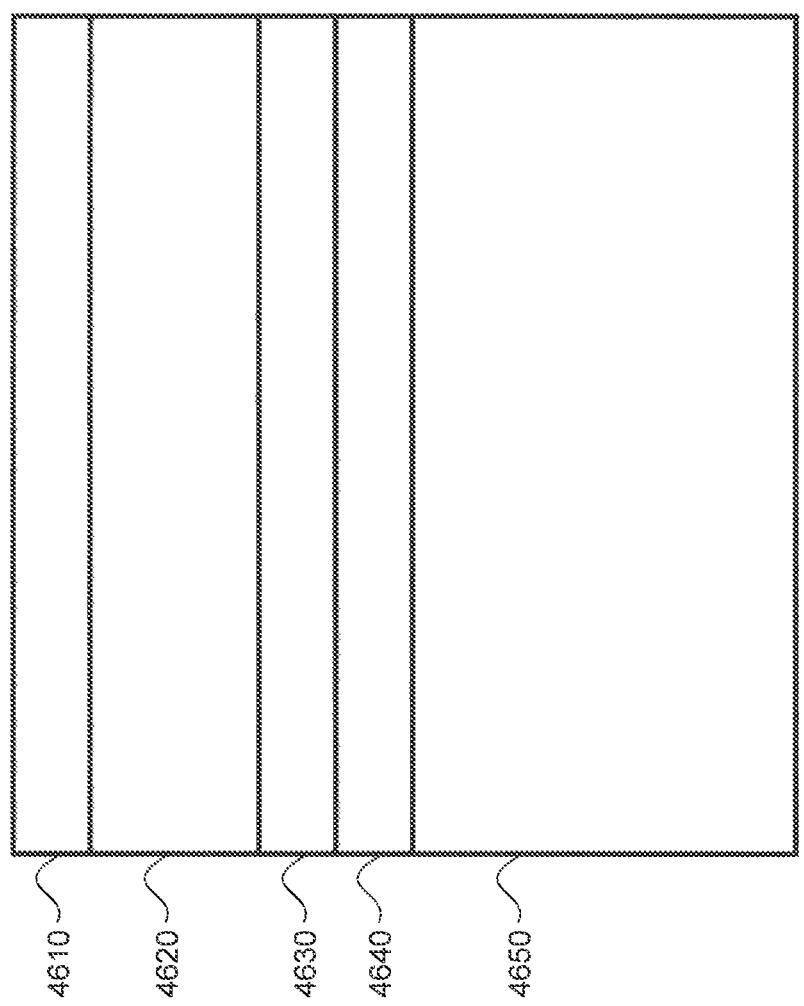

THERMALLY INFLUENCED CHANGEABLE TINT DEVICE

BACKGROUND

Present day state of the art photochromic eyeglasses have still have numerous serious limitations which have not been properly satisfied even after 40 years or more of photochromic commercialization. The problem is that, when in a form that is clear enough indoors, they never get dark enough outdoors and the switching time of darkening is too slow outdoors and too slow when switching to the clear state indoors. Further, when outdoors and in a high temperature environment the darkening effect becomes reduced. It is well known that the higher the ambient temperature environment the lower the photochromic absorption and or blocking effect.

In addition, photochromics never switch to a dark enough state behind the windshield of a car or other vehicle whereby the windshield filters out ultra-violet wavelengths of light. It is known that photochromic eyeglasses absorb UV light and also in certain cases that of long wavelength blue light.

There has always been a limiting performance balance with photochromatic optics and/or lenses. The balance is the faster the darkening switch outdoors the more sensitive the photochromic optic and/or lens is to ambient heat or high temperature outdoors (which is exacerbated due to the sun's radiation) thus limiting the degree of darkening of the photochromic optic and/or lens and the speed in which it can darken. This is due to once the lens is heated by high outdoor temperatures to a certain level of darkening the lens material softens and the photochromic agent or agents reach a maximum darkening point where they begin to bleach. Embodiments disclosed herein solve this long performance limiting issue of a photochromic optic or lens.

While consumers purchase photochromic eyeglasses the percentage of penetration of photochromics in the US eyeglass market has remained approximately flat and that of approximately 15% to 20% for the last 30 years or more. This is due to both the increased cost of these photochromic eyeglasses and also the serious limitations which have been discussed above. In addition in Europe there has been consumer resistance to photochromic lenses due to the clearing time of the tint when one comes inside from outside.

In addition, other electronic changeable tint devices have also lagged in commercial success and acceptance. Changeable tint liquid crystal devices have met with limited commercial success due to the amount of electrical power needed to drive the devices over a period of time and also the lack of ability to shape post assembly these devices. This is due to most, if not all, changeable tint liquid crystal devices not being electrically bi-stable and in addition once custom shaped after assembly suffering from the liquid crystal leaking out and compromising performance. Finally, changeable tint electro-chromic devices have proven elusive in terms of acceptable performance contrast/dynamic range, ultra-fast switching time and power usage. Thus there is a need for a means to enhance changeable tint devices such to provide for lower power requirements needed to drive the devices, improvement of speed of switching from one color state (transmission of light #1) to another color state (transmission of light #2) and back again (transmission of light #1) and so forth.

BRIEF SUMMARY

In one embodiment, a device is provided. The device includes a base ophthalmic optic, a changeable tint element disposed over the base ophthalmic element, and a transparent heating element adapted to heat the changeable tint element. The transparent heating element is preferably adapted to heat the entire area of the changeable tint element. The term ophthalmic optic includes a spectacle lens, contact lens, intra-ocular lens, corneal implant, corneal onlay, corneal inlay, intra-ocular telescope. A device can be that of any device housing a lens, element or optic that transmits light, and/or the lens or optic itself. Embodiments having a non-ophthalmic optic are also provided.

In one embodiment, the device is eyewear. The eyewear includes a heat management system. The heat management system includes: the transparent heating element; a sensor; a controller electrically connected to the sensor, wherein the controller is adapted to detect input from the sensor, and to control the transparent heating element based upon input from the sensor; and an energy source electrically connected to the transparent heating element.

In one embodiment, the changeable tint element is photochromic.

In one embodiment, the sensor is a photo-detector.

In one embodiment, the sensor is a photo-sensor.

In one embodiment, the sensor is a thermo-sensor.

In one embodiment, the device further includes a timer.

In one embodiment, the controller turns on and off the heating element. A timer may communicate with the controller to turn on the heating element for a period of time.

In one embodiment, the changeable tint element comprises a polymer layer. The heater causes the temperature of the polymer layer to be elevated above the glass transition temperature of the polymer for a period of time and then allows the temperature of the polymer layer to decrease below glass transition temperature of the polymer layer.

In one embodiment, the sensor is a thermo-sensor. The thermo-sensor communicates with the controller to turn on or off the heating element.

In one embodiment, the sensor is a thermo-sensor. The thermo-sensor communicates with the controller to turn up or down the heat of the heating element.

In one embodiment, the sensor is a thermo-sensor, and the device does not include a photo-detector.

In one embodiment, the changeable tint element comprises a layer of material that is a photochromic agent.

In one embodiment, the heating element is capable of heating the polymer layer above its glass transition temperature.

In one embodiment, the optic is comprised of glass.

In one embodiment, the optic is comprised of plastic.

In one embodiment, the optic is comprised of a composite material.

In one embodiment, the optic is a window.

In one embodiment, the optic is that of a windshield.

In one embodiment, the optic is an ophthalmic lens.

In one embodiment, the optic is an eyeglass lens.

In one embodiment, the optic is an electronic lens.

In one embodiment, the optic is an intra-ocular lens.

In one embodiment, the optic is a contact lens.

In one embodiment, the heat management system includes: the sensor, the timer and the transparent heating element.

In one embodiment, the polymer layer comprises a material having a glass transition temperature between 30 C and 140 C.

In one embodiment, the optic comprises a material having a glass transition temperature between 30 C and 140 C.

In one embodiment, the heating element is adapted to provide a temperature rise of 1 C to 25 C to the changeable tint element.

In one embodiment, the heating element is adapted to provide a temperature rise of 1 C to 25 C to the photochromic agent.

In one embodiment, the timer turns off the heater after a period within the range of 1 millisecond to 5 minutes once the thermo-sensor senses a temperature rise within the range of 1 C to 25 C of the optic or layer comprising the photochromic agent.

In one embodiment, the controller turns off the heating element once the heating element provides a temperature rise of within the range of 1 C to 25 C to the changeable tint element.

In one embodiment, wherein the sensor is a UV sensor, and the controller turns on the heating element once the UV sensor senses a change in UV light and or long wave length blue light transmission of 5% to 30%.

In one embodiment, the UV sensor is located on a side of the changeable tint element closest to the UV light source. This means the sensor is closer to the UV source than the photochromic such that the photochromic does not block the UV sensor. It does not mean the sensor is disposed directly on the photochromic.

In one embodiment, the heat management system comprises a switch. By way of non-limiting example, the switch may be one of: a manual switch, touch switch, capacitor switch, and photo-switch.

In one embodiment, the optic comprises a first photochromic layer and a second photochromatic layer, wherein the first photochromatic layer is closer to the eye of a user than the second photochromatic layer. The second photochromatic layer may be more photo-reactive than the first photochromatic layer. Or the first photochromatic layer may be more photo-reactive than the second photochromatic layer.

In one embodiment, the sensor is located closer to the eye of a user than the changeable tint element.

In one embodiment, the sensor is located farther from the eye of a user than the changeable tint element.

In one embodiment, the sensor is located between first and second photochromatic layers.

In one embodiment, the transparent heating element is located between first and second photochromatic layers.

In one embodiment, the optic includes a heating element on the front surface of the optic and is located close to the first photochromic layer. By "close to," it is meant that the heating element is preferably adjacent to the first photochromic layer, although there may be intervening layers so long as those layers do not significantly reduce heat transfer from the heating element to the first photochromic layer.

In one embodiment, the photosensor communicates directly or indirectly with the heating element in order to turn on or off the heating element in response to light detected by the photosensor.

In one embodiment, the controller causes the heating element to cycle on and off for at least two cycles over a period of time.

In one embodiment, the timer causes the heating element to cycle on and off for at least two cycles over a period of time.

In one embodiment, the device further includes a SiO2 layer covering the transparent heating element. The SiO2 layer preferably has a thickness between 2 microns and 20 microns.

In one embodiment, the energy source is one or more of: a rechargeable battery, non-rechargeable battery, solar cell, fuel cell, and kinetic energy source.

In one embodiment, the photochromatic changeable tint element includes a photochromic agent that contributes to a grey tint, and wherein the device achieves a darkening transmission of 20% outdoors at an ambient temperature of 100 degrees F. and a clearing transmission of 85% within 2 minutes when indoors at an indoor ambient temperature of 70 degrees F.

In one embodiment, the photochromatic changeable tint element includes a photochromic agent that contributes to a grey tint, and wherein the device achieves a darkening transmission of 30% outdoors at an ambient temperature of 95 degrees F. and a clearing transmission of 85% within 2 minutes when indoors at an indoor ambient temperature of 70 degrees F.

In one embodiment, the device further includes a self-contained electronics module. The module may be is external and affixed to an eyeglass frame. The module may be embedded in an eyeglass frame. The module is preferably moisture resistant.

In one embodiment, the device comprises a thermally switchable polarizing element or layer.

In one embodiment, the heat management system comprises an electronic cooling element.

In one embodiment, the device includes a polymer layer having a thickness of 1 micron to 1.5 mm. The polymer layer preferably includes the changeable tint element.

In one embodiment, a method of applying a heat management system is provided. The method includes:
a) providing a photochromic lens comprising the required optical power of a wearer;
b) edging the photochromic lens into the shape of an eyeglass frame;
c) applying to the lens a heat management system comprising a heating element;
d) applying to the lens a scratch resistant coating;
e) electrically connecting the positive pole and negative pole of the heating element to an energy source.

In the broadest sense, these steps may be performed in a variety of different orders, and additional steps may be added. Preferred orders and additional steps are described herein.

In one embodiment, a photochromic article is provided. The photochromic article includes a heating element, a polymer matrix, and a photochromic agent that contributes to a changeable tint. The photochromic article achieves a darkening transmission of 20% outdoors at an ambient temperature of 100 degrees F. and a clearing transmission of 85% within 2 minutes when indoors at an indoor ambient temperature of 70 degrees F.

In one embodiment, a photochromic article is provided. The photochromatic article includes a heating element, a polymer matrix, and a photochromic agent that contributes to a grey tint, whereby the photochromic article achieves a darkening transmission of 30% outdoors at an ambient temperature of 95 degrees F. and a clearing transmission of 85% within 2 minutes when indoors at an indoor ambient temperature of 70 degrees F.

In one embodiment, a system for enhancing the performance of an optic is provided. The system includes an optic, a photochromic agent, a heating element, timer, and a sensor.

In one embodiment, photochromic lens is provided. The photochromic lens includes a matrix having a photochromic agent, whereby said matrix has a TG excess of 50 C, whereby said photochromic lens after being darkened for 15 minutes outdoors in sunlight has a clearing time of 2 minutes or less, whereby the clearing time provides for a 80% transmission of light.

In one embodiment, an ophthalmic lens is provided. The lens includes a cooling element, photochromic layer, and a heating element, whereby said photochromic layer is located between the cooling element and a heating element.

In one embodiment, an ophthalmic lens is provided. The lens includes a thermally switchable polarized layer, a heating element, and a photochromic layer, whereby said heating element is located between the photochromic layer and switchable the polarized layer.

In one embodiment, a self-contained electronics module is provided. One end of said module is affixed externally to an eyeglass frame, whereby a flexible electronic cable electrically connects electronics housed within said module to that of a heating element located within a lens housed in said eyeglass frame.

In one embodiment, a self-contained electronics module is provided. One end of said module is affixed externally to an eyeglass frame, whereby a flexible electronic cable electrically connects electronics housed within said module to that of a cooling element located within a lens housed in said eyeglass frame.

In one embodiment, an device is provided. The device includes an optic having a first surface and a second surface, and including a photochromic agent. A first electrode is disposed on the first surface. A second electrode is disposed on the second surface. A voltage source is connected to the first electrode and the second electrode, such that an electrical potential may be applied to the photochromatic agent.

In one embodiment, the changeable tint element is solid state.

In one embodiment, the changeable tint element includes a liquid.

In one embodiment, the changeable tint element is a polymer dispersed dichroic liquid crystal.

In one embodiment, the changeable tint element is electrochromic.

BRIEF DESCRIPTION OF THE DRAWINGS/FIGURES

Figure 20:
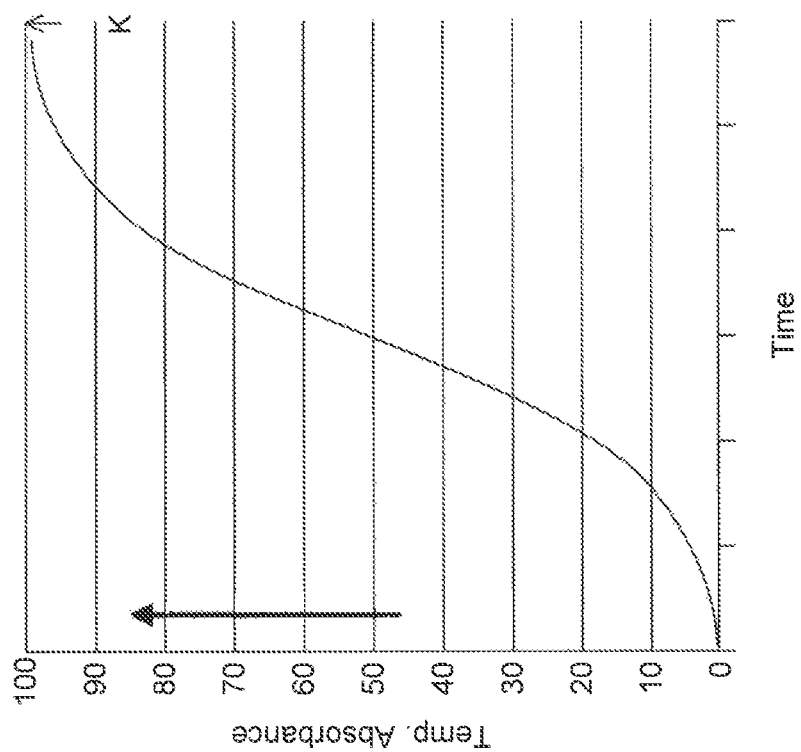

FIG. 20 further illustrates the mechanism by which many photochromatic optics darken.

Figure 21:
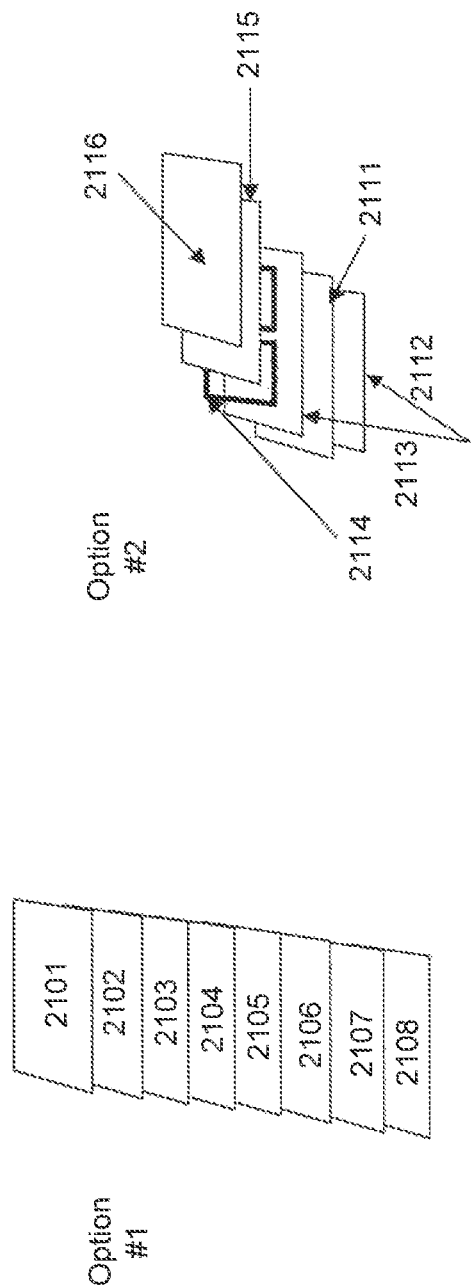

FIG. 21 shows two options for providing a lens having a heating element and a photochromic.

FIG. 22 is a table providing additional preferred layer specifications for the structures of FIG. 21.

FIG. 23 is a table providing energy requirements and days between charging for the structures of FIG. 21, option 1.

FIG. 24 is a table providing energy requirements and days between charging for the structures of FIG. 21, option 2.

Figure 25:
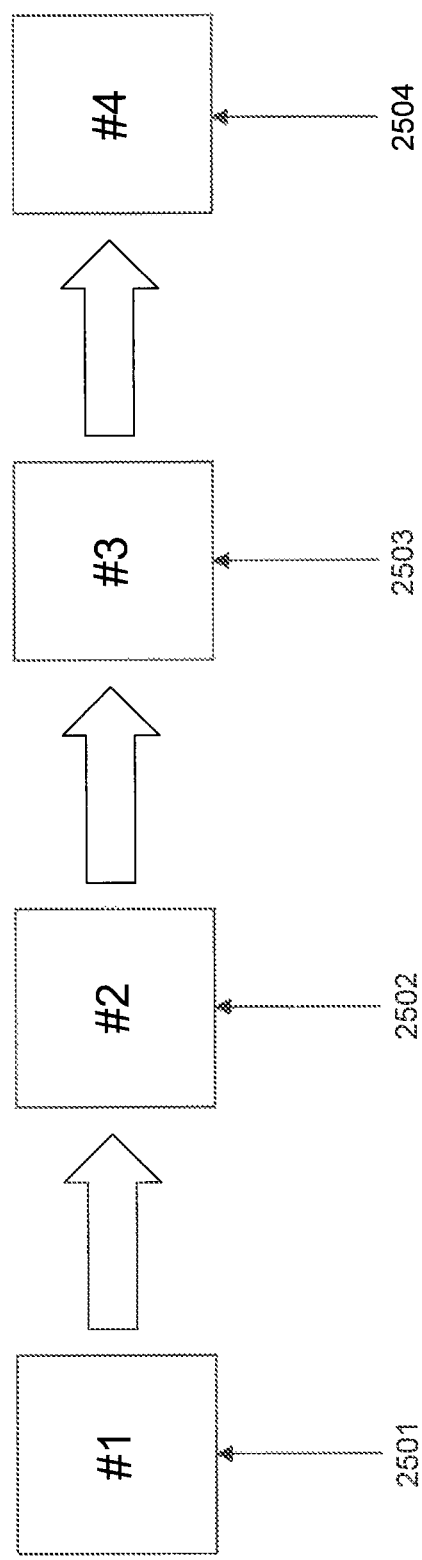

FIG. 25 shows a first process flow.

Figure 26:
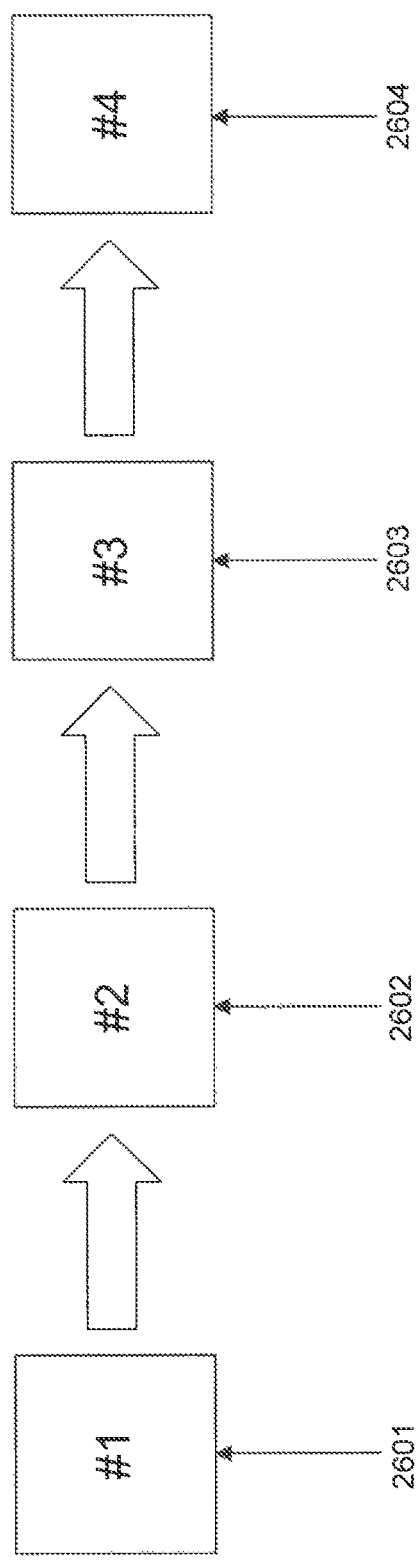

FIG. 26 shows a second process flow.

Figure 27:
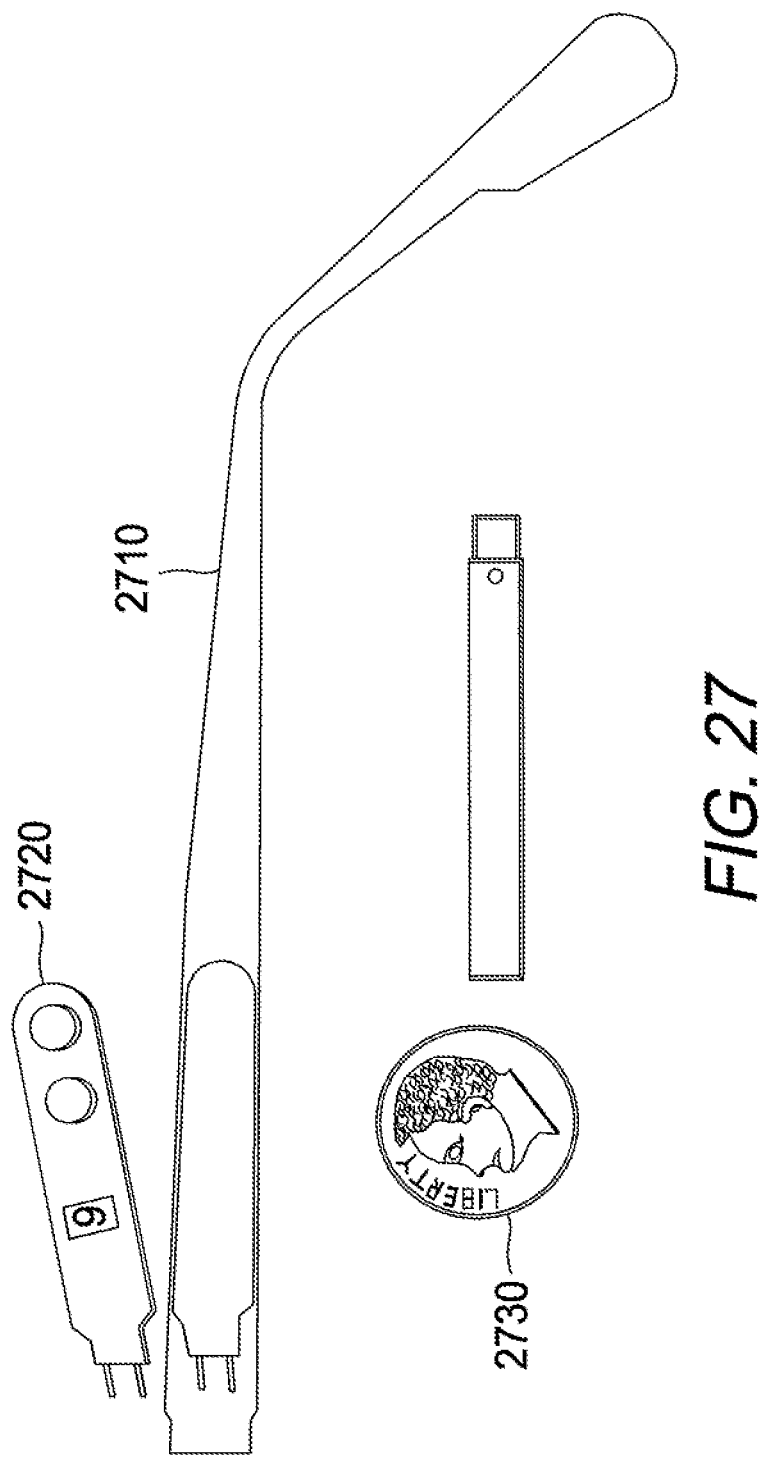

FIG. 27 shows a photograph of a temple 2710 having an embedded electronics module 2720.

Figure 28:
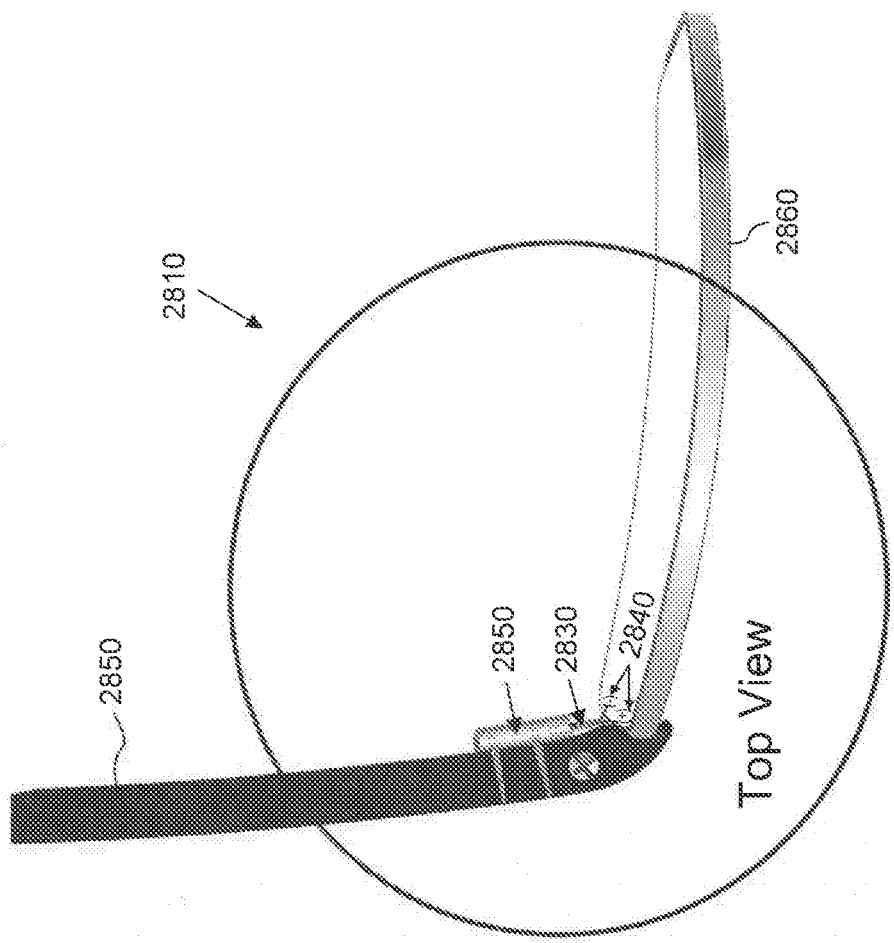

FIG. 28 shows a top view of a portion of eyeglasses having a clip on electronics module.

Figure 29:
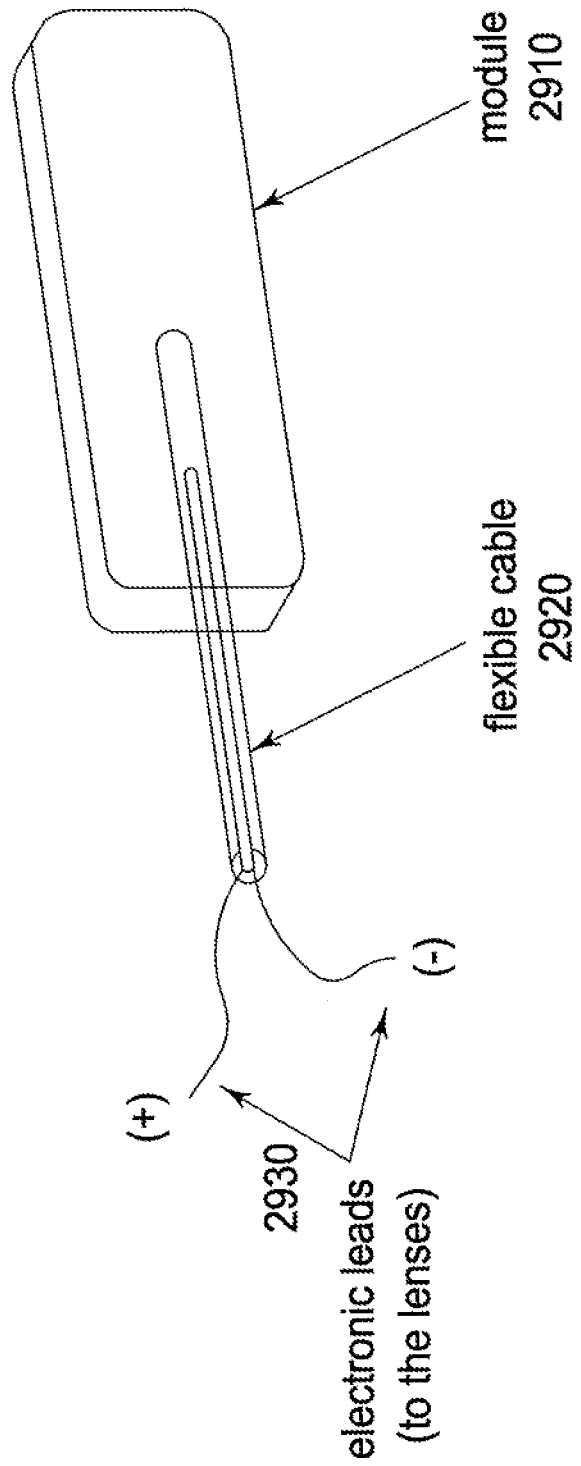

FIG. 29 shows a module adapted for use with regular eyeglasses having non-electronic frames, to provide electronics capability to eyeglasses.

Figure 30:
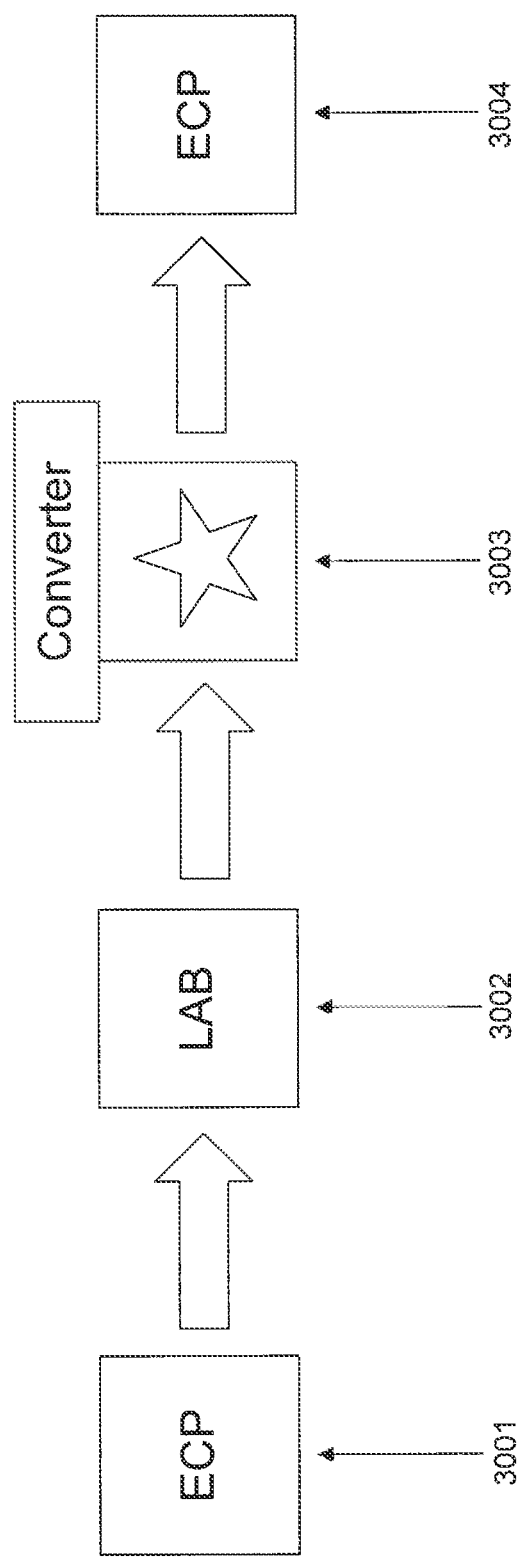

FIG. 30 illustrates one approach to provide photochromatic lenses having a heat management system to a consumer.

Figure 31:
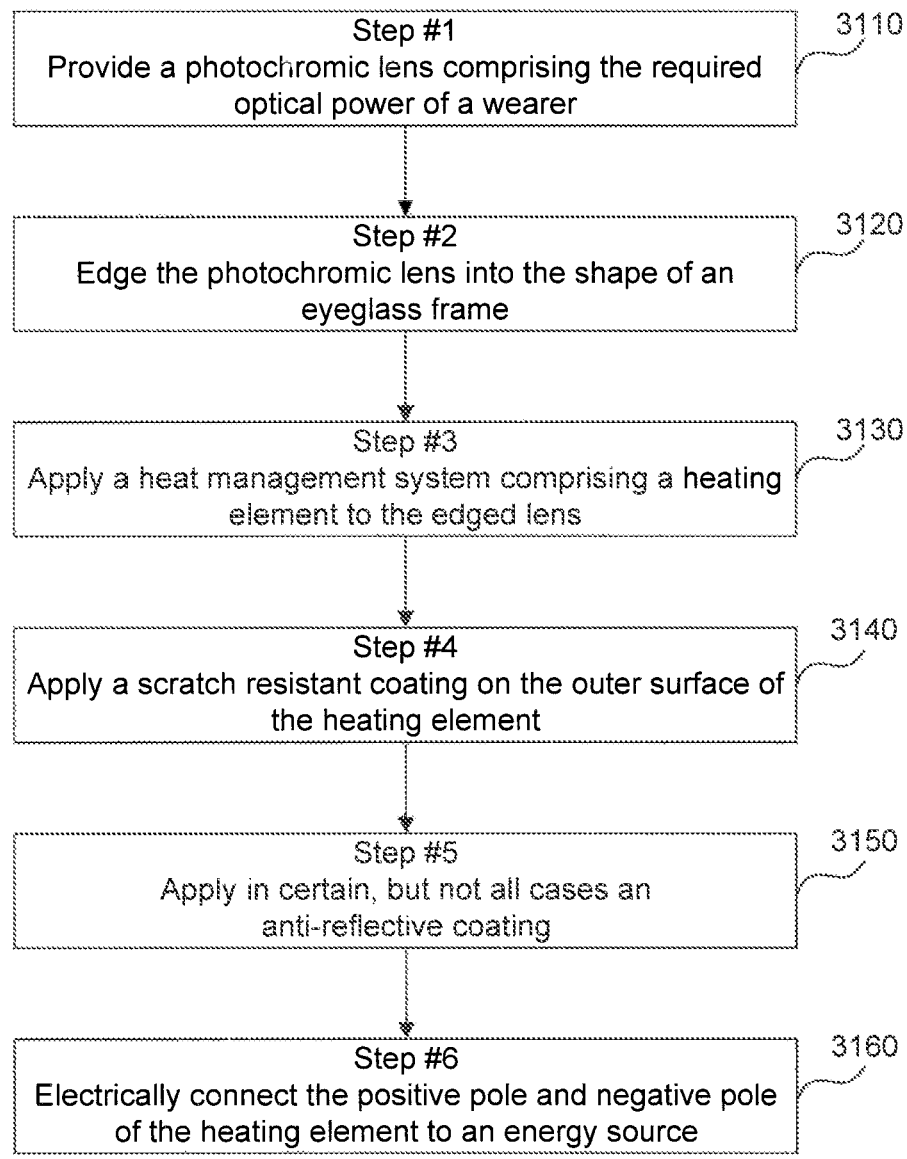

FIG. 31 is a flowchart of the first method of embodiment 12.

Figure 32:
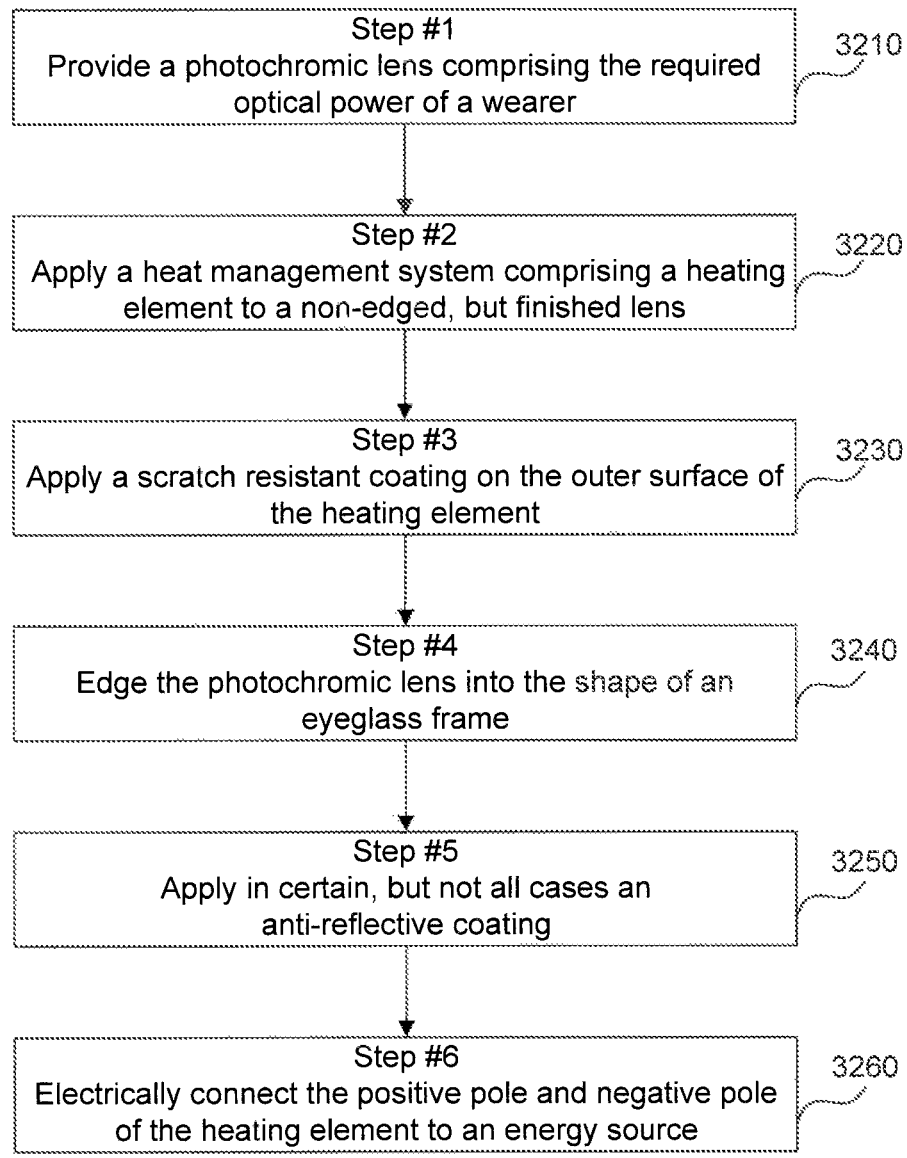

FIG. 32 is a flowchart of the second method of embodiment 12.

Figure 33:
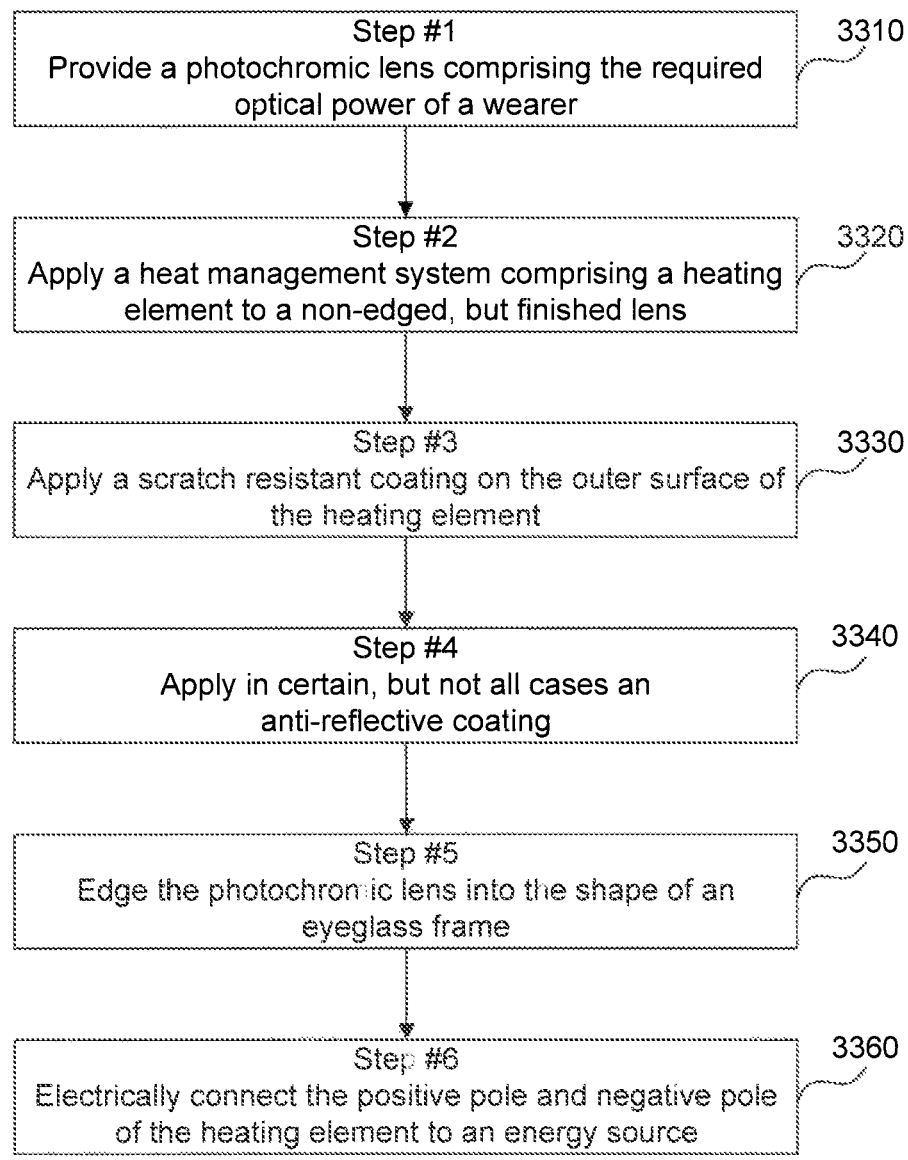

FIG. 33 is a flowchart of the third method of embodiment 12.

Figure 34:
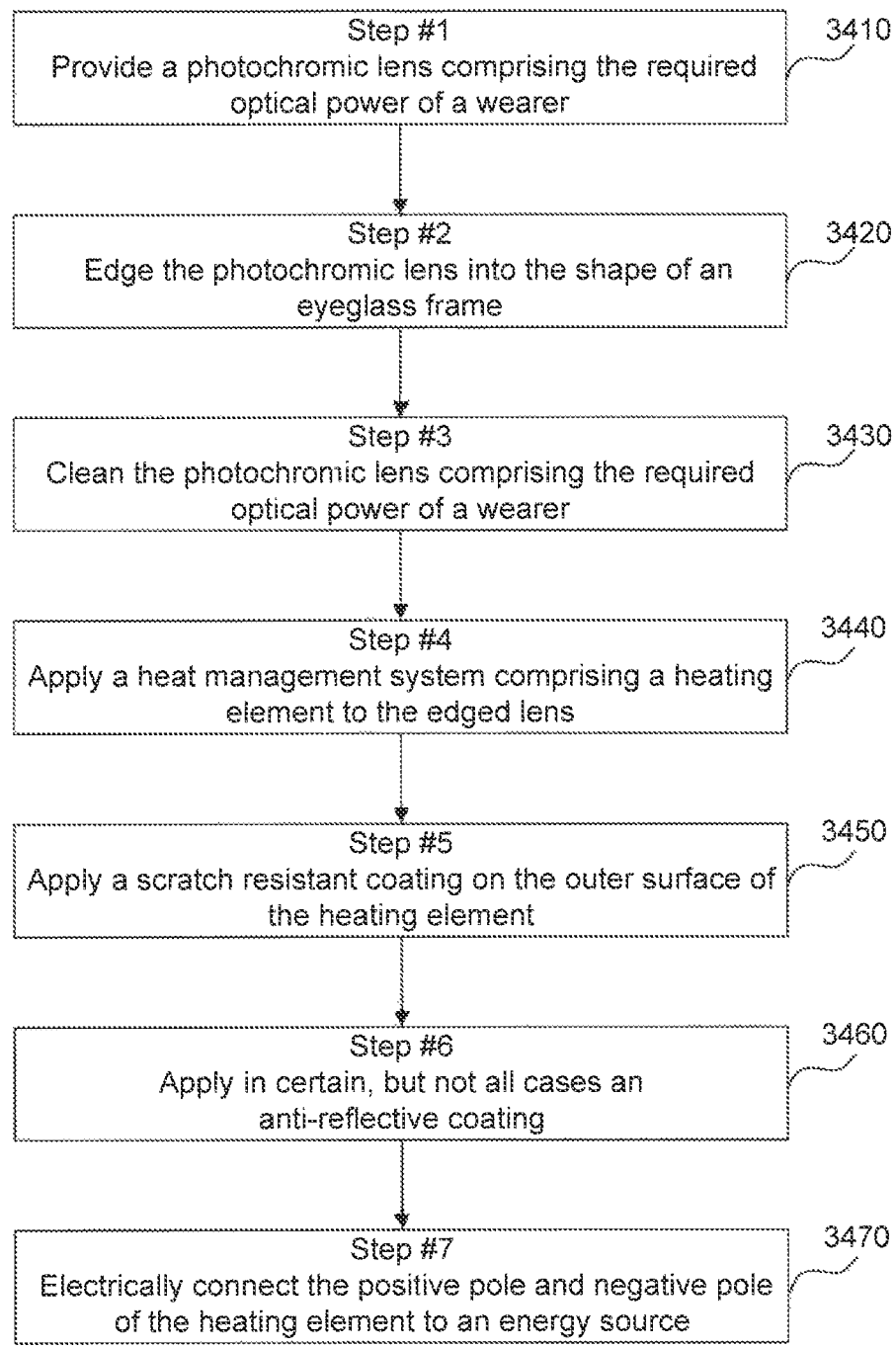

FIG. 34 is a flowchart of the fourth method of embodiment 12.

Figure 35:
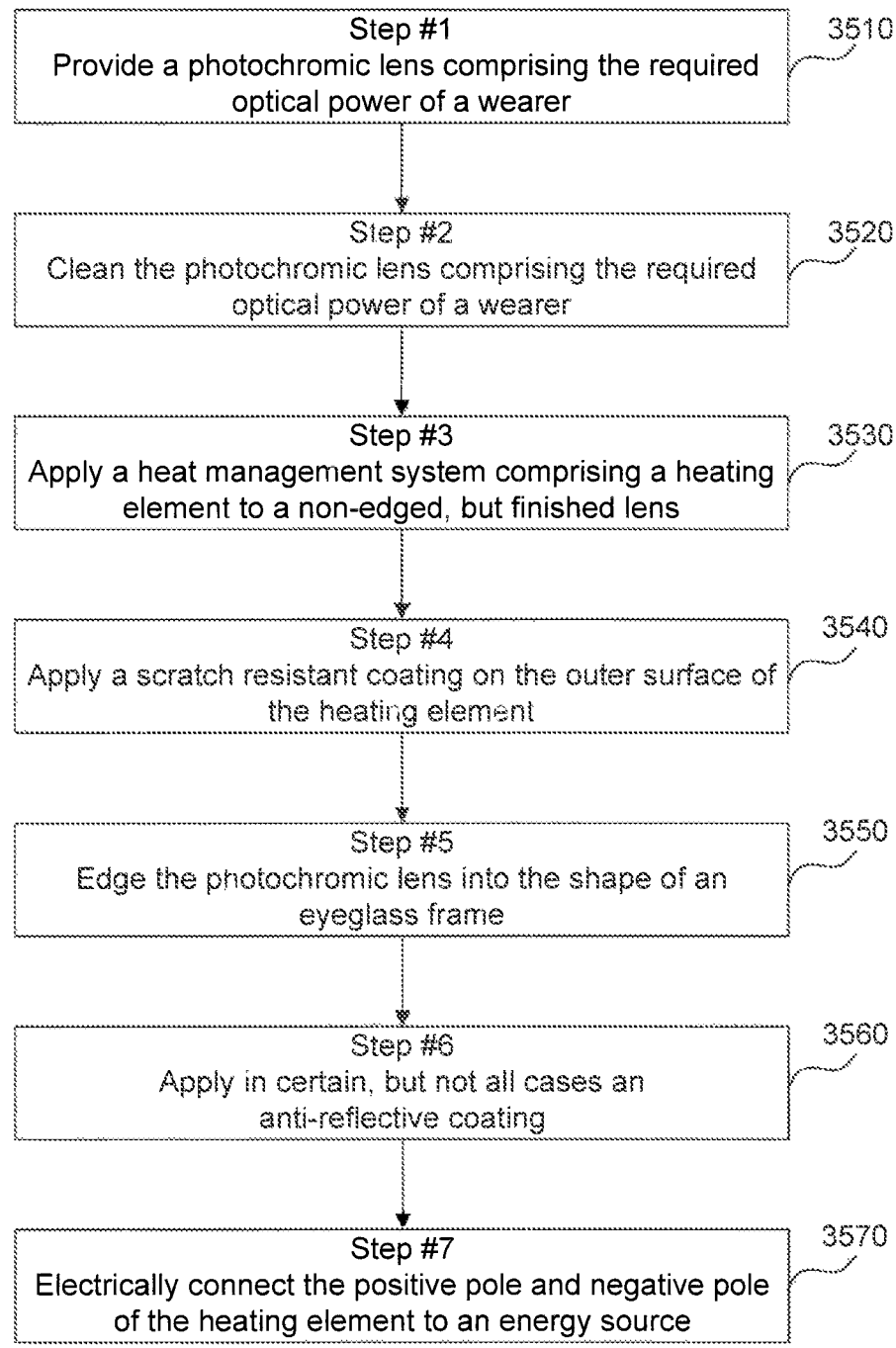

FIG. 35 is a flowchart of the fifth method of embodiment 12.

Figure 36:
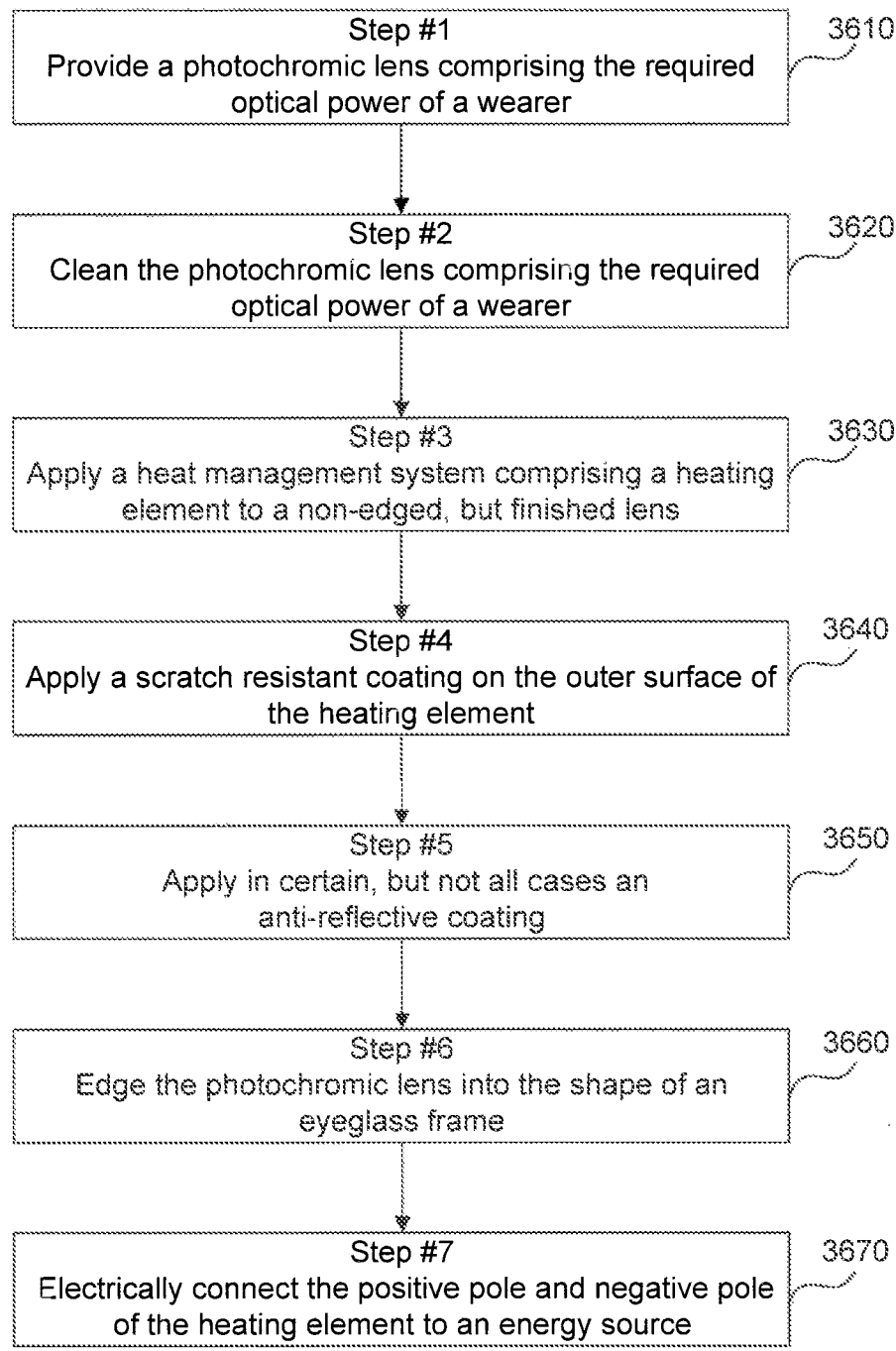

FIG. 36 is a flowchart of the sixth method of embodiment 12.

Figure 37:
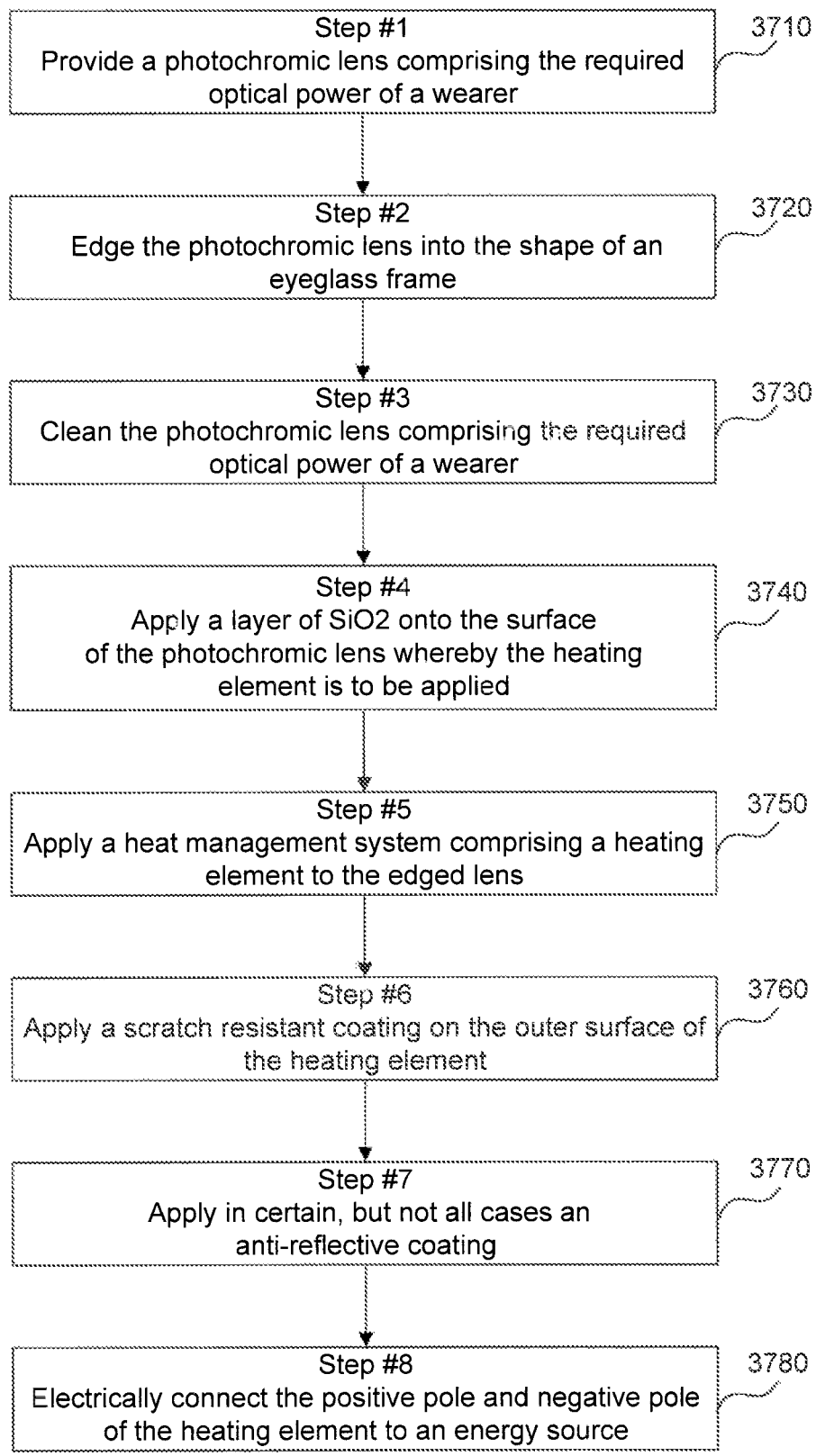

FIG. 37 is a flowchart of the seventh method of embodiment 12.

Figure 38:
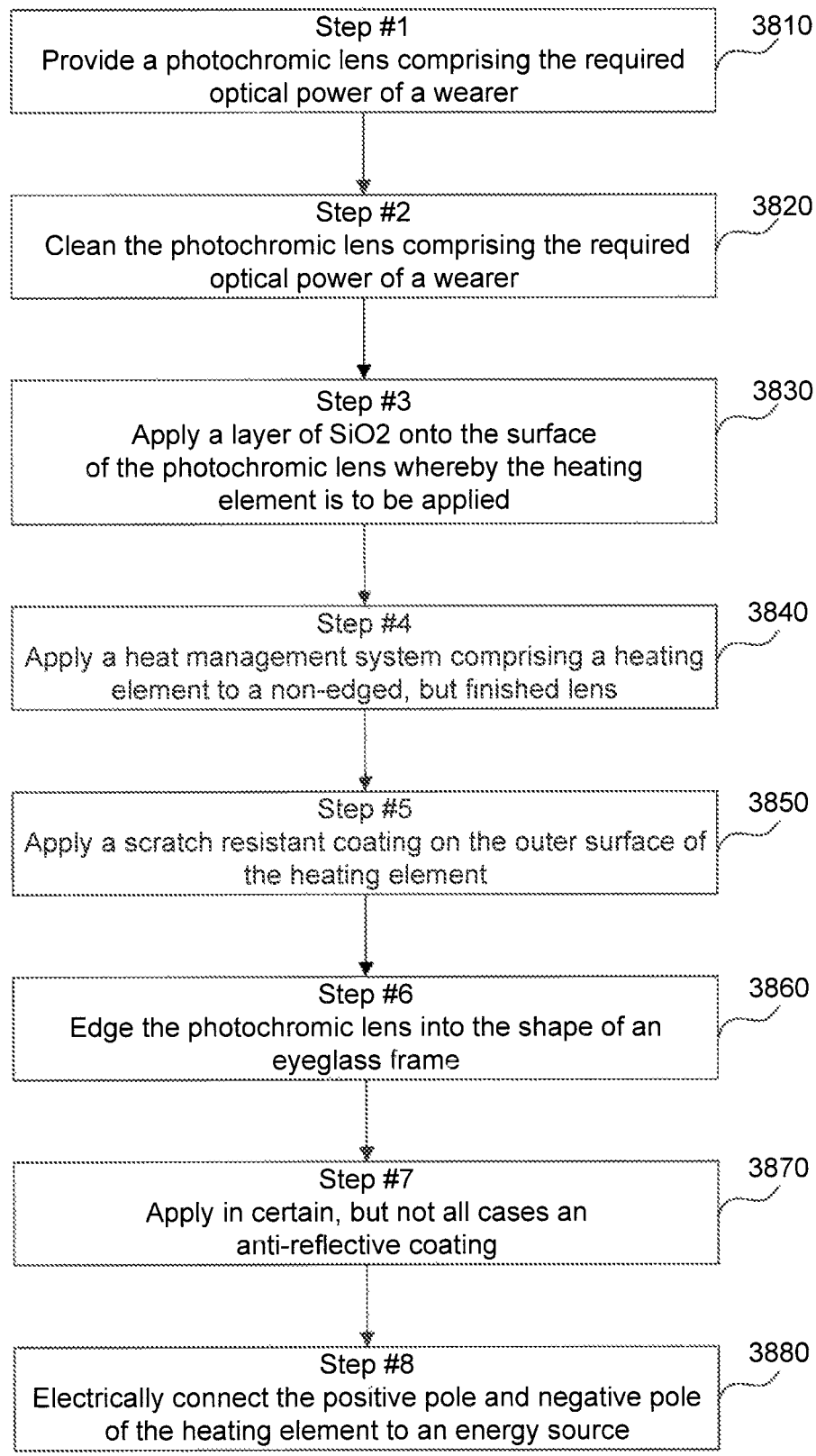

FIG. 38 is a flowchart of the eighth method of embodiment 12.

Figure 39:
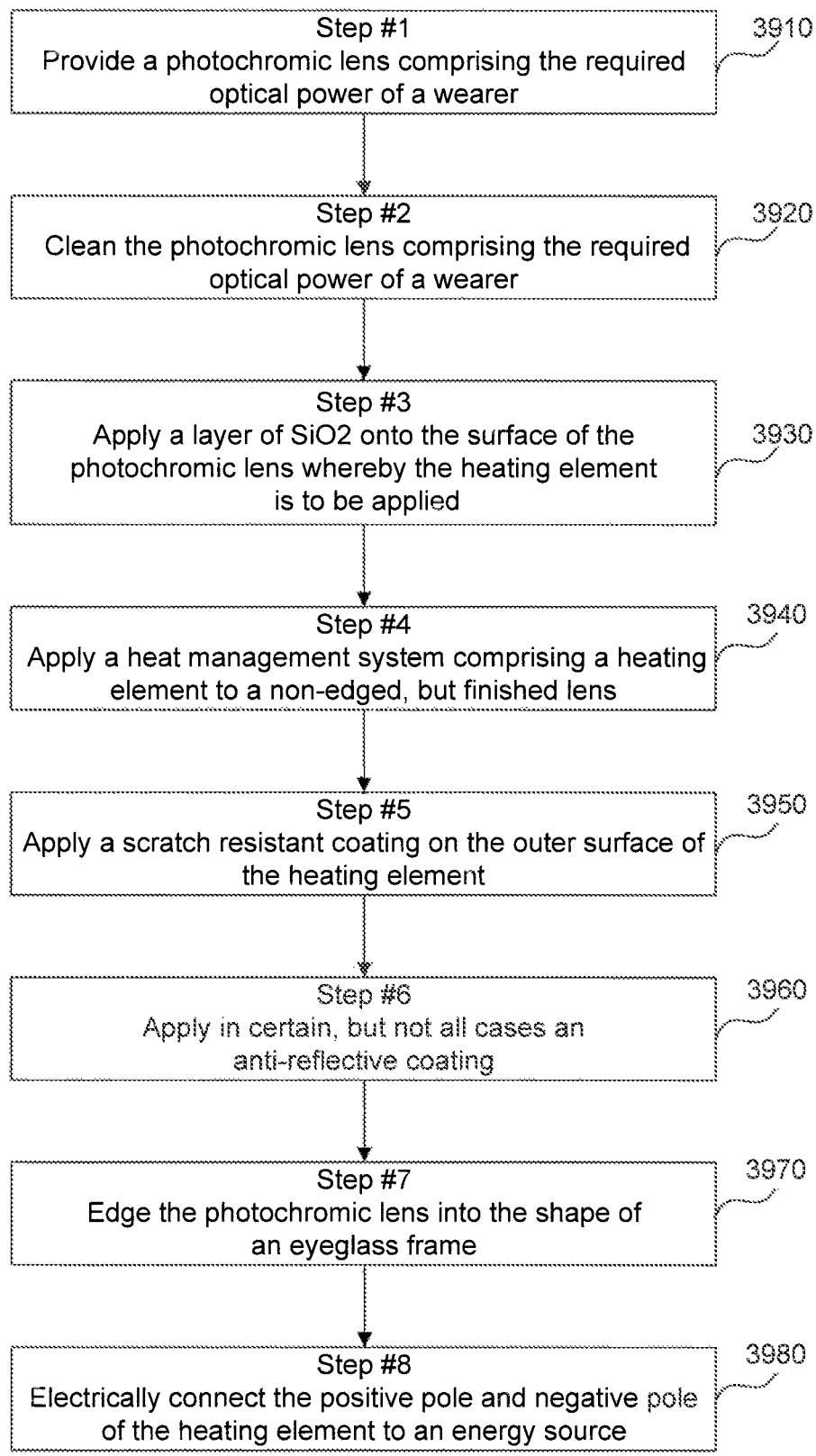

FIG. 39 is a flowchart of the ninth method of embodiment 12.

Figure 40:
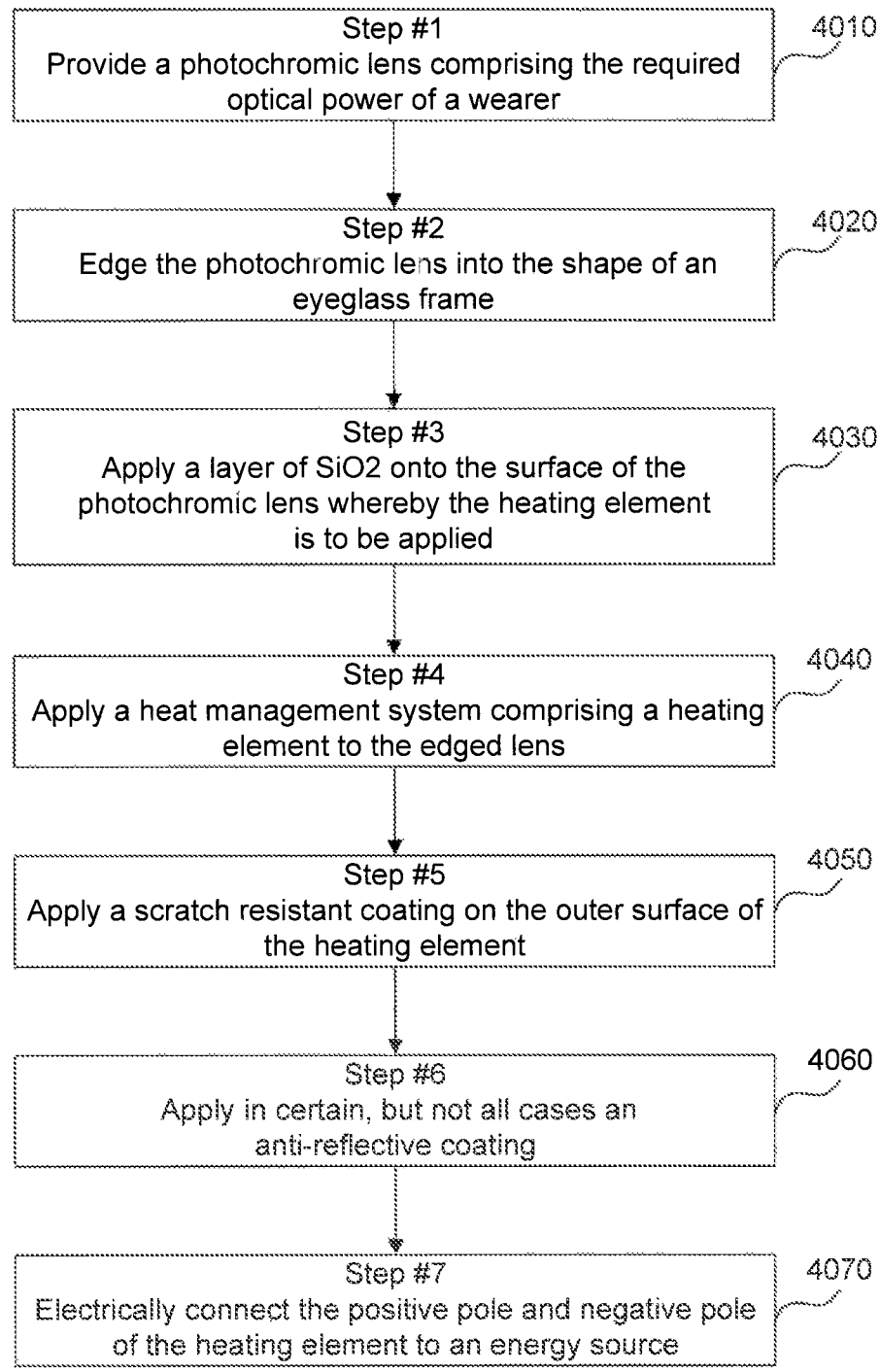

FIG. 40 is a flowchart of the tenth method of embodiment 12.

Figure 41:
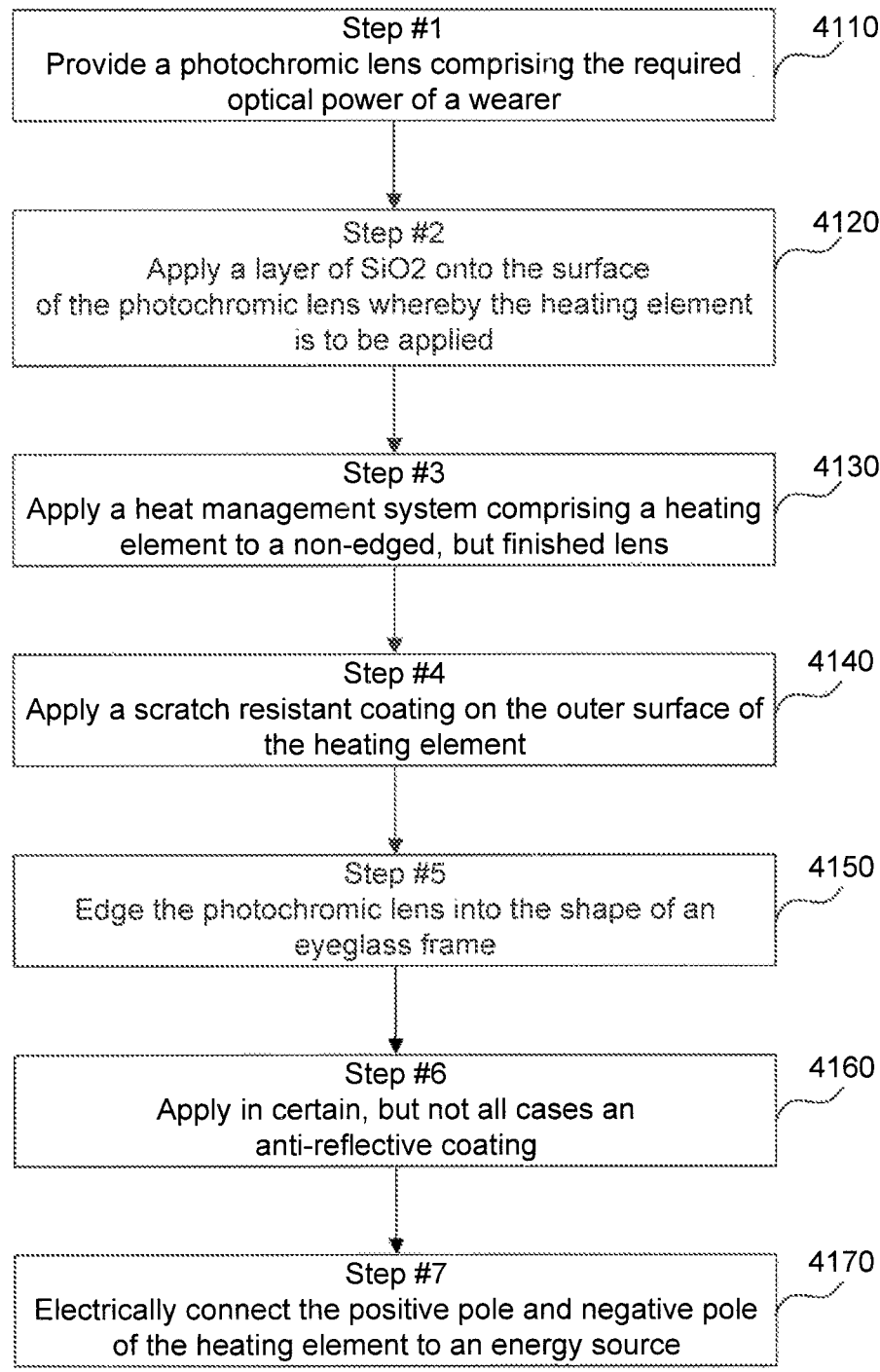

FIG. 41 is a flowchart of the eleventh method of embodiment 12.

Figure 42:
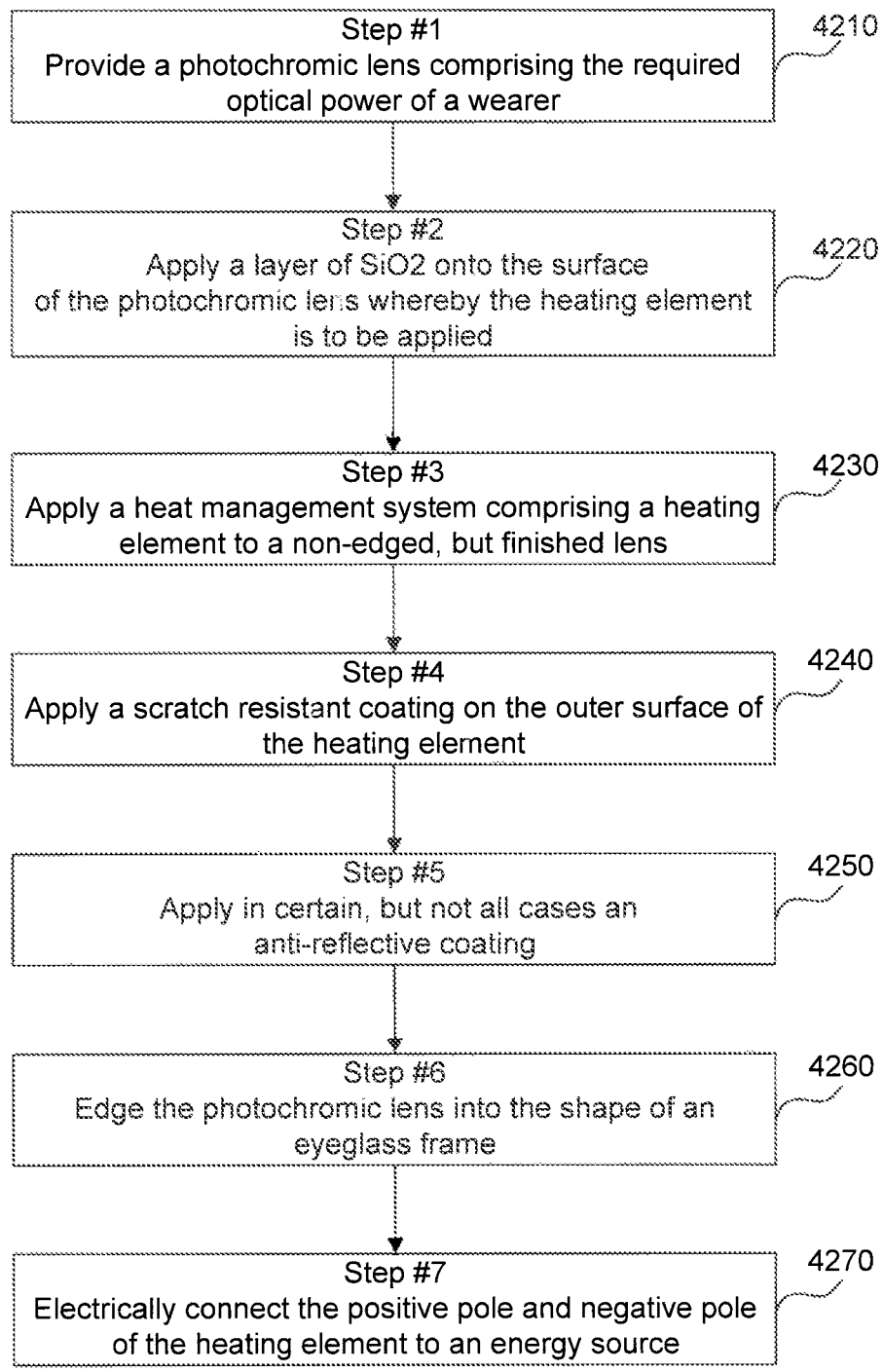

FIG. 42 is a flowchart of the twelfth method of embodiment 12.

Figure 43:
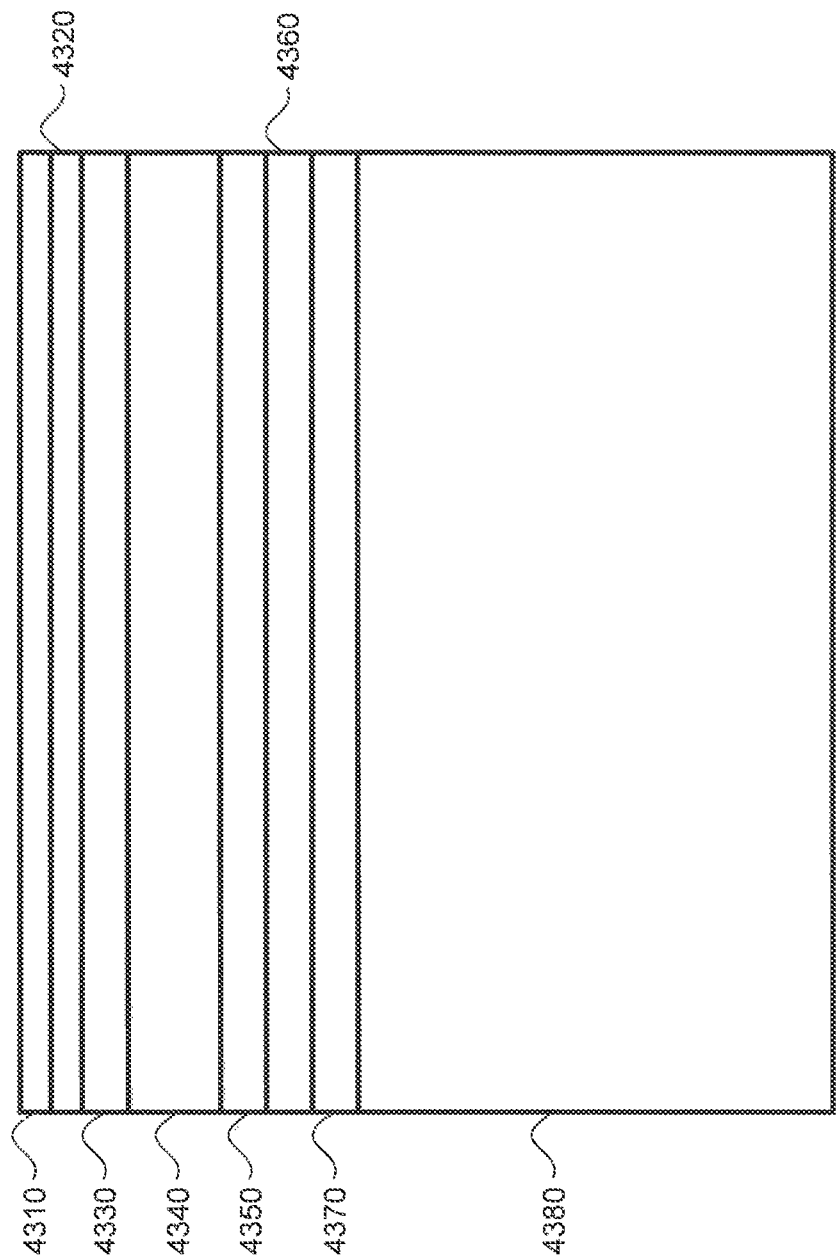

FIG. 43 shows a device incorporating a liquid crystal changeable tint element.

Figure 44:
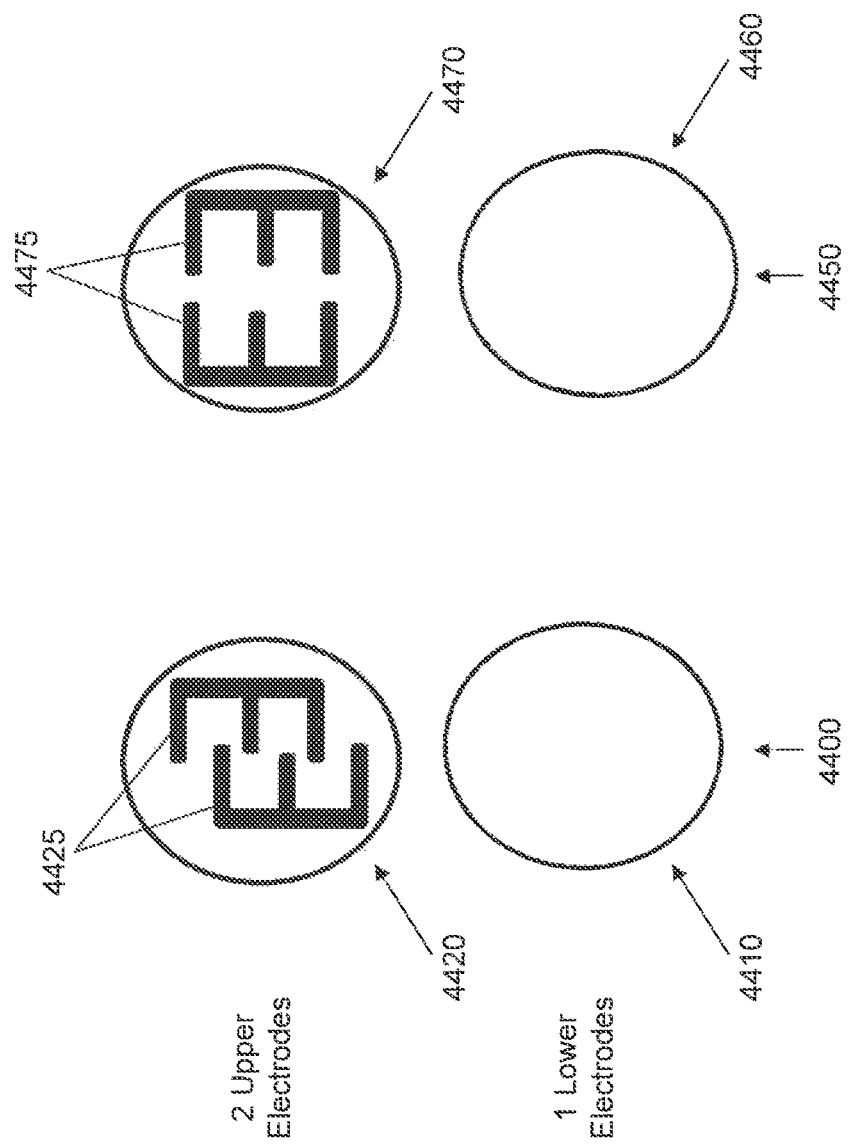

FIG. 44 shows electrode configurations usable with the device of FIG. 43.

Figure 45:
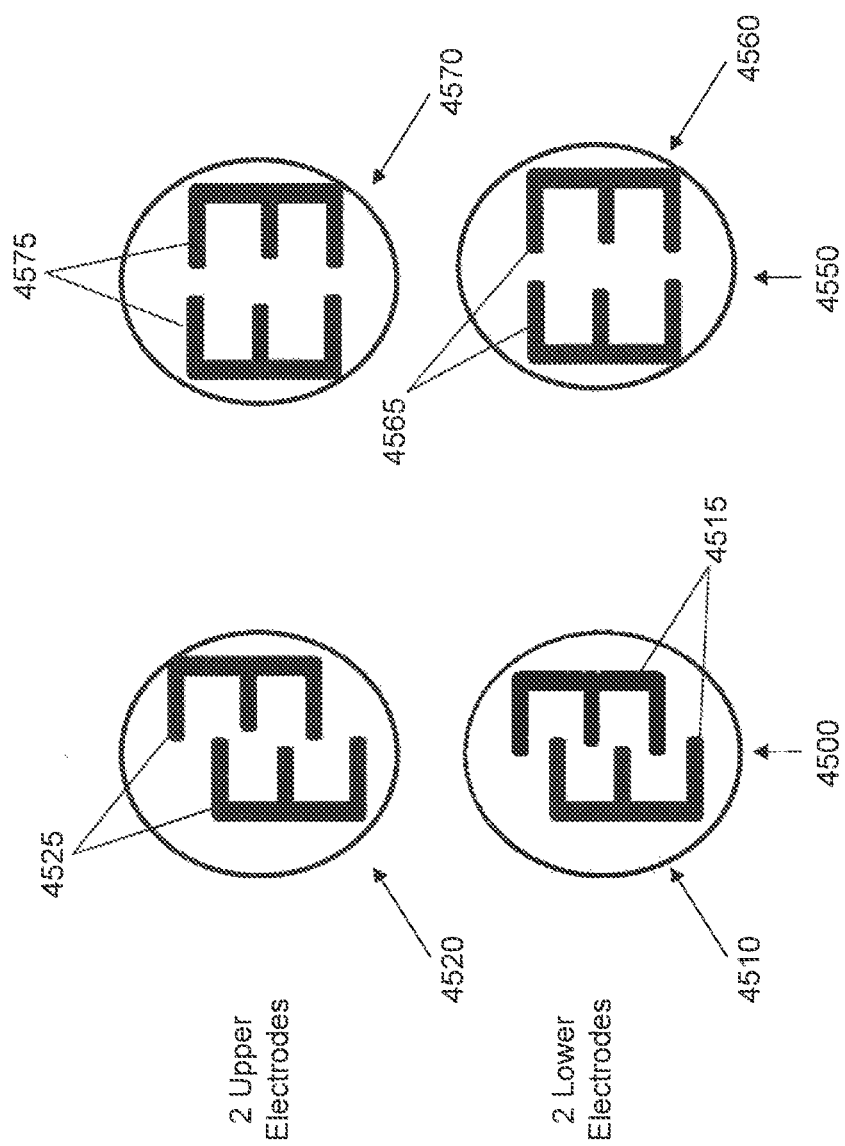

FIG. 45 shows electrode configurations usable with the device of FIG. 43.

FIG. 46 shows a solid state electrochromic device.

DETAILED DESCRIPTION

Embodiments disclosed herein provide a multilayered optic for eyewear comprising a heat management system, whereby the multilayered optic comprises a base optic, a changeable tint element, a polymer layer, and a transparent heating element. The transparent heater heats a changeable tint element or agent directly or indirectly. A polymer layer may comprise or is associated with the changeable tint element. When heat is applied by way of the transparent heater to the polymer it allows for the changeable tint element to switch its darkness level (the speed and degree of inhibiting light transmission) or its clearing level (the speed and degree of transmitting light) more quickly than if the heat was not applied. Embodiments contemplate a controller, sensors, and other appropriate electronics to control how and when heating occurs. Embodiments further contemplate choosing the specific polymer of the polymer layer by way of the specific environmental temperature where the optic will be utilized and further, taking into account at least one of: the type of changeable tint element or agent and the glass transition temperature (TG) of the polymer. In most, but not all, embodiments the optical system is housed or affixed to eyewear that comprises the electronics.

Embodiments disclosed herein provide a multilayered optic for eyewear comprising a heat management system, whereby the multilayered optic comprises a base optic, a changeable tint element, a polymer layer, and a transparent heating element. The transparent heater heats a changeable tint element or agent directly or indirectly. A polymer layer may comprise or is associated with the changeable tint element. When heat is applied by way of the transparent heater to the polymer it allows for the changeable tint element to switch its darkness level (the speed and degree of inhibiting light transmission) or its clearing level (the speed and degree of transmitting light) more quickly than if the heat was not applied. The eyewear comprises a heat management system, whereby the heat management system comprises two or more of; a heating element, controller, sensor, timer and an energy source.

Embodiments further contemplate choosing the specific polymer of the polymer layer by way of the specific environmental temperature where the optic will be utilized and taking into account at least one of: the type of changeable tint element or agent and that of the TG of the polymer. The changeable tint element or agent can be by way of example only; photochromic, thermochromic, polymer dispersed dichroic liquid crystal, electro-chromic. The polymer layer can have a thickness of 1 micron to 1.5 millimeters. In most, but not all, embodiments the optical system is housed or affixed to eyewear that comprises the electronics. The polymer layer can be that of a monolithic layer in the case of a photochromic device, a polymer dispersed liquid crystal layer in the case of a liquid crystal device and a solid state thermoplastic electrolyte in the case of an electrochromic device. The polymer layer generally, but not always, will contain the changeable tint element. In certain embodiments the polymer layer is incorporated within a host plastic lens blank, lens, optic, or device. In other embodiments the polymer layer is incorporated within a host glass lens blank, lens, optic, or device. When that of a lens blank the lens blank can be that of a semi-finished lens blank, a finished lens blank, or a finished lens. The lens can be that of a non-prescription lens, a sunglass lens, or a prescription lens. The lens can be of any optical power including no optical power, i.e., plano. The lens or lens blank can be coated with all normal optical coatings, including by example only; anti-reflection coating, hard scratch resistant coatings. The coatings can be located on the lens or lens blank in the order as customarily is available.

The term eyeglasses used herein is meant to be the same as eyewear. Eyewear is meant to be any device worn on or about the head that comprises a frame and a lens or optic (prescription or non-prescription) whereby the lens or optic is in the line of sight of a wearer. Ophthalmic lens can be by way of example only, semi-finished lens blank, lens blank, finished edged lens, eyeglass lens. UV and blue light as used herein is meant to be within the range of approximately 380 nanometers and 480 nanometers. The term transparent as used herein is meant to be mostly or largely transparent. A "transparent" element does not need to be 100% transparent, so long as any attenuation of transmitted light is sufficiently small that it does not render the eyewear unsuitable for its intended purpose. The term scratch resistant layer includes a hard coating. The term "electrical components (electronics)" means, by way of example only, any one or more of the following: controller, timer, power source, sensor, inductive coil, switch. The term changeable tint element is an element or agent capable of having its color or tint dynamically changed, tuned or switched; by way of example only, a photochromic element or agent, dichroic liquid crystal element or agent, electrochromic element or agent. A polymer layer can be, by way of example only, one or more of a homogenous polymer layer, a polymer matrix layer, a non-homogenous polymer layer, polymer dispersed layer and a polymer layer that comprises a changeable tint element or agent. The polymer layer can be that of a thermoplastic. Furthermore it should be understood that while in many of the embodiments taught herein utilize a photochromic changeable tint element or agent, embodiments should not be limited to that of a changeable tint element or agent that is photochromic. The photochromic element can be in a layer, layers or throughout the matrix. The photochromic element can be provided by way of example only; in the monomer, in an oil, micro-encapsulated with a liquid such as an oil. In some embodiments, any and all changeable tint elements or agents may be used whereby temperature alters color and/or light transmission switching speed.

Embodiments disclosed herein can be used for any and all optics or eyewear articles such as, by way of example only, motor cycle helmet face shields, ski goggles, sports glasses, ophthalmic lenses being those of non-prescription eyeglasses, prescription eyeglasses that are of static focus, dynamic focus, electronic focus, intra-ocular lenses, contact lenses, corneal onlay, and corneal inlay.

Figure 16:
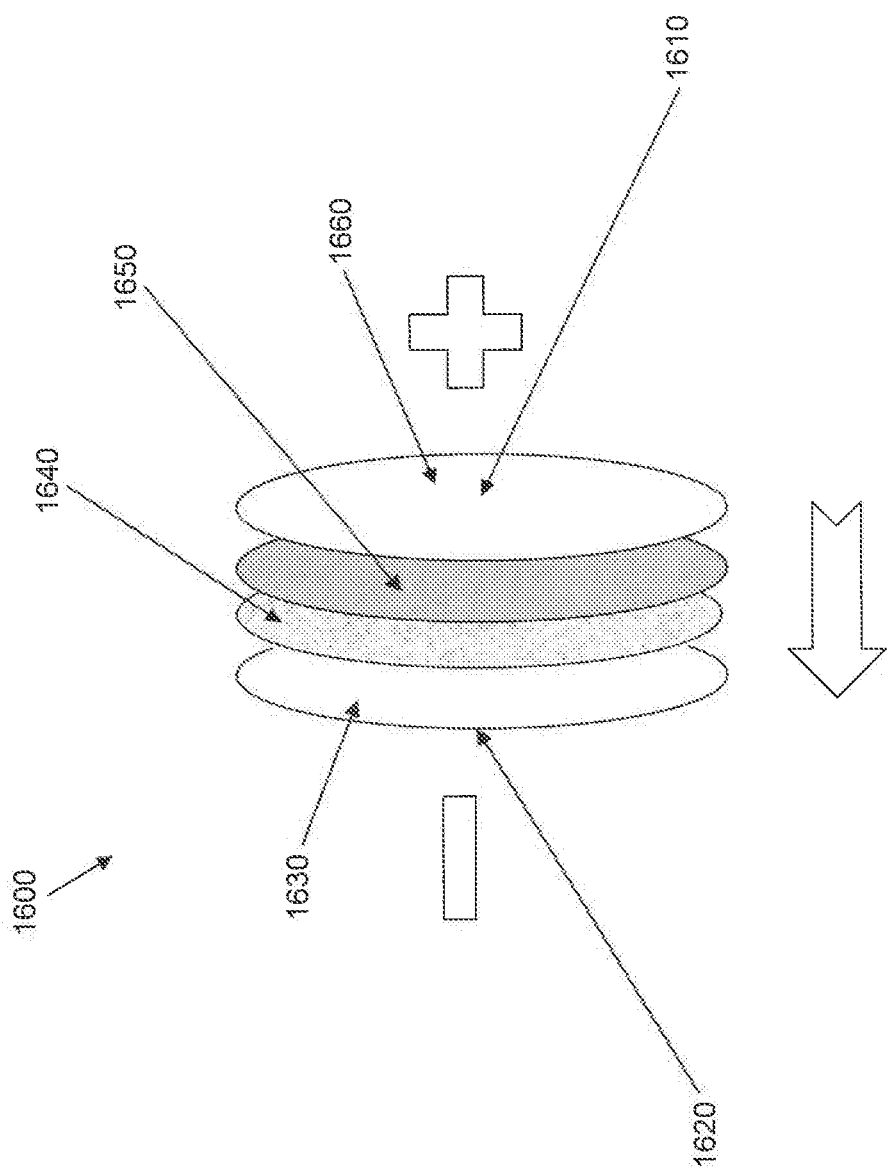
FIG. 16 shows an electronic cooling element 1600.

Embodiments disclosed herein will allow for much faster switching of the photochromatic eyeglass lenses or other optics when going from indoors to outdoors and when going from outdoors to indoors. Depending upon the material housing the photochromic agent the clearing or lightening speed (dark to light) can be 5× to 10× or faster than that of today's state of the art photochromic eyeglass lenses, and the clearing or lightening time correspondingly less. In addition, embodiments allow for the ability to achieve darker lenses outdoors in a warm environment when compared to today's present state of the art photochromic lenses. Embodiments accomplish this performance improvement thru a novel mostly optically transparent heat management system, plus (combined) in certain embodiments with that of matrix chemistry providing a higher TG or softening point of the matrix comprising the photochromic agent or agents than that presently utilized in commercially available photochromic lenses or optics. The heat management system may be comprised of various electronic components including one or more of a mostly transparent heating element (FIGS. 9, 10 and 11) and/or a mostly transparent cooling element (FIG. 16).

Previously, there has always been a limiting performance balance with photochromatic optics and/or lenses. The balance is the faster the darkening change outdoors the more sensitive the photochromic optic and/or lens is to ambient heat or high temperature outdoors (which is exacerbated due to the sun's thermal or actinic radiation effect) thus limiting the degree of darkening of the photochromic optic and/or lens and the speed in which it can darken. This is due to once the lens is heated to a certain level of darkening the lens material softens and the photochromic agent or agents reach a maximum darkening point where they begin to bleach. Embodiments disclosed herein solve this long performance limiting problem of a photochromic optic and/or lens. The terms "change" or "switch" as used herein is meant to mean the same. The term bleach is meant to mean the tint clears or lightens. The term TG is meant to mean the material's glass transitions temperature or softening point. However, materials may begin to soften at temperatures prior to the softening point.

Embodiments include a photochromic lens or optic system that will allow the eyeglasses (FIGS. 12, 13 and 14) or optic to become darkened to a much darker state than present photochromics even when behind a UV blocking or filtering windshield of a car or other vehicle. In certain embodiments the mostly transparent heating element associated with the embodiment can be utilized to turn on a thermal activated polarizing element or layer. This is especially helpful behind that of a UV blocking or filtering windshield or window where the level of photochromic tint is reduced. When utilized behind a UV blocking or filtering windshield the thermal activated polarizing element or layer provides glare reduction and a slight tint. The combination of this provides addition vision comfort for the eyes of the driver or passenger. It should be pointed out this also is the case for any type of lens or optic used behind a UV blocking or filtering mostly transparent object, such as by way of example only, window, windshield, face shield etc.

Some embodiments may comprise a mostly transparent cooling element. Such a mostly transparent cooling element is by way of example only, a Peltier cooler. A mostly transparent cooling element can be utilized by way of example only: #1) to change the phase order of the thermal activated polarizing element or layer, #2) to provide cooling out doors to the internal temperature of the photochromic layer or optic such to maintain its internal temperature outdoors to a temperature below its bleaching point for a longer period of time and thus allowing for the photochromic article or lens to remain darker outdoors and with less temperature sensitivity to higher outdoor ambient temperatures. Thus embodiments of photochromic lenses or optic systems using a transparent cooling system may remain darkened at a higher outdoor temperature than that of present photochromics while also lightening or clearing much taster than that of all present commercially available photochromics. It should be also pointed out that embodiments provide for utilizing a polymer layer being of a polymer having a higher TG than normally used. Prior to these embodiments, using a polymer layer having a high TG would provide for a darker color outdoors at temperatures over 90 degrees F., but would then cause the switching of color from that of a darkened color outdoors to that of a clearer color indoors to be extremely slow. Thus this was not acceptable commercially. Embodiments which utilize a transparent heating element allows for the use of a higher TG polymer layer thus allowing the photochromic lens to remain darker at high temperatures above 90 degrees F., but provide for fast switching times of tint clearing when moving from an UV light environment to a non-UV light environment.

Historically the higher the TG of the photochromic layer or optic the darker the optic or lens becomes when exposed to ultra violet light (UV) outdoors, but also the slower the optic of lens clears or rather the tint lightens up when indoors not exposed to UV light. This significant compromise (limitation) has plagued all commercially available photochromics. Lens, optic, and photochromic manufacturers have always had to choose a balance of the TG and hardness of the polymer matrix that houses the photochromic agent to that of the desired speed of clearing or tint lightening when going from outdoors to indoors. Because some embodiments comprise a transparent heating element which heats the photochromic matrix (whether that of a photochromic layer or photochromic lens blank having the photochromic agent throughout) when going indoors from outdoors. This heating effect speeds the time of the photochromic tint clearing or lightening up. Due to having the ability to heat the polymer matrix comprising the photochromic agent, the polymer matrix comprising the photochromic agent can be comprised of a polymer material having a higher TG and thus harder than that of previous commercially available photochromics. Thus embodiments of the photochromic article are less outdoor temperature sensitive (with temperatures of 80 F and above) with regards to the darkening of the photochromic article.

The photochromic article of some embodiments will get darker, and clears or lightens up much more quickly than the best state of the art commercially available photochromics and in certain embodiments is less temperature sensitive to higher ambient temperatures. And finally, some embodiments provide a way to improve vision comfort in sunlight when behind a UV blocking or filtering mostly transparent windshield or face shield by providing for glare or reflected light reduction and protection. Embodiments disclosed herein can provide enhanced photochromic performance, enhanced photochromic polarized performance, enhanced polarized performance. The changeable tint element (elements) also called agent or (agents) of embodiments disclosed here in can be, by way of example only, dyes, agents, material components capable of causing a changeable tint. A variety of tint colors can be formulated by means that are well known in the photochromic industry.

Figure 19:
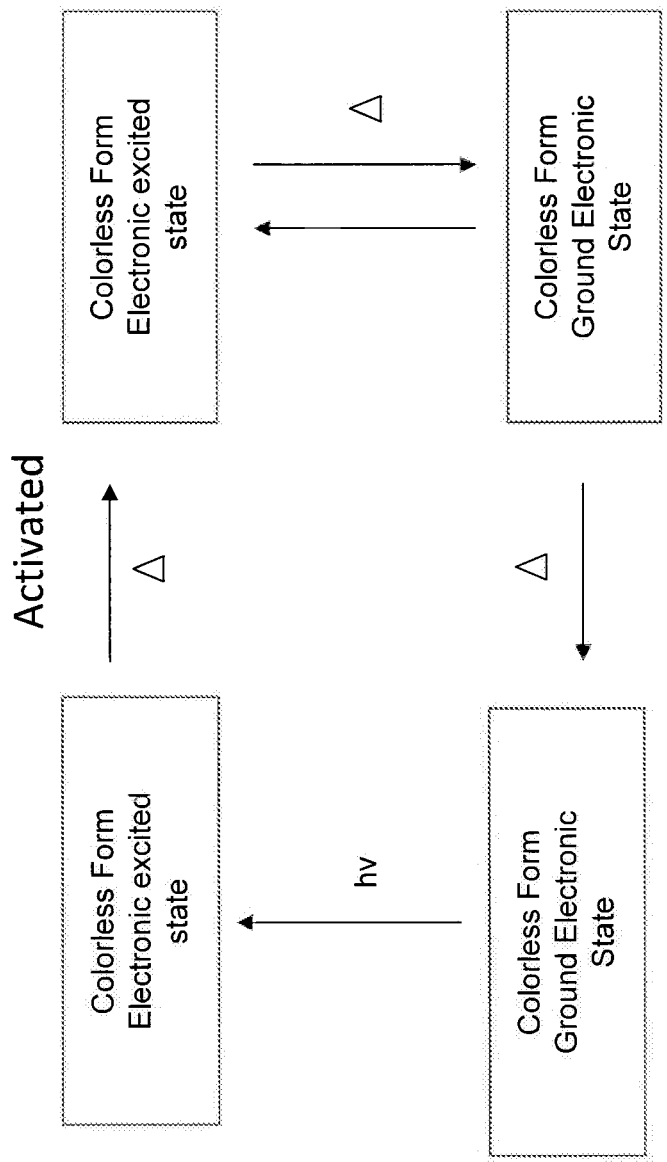
FIG. 19 is a flowchart showing a four-state system, which is the mechanism by which many photochromatic materials darken and lighten.

FIG. 19 is a flowchart showing a four-state system, which is the mechanism by which many photochromatic materials darken and lighten.

FIG. 20 further illustrates the mechanism by which many photochromatic optics darken. Initial light absorbance is quite low, less than 0.15. When exposed to bright sunlight, the colorless form is electronically excited, and is converted to the colored form. Light absorption increases, increasing the heating rate of the optic, and light absorption. Both heating and absorption cause a further increase in interconversion rate. Rising temperature softens the matrix, and increases the back conversion rate. The level of light absorption reaches a maximum threshold, leading to the sigmoid curve illustrated in FIG. 20. At the top of the curve, temperature and optical absorbance are in equilibrium and a fixed ambient illumination level. The X-axis, or time axis, in FIG. 20, is not labeled with a particular length of time, but is included to show how absorption generally behaves with the passage of time under the circumstances described.

Application of heat accelerates the deactivation of the colored form and speeds up return to colorless state when activating radiation is absent by two mechanisms. One mechanism is softening of the matrix, allowing intra-molecular rearrangement. The second mechanism is activating the rearrangement process. This process works best for photochromics applied in a thin layer (50-100 microns) but is also effective with photochromics in bulk.

The heat dissipated in the heater layer will cause its temperature to rise. But the heat will also diffuse through heat conduction into the adjacent cooler layers. This means, that the temperature rise will spread from the heater layer to the adjacent layers. This process is desired as it allows the heater to heat up the adjacent photo-chromic layer. It continues until, ultimately, all layers in the stack have the same temperature. For any layer stack this spreading of the temperature across the stack through heat diffusion occurs within a characteristic spreading time. For the stack in our example it is approximately 2 to 6 seconds.

The energy inserted into the individual layers can be calculated as the product of the temperature increase, the volume of the layer, and the specific heat of the material. When the temperature increase is uniform most energy is inserted into the polymer lens as it has by far the largest volume. To clear the changeable tint element or layer such as, by way of example only, a photo-chromic element or layer, thermochromic element or layer, polymer dispersed dichroic liquid crystal element or layer, solid state electrochromic element or layer, strictly speaking, heating up the changeable tint layer would be sufficient. But the energy injected in the changeable tint layer is much less than in the polymer lens which is hosting the layer as it is much thinner than the polymer lens. Therefore it is inefficient to heat the photo-chromic lens over a time span longer than the spreading time; most of the heating energy ends up where it does not help to clear the changeable tint element or layer.

Some embodiments disclosed herein dissipate the energy required to heat up the changeable tint element or layer in a thermal burst significantly shorter than the spreading time, i.e., 1 s. In this way, the dissipated energy will be concentrated around the heater and photo-chromic layer, resulting in locally higher temperatures. This effect lasts for some time shorter than the spreading time. In certain embodiments the thermal burst can be repeated several times in a timed sequence which can be programmed into the microprocessor. Thus a sequence of rapid bursts or energy and resultant spikes of temperature can provide for the most energy efficient way to heat the changeable tint element for the various embodiments taught within this patent application.

A stack design is provided for some embodiments. The product is fabricated by applying coatings of ITO and SiOx on the front surface of the eyeglass. One of two approaches may be used. In the first approach, starting with a finished eyeglass optic (e.g., hard coated), it is possible to apply a transparent, conductive layer of ITO to serve as a first electrode, then provide the photochromic layer, then a second layer of ITO to serve as the second electrode (see FIG. 21, option 1). A resistive layer of SiOx may also be applied prior to applying the ITO layer in order to provide stability against cracking. In the second approach, starting with an existing eyeglass optic that has a photochromic layer already applied on it (e.g., Transitions lenses), it is possible to overcoat the photochromic layer with a transparent conductive layer of ITO or SnOx/ITO that is connected to an electric circuit delivering 3.5 v at the positive terminal (see FIG. 21, option 2). In most, but not all cases, a SiOx layer or that of a hard coat is applied on top of the ITO layer. While in most embodiments ITO is utilized for the transparent conductive layer it should be pointed out that any transparent conductive material can be used such as by way of example only, conductive polymers. Similarly, resistive materials other than SiOx may be used. The more buried the transparent heater and the closer to the changeable tinting element the more energy efficient the device becomes. While a transparent heating element applied to the outer surface will affect the performance of the changeable tint element such a transparent heater will not be energy efficient as much of the heat will dissipate quickly. Embodiments disclosed herein teach a transparent heating element that is located beneath an outer layer of some type.

FIG. 21 shows two options for providing a lens having a heating element and a photochromic. In option 1, a photochromic layer is applied after applying ITO. The following layers are applied, in order. An AR coat 2101, a layer 2102 of SiOx, a layer 2103 of ITO, a layer 2104 of SiOx, a layer 2105 of ITO, a layer 2106 of SiOx, a photochromatic layer 2107 and a layer 2108 of SiOx. In option 2, an existing photochromic layer is subjected to further processing. SiOx layers 2112 and 2113 may be applied to both sides of an existing photochromic layer 2111. In order, patterned ITO layer 2114, SiOx layer 2115 and an AR coating 2116 are applied over SiOx layer 2113. Photochromatic layer 2111 is preferably 50-250 microns thick. SiOx layers 2112 and 2113 are preferably 100-150 nm thick, and are intended to be resistive. Here and elsewhere in this application, where SiOx or SiO2 is disclosed between two electrodes, the SiOx is intended to be resistive. Other appropriate transparent resistive materials may also be used. Patterned ITO layer 2114 is preferably 20 nm thick. SiOx layer 2115 is preferably 2-3 microns thick, and may function as a hard coat. Layers 2108 and 2115 are optional. The layers disclosed in FIG. 21 are stacked on a lens blank.

FIG. 22 is a table providing additional preferred layer specifications for the structures of FIG. 21

FIG. 23 is a table providing energy requirements and days between charging for the structures of FIG. 21, option 1. Calculations were based on a one-dimensional heat transfer equation with a heat source, and a sink (the base lens) held at room temperature.

FIG. 24 is a table providing energy requirements and days between charging for the structures of FIG. 21, option 2. Calculations were based on a one-dimensional heat transfer equation with a heat source, and a sink (the base lens) held at room temperature.

FIG. 25 shows a first process flow. In a first step 2501, start with a photochromatic lens blank, such as an Essilor Transitions Lens Blank. In a second step 2502, add proprietary transparent heating element, for example by deposition. In a third step 2503, add a hard coat. In a fourth step 2504, ship the resultant lens to a lens lab, lens manufacturer, or put in inventory.

FIG. 26 shows a second process flow. In a first step 2601, start with a photochromatic lens blank, such as an Essilor Transitions Lens Blank. In a second step 2602, add a hard coat. In a third step 2603, add a proprietary transparent heating element, for example by deposition, and then add a hard coat. In a fourth step 2604, ship the resultant lens to a lens lab, lens manufacturer, or put in inventory.

Electronic Photochromic Eyewear is conventional photochromic eyewear, further comprising a heat management system for the lenses and enabling electronics either located within the frame as with electronic frames or affixed to the frame as with non-electronic frames.

Electronic Photochromic Eyewear provides the ability to greatly enhance the performance of today's photochromics. It provides the ability to speed up switch time of darkening. And the degree of darkening by using matrix chemistry that in the past would not work properly. It provides the ability to "significantly" speed up switch time of clearing. It provides the ability to not affect darkening threshold and in fact may increase peak darkening. It provides an enhanced darkness/temperature relationship.

With Electronic Photochromics, lenses can be edged into any shape. Lenses can be edged into any size. It will work with any electronic frame that comprises the proper electronics. It will work in any non-electronic frame that has a temple to which an external electronics module can be affixed.

By way of example, a regular Transitions 6 (T6) photochromatic lens without heating has a clearing time such that, after 15 minutes of exposure T6 takes approximately 9+/− minutes to clear to 73% transmission. By heating as disclosed herein, T6 will clear to approximately 80% transmission in approximately 2 minutes or less. This will occur without compromising darkening state, speed of darkening, or darkness/temperature relationship.

By way of example, a regular T6 photochromatic lens: clears to 80%+ Trans in about 12 minutes in typical indoor conditions, darkens to about 31% transmission at an ambient temperature of 95 F when exposed to light in about 1 minute (outdoor sunny conditions), eventually darkens to 27% transmission at 95 F under outdoor sunny conditions, and eventually clears to 95% transmission in typical indoor conditions when used in a lens with an AR coating. The same lens with a heat management system as disclosed herein has similar parameters, but with the notable difference that it clears to about 80% transmission within 2 minutes or less.

Altering the matrix of the photochromatic element to use a higher TG material and using that photochromatic element with a heat management system further allows for a degree of darkness in hot outdoor sunny conditions at temperatures above 90 degrees F. of 15% transmission. By using a higher TG polymer the lens or optic will have higher temperature stability and will maintain the darker color at higher temperatures for a longer period of time without bleaching to a lighter color. However, the ability to switch from the darkened state to that of a lightened state within a reasonable period of time is only made possible by embodiments disclosed herein; that being the application of a heat management system comprising a transparent heating element.

Embodiments disclosed herein are comprised of any one or combination of a variety of arranged layers and/or elements that affect the performance of the switchable changeable tint article and/or switchable polarized article. These elements are (being not listed in any order) #1) heating element, #2) cooling element, #3) polarizing element, #4) changeable tint element (elements), #5) polymer layer, #6) polymer matrix TG. In certain embodiments a changeable tint element such as by way of example only; a polymer dispersed dichroic liquid crystal element or layer is provided, in others an electrochromic element or layer, in certain embodiments a thermochromic element or layer and in still others a photochromic element or layer. In embodiments disclosed herein, a heat management system comprising of a transparent heater is utilized to enhance the performance of a changeable tint element.

Embodiments disclosed herein are that of a performance enhanced photochromic optic or article whereby it's performance is enhanced by the application of a heat producing light transparent member or element combined with that of an energy source, sensor and in certain embodiments a controller. The transparent heating element can be comprised, by way of example only, of an Indium Tin Oxide (ITO) layer having an electrical resistance within the range of 2Ω to >200 Ω/sq with a preferred range of 5Ω to 50Ω. It should be noted that a conductive polymer and/or conductive polymer with conductive nano-particles can also be used. This creates an optimum coating having the proper density to provide excellent heating performance. For the purposes of this disclosure the words pole, connection electrode, and terminal are meant to be the same. By way of example only, the transparent heating element can comprise positive and negative poles, connection electrodes or terminals. The terms scratch resistant coating and hard coat are also meant to mean the same.

Figure 9:
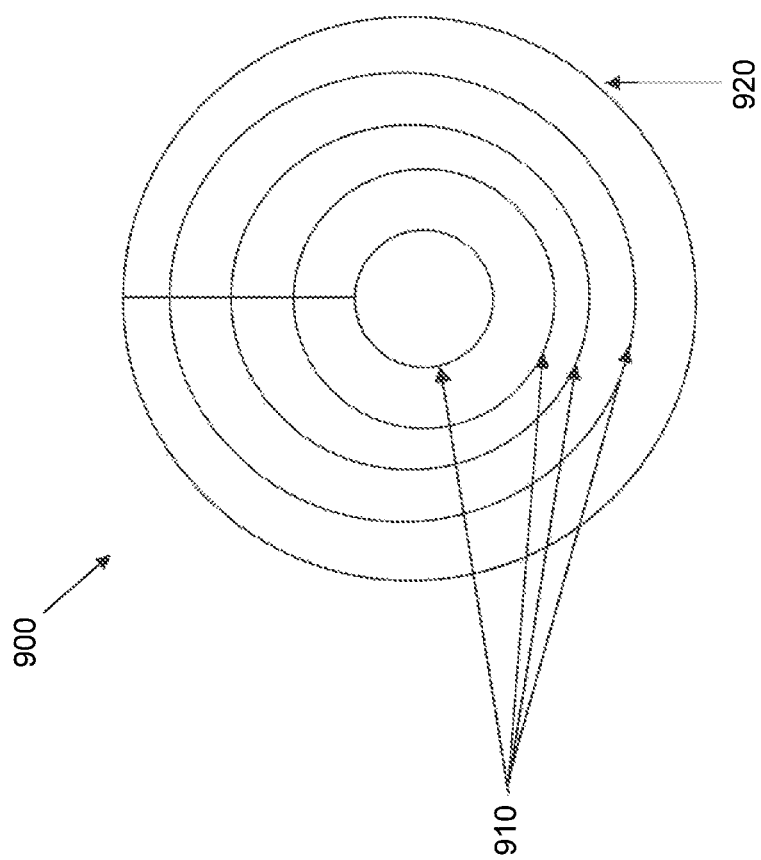
FIG. 9 shows an electrically resistive coil 900.
Figure 10:
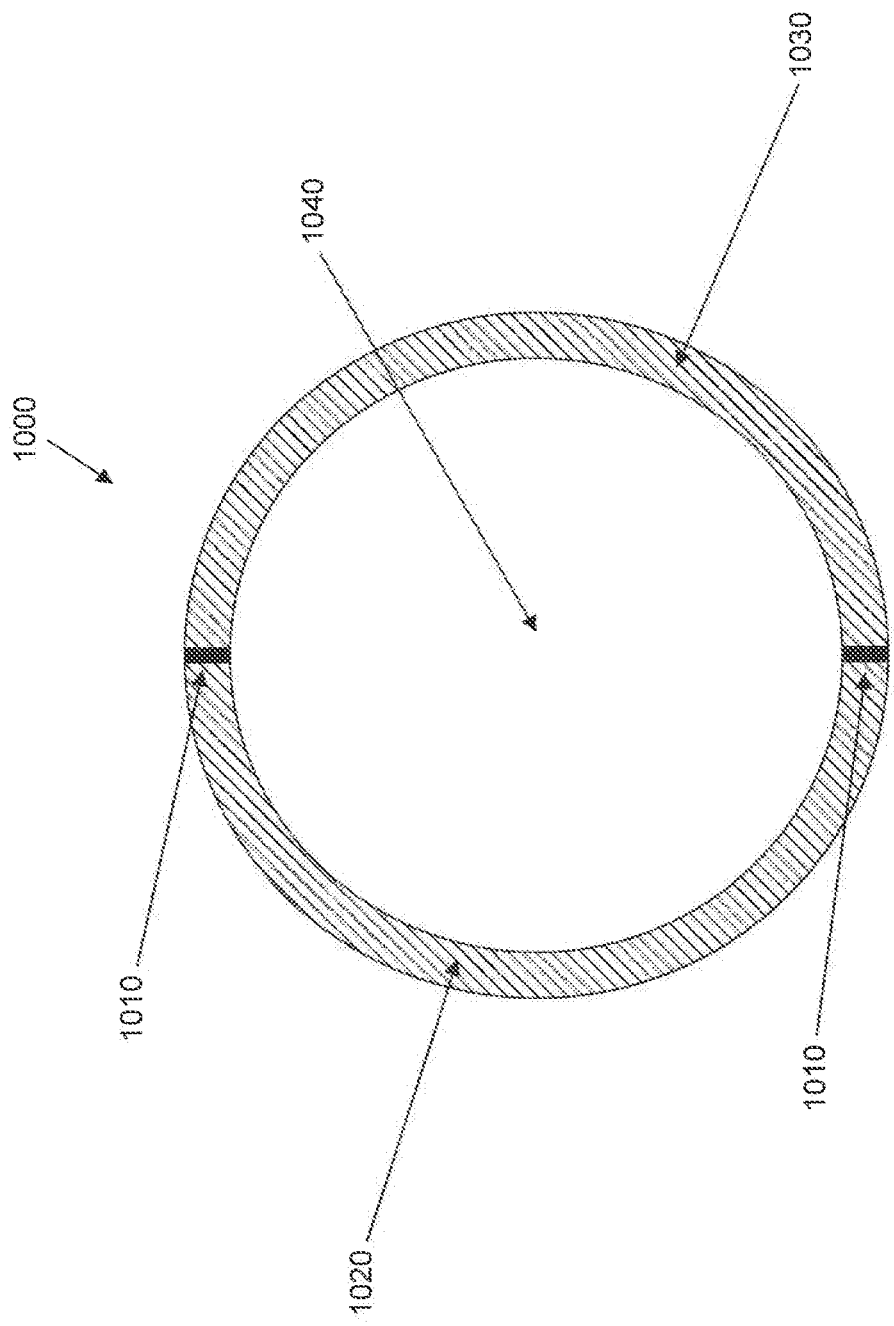
FIG. 10 shows an electrically resistive continuous surface heating element 1000.

FIGS. 9 and 10 show by way of example only, two of the many type of heating element designs which can be applied. FIG. 9 is that of an electrically resistive coil similar to that of an oven burner. However, the electrically conductive and resistive material used is that of ITO. Due to the fact that the application is for that of an optic or lens the electrically conductive and resistive material is transparent. In some embodiments, given that the ITO is not spread evenly across the surface when a coil heating element is utilized, the coil is comprised of thin and very close coiled conductive features. This is due to the fact that with some embodiments UV light is activating the photochromic layer or optic beneath. If any UV light is filtered out by the coil uneven darkening can occur. Therefore embodiments contemplate such a conductive resistive coil being that of a tightly designed coil. When a heating element is constructed to be that of a non-uniform electrically conductive resistive coating that covers the surface of the lens the coating is fabricated by way of example only, masking the surface being coated with ITO with the design desired, or by way of etching the surface after being coated with ITO. These are two examples only of how an electronic conductive resistive coil coating similar to that of an over burner is fabricated.

FIG. 9 shows an electrically resistive coil 900. Coil 900 includes transparent electrodes 910. Transparent electrodes 910 may be made of any suitable transparent conductor or semiconductor, including indium tin oxide (ITO), conductive polymer, carbon nanotubes, and similar materials. The coils are preferably as fine and as close as possible, which results in a higher resistance and a more effective heating element. The coils preferably extend to a lens periphery 920.

FIG. 10 is that of an electrically conductive resistive layer that covers the entire surface of the lens. There are two connection electrodes (a positive pole and a negative pole) on either side both insulated from each other. It should be pointed out that while these two connection electrodes are shown on the top of the surface which forms the heating element layer they can be located also on the side edge of the layer closest to the peripheral edge of the optic or lens. In certain embodiments these two connection electrodes which connect to the heat management system can be comprised of, by way of example only, silver wire, gold, conductive polymer, ITO, carbon nano-tubes.

FIG. 10 shows an electrically resistive continuous surface heating element 1000. Heating element 1000 includes insulation 1010, a first electrical connector 1020, a second electrical connector 1030, and a continuous resistive layer 1040. Continuous resistive layer may be made of any suitable transparent conductor or semiconductor, including indium tin oxide (ITO), conductive polymer, carbon nanotubes, and similar materials.

Figure 11:
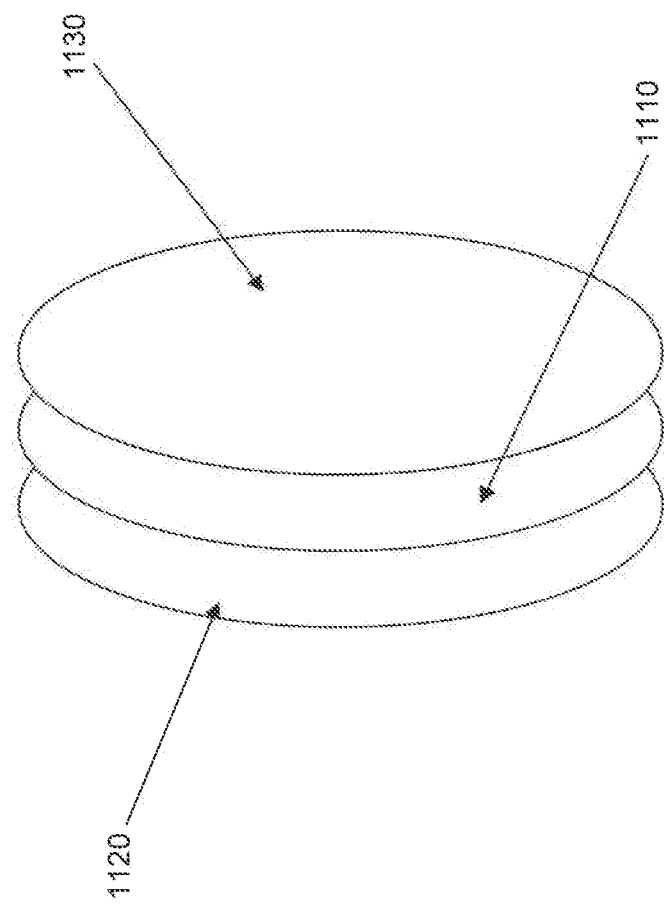
FIG. 11 shows a polymer layer 1110 sandwiched between a first heating element 1120 and a second heating element 1130.

FIG. 11 shows a polymer layer 1110 sandwiched between a first heating element 1120 and a second heating element 1130. Polymer layer 1110 comprises one or more photochromatic agents. First and second heating elements 1120 and 1130 may each include a layer of ITO, conductive polymer, or carbon nanotubes.

The arrangement and thickness of the layers is considered to be a part of some embodiments disclosed herein. In certain embodiments, the heating element can be located behind that of the photochromic layer or optic as provided in FIG. 1, in other embodiments the heating element can be in front of that of the photochromic layer or optic as provided in FIG. 3, or in other embodiments two heating elements can be located in front and behind the photochromic layer or optic as provided in FIG. 2. In still other embodiments the heating element can be comprised of three layers with the photochromic layer providing, in addition to the photochromic tint, electrical resistance as provided in FIG. 4 and FIG. 15. When the photochromic layer is used to provide electrical resistance (in addition to its photochromic tint properties) it is located between two mostly transparent electrode layers. In certain cases, but not all cases, very small electrical conductive particles can be mixed/dispersed within the matrix of the polymer layer comprising the photochromic agent or agents. Thus in this embodiment the heating element comprises three layers; one a first conductive mostly transparent electrode layer, second a photochromic electrically resistant layer, and the third that of a second mostly transparent conductive electrode layer. The mostly transparent conductive electrode layers can be comprised of, by way of example only, ITO (Indium Tin Oxide), conductive polymer, carbon nano-tubes.

Figure 1:
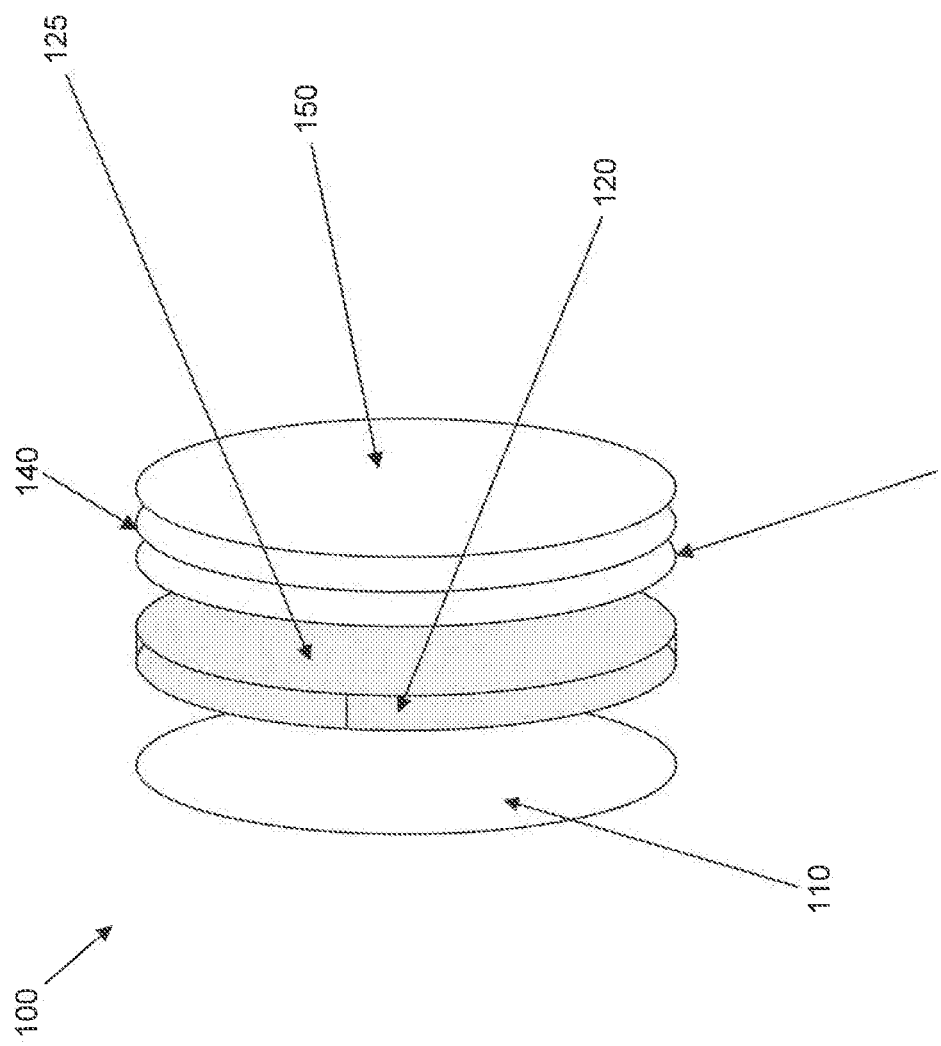
FIG. 1 shows a device 100 having a single photochromatic layer and a single heating layer.

FIG. 1 shows a device 100 having a single photochromatic layer and a single heating layer. The photochromic layer is separate from the optic. Device 100 includes, in order from closest to a wearer to farthest, a first scratch resistant layer 110, an optic 120, a heating element layer 130, a photochromic layer 140 and a second scratch resistant layer 150. Optic front 125 is the side of optic 120 disposed farthest from a wearer.

Figure 2:
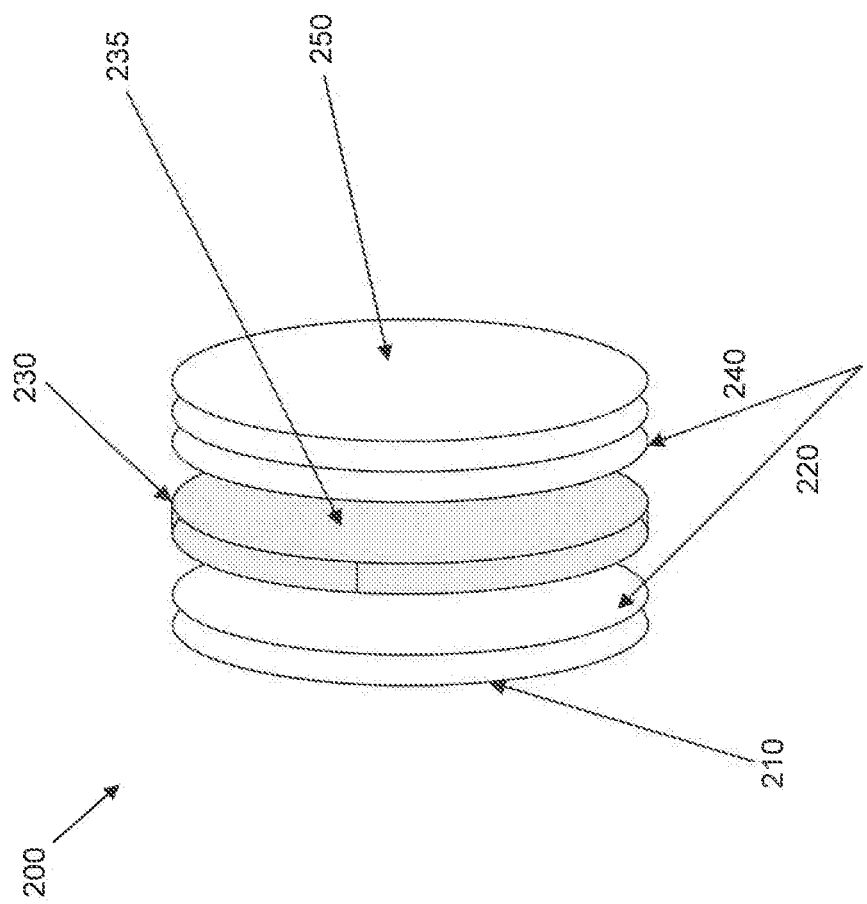
FIG. 2 shows a device 200 having a photochromic optic, and two heating layers.

FIG. 2 shows a device 200 having a photochromatic optic, and two heating layers. Device 200 includes, in order from closest to a wearer to farthest, a first scratch resistant layer 210, a first heating element layer 220, a photochromatic optic 230, a second heating element layer 240 and a second scratch resistant layer 250. Optic front 235 is the side of photochromatic optic 230 disposed farthest from a wearer.

Figure 3:
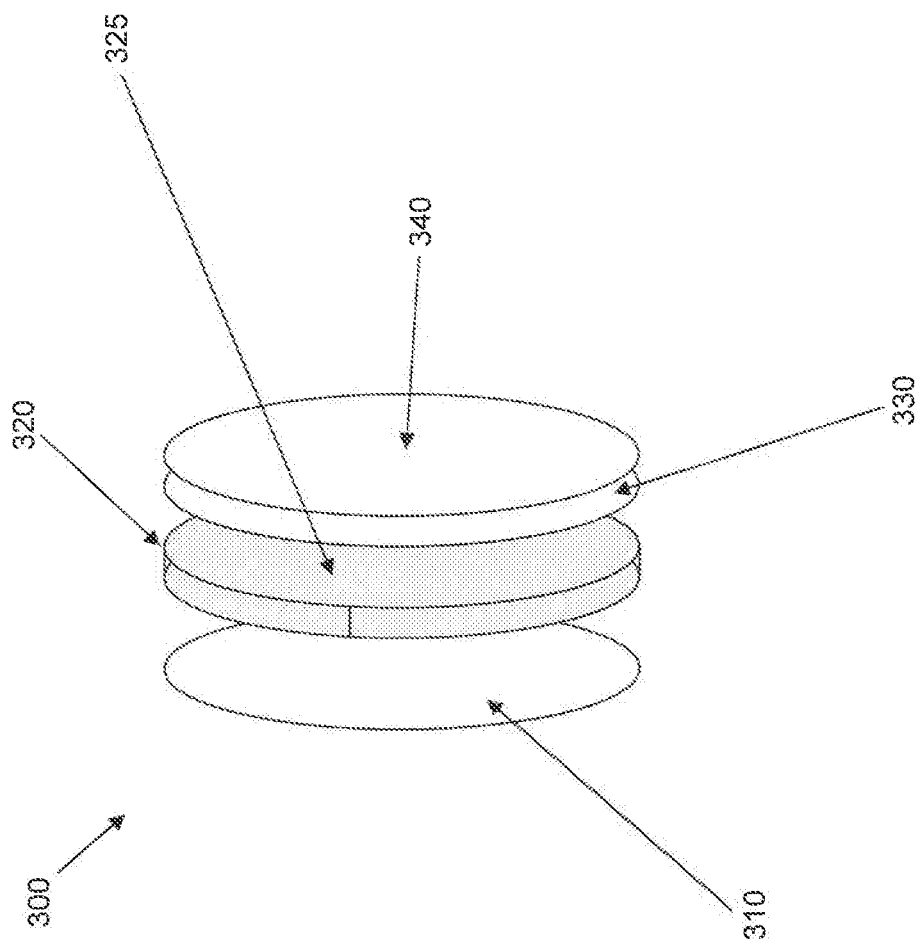
FIG. 3 shows a device 300 having a photochromic optic, and one heating layer.

FIG. 3 shows a device 300 having a photochromatic optic, and one heating layer. Device 300 includes, in order from closest to a wearer to farthest, a first scratch resistant layer 310, a photochromatic optic 320, a second heating element layer 330 and a second scratch resistant layer 340. Optic front 325 is the side of photochromatic optic 320 disposed farthest from a wearer.

Figure 4:
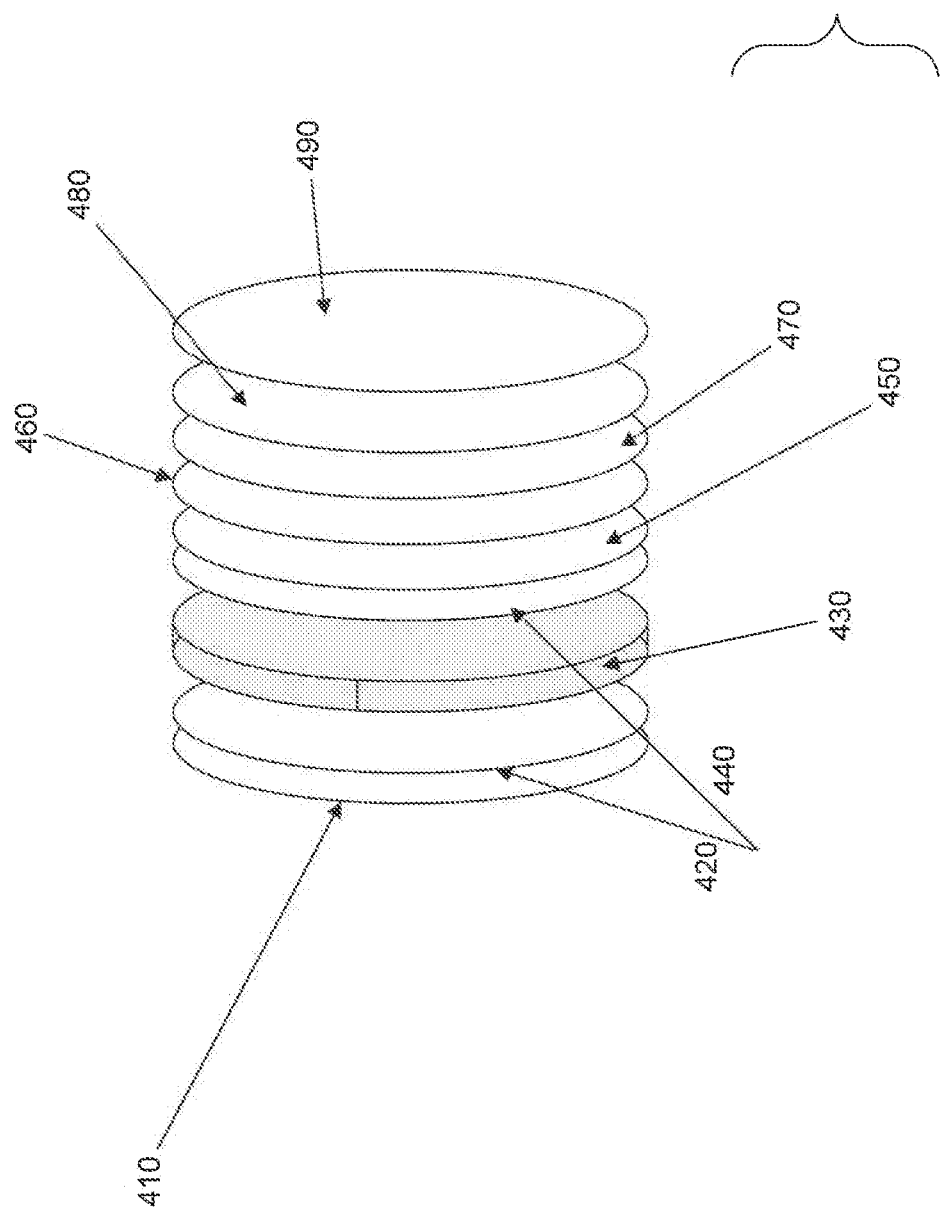
FIG. 4 shows a device 400 having a single photochromatic layer and two heating layers.

FIG. 4 shows a device 400 having a single photochromatic layer and two heating layers. The photochromatic layer is separate from the optic. Device 400 includes, in order from closest to a wearer to farthest, a first anti-reflection coating 410, a first hard coat layer 420, an optic 430, a second hard coat layer 440, a first heating layer 450, a photochromatic layer 460, a second heating layer 470, a hard coat layer 480 and a second anti-reflection coating 490.

Figure 5:
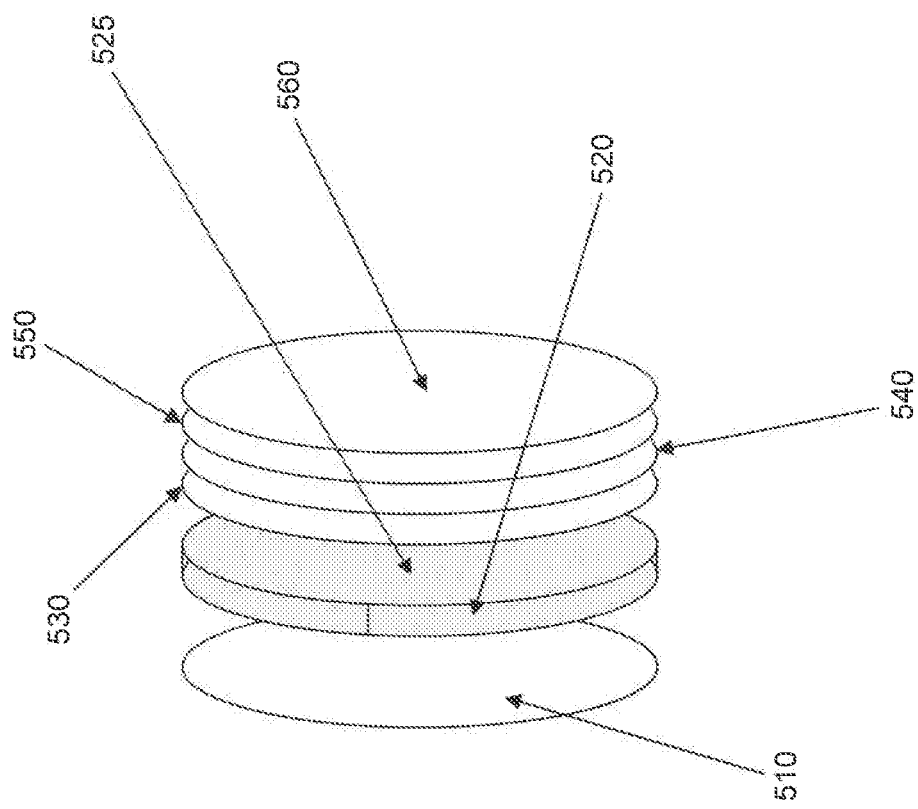
FIG. 5 shows a device 500 having a single photochromatic layer, an SiO2 layer and a single heating layer.

FIG. 5 shows a device 500 having a single photochromatic layer, an SiO2 layer and a single heating layer. The photochromatic layer is separate from the optic. Device 500 includes, in order from closest to a wearer to farthest, a first scratch resistant layer 510, an optic 520, an SiO2 layer 530, a heating layer 540, a photochromatic layer 550 and a second scratch resistant layer 560. Optic front 525 is the side of photochromatic optic 520 disposed farthest from a wearer.

Figure 6:
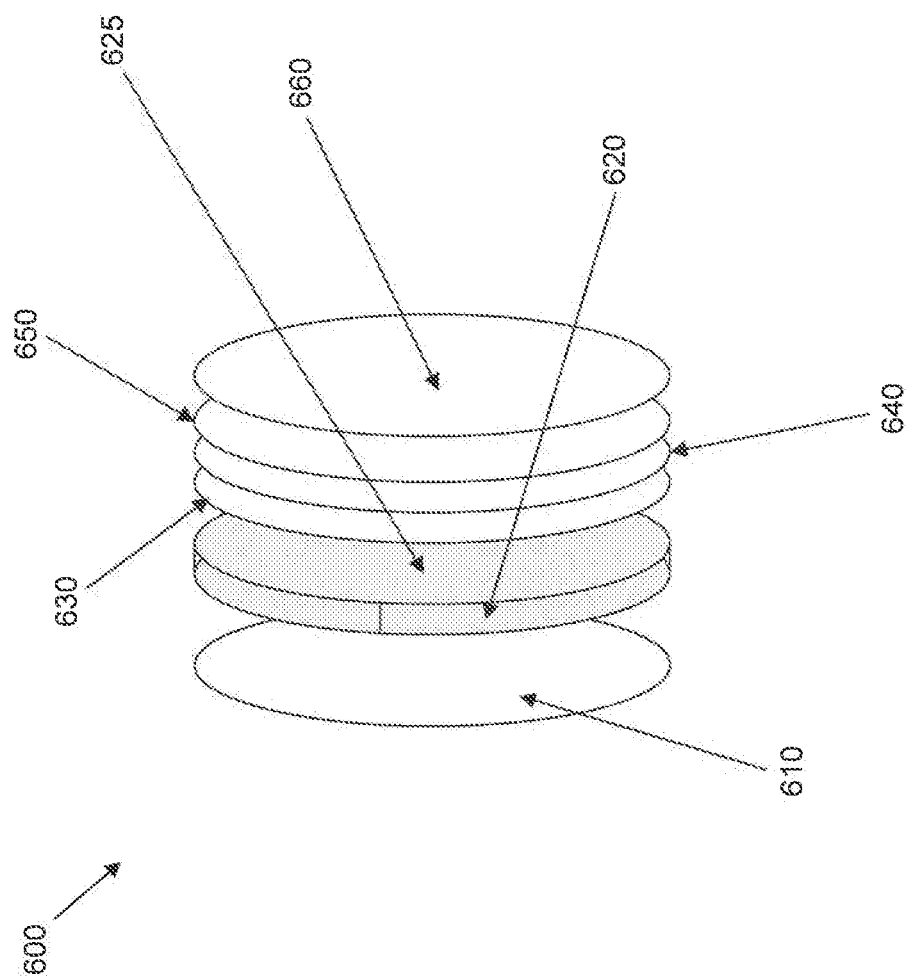
FIG. 6 shows a device 600 having two photochromatic layers, and a single heating layer.

FIG. 6 shows a device 600 having two photochromatic layers, and a single heating layer. The photochromatic layer is separate from the optic. Device 600 includes, in order from closest to a wearer to farthest, a first scratch resistant layer 610, an optic 620, a first photochromatic layer 630, a heating element layer 640, a second photochromatic layer 650 and a second scratch resistant layer 660. Optic front 625 is the side of photochromatic optic 620 disposed farthest from a wearer.

Figure 7:
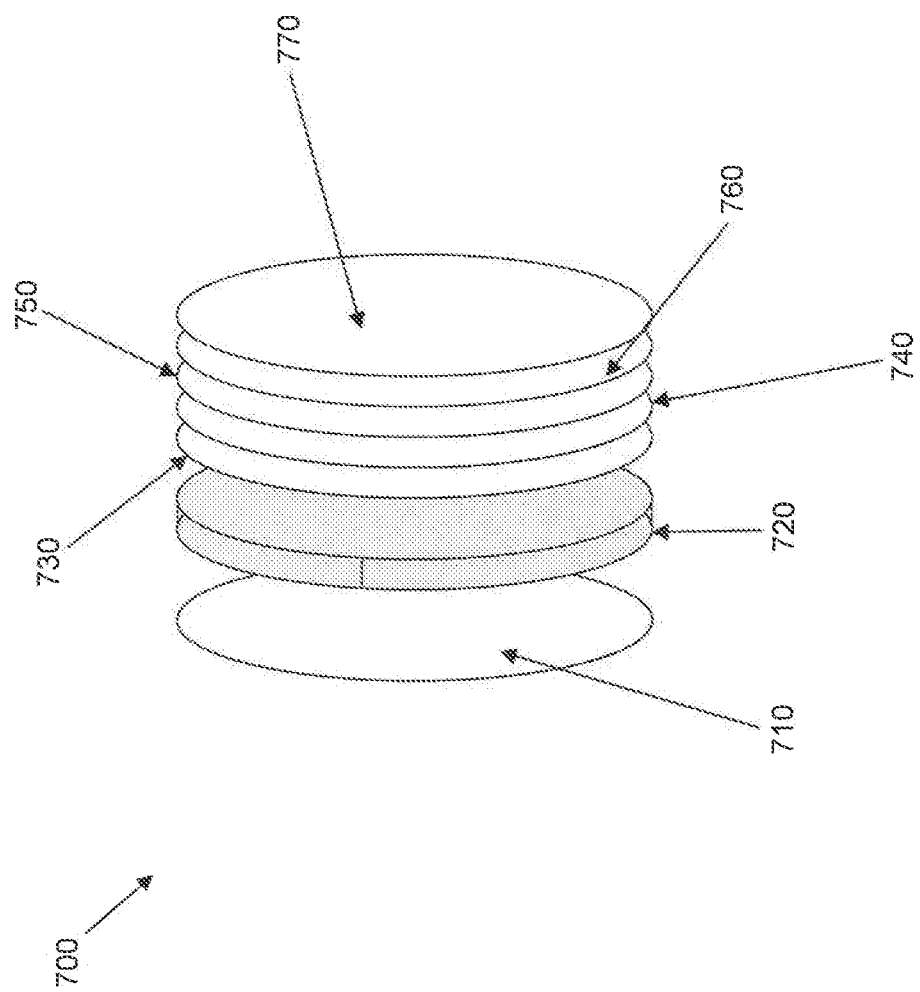
FIG. 7 shows a device 700 having a single photochromatic layer, an SiO2 layer and a single heating layer.

FIG. 7 shows a device 700 having a single photochromatic layer, an SiO2 layer and a single heating layer. The photochromatic layer is separate from the optic. The optic has optical power. Device 700 includes, in order from closest to a wearer to farthest, a first scratch resistant layer 710, an optic 720, a hard coat layer 730, a heating element layer 740, an SiO2 layer 750, a photochromatic layer 760 and a second scratch resistant layer 770.

Figure 8:
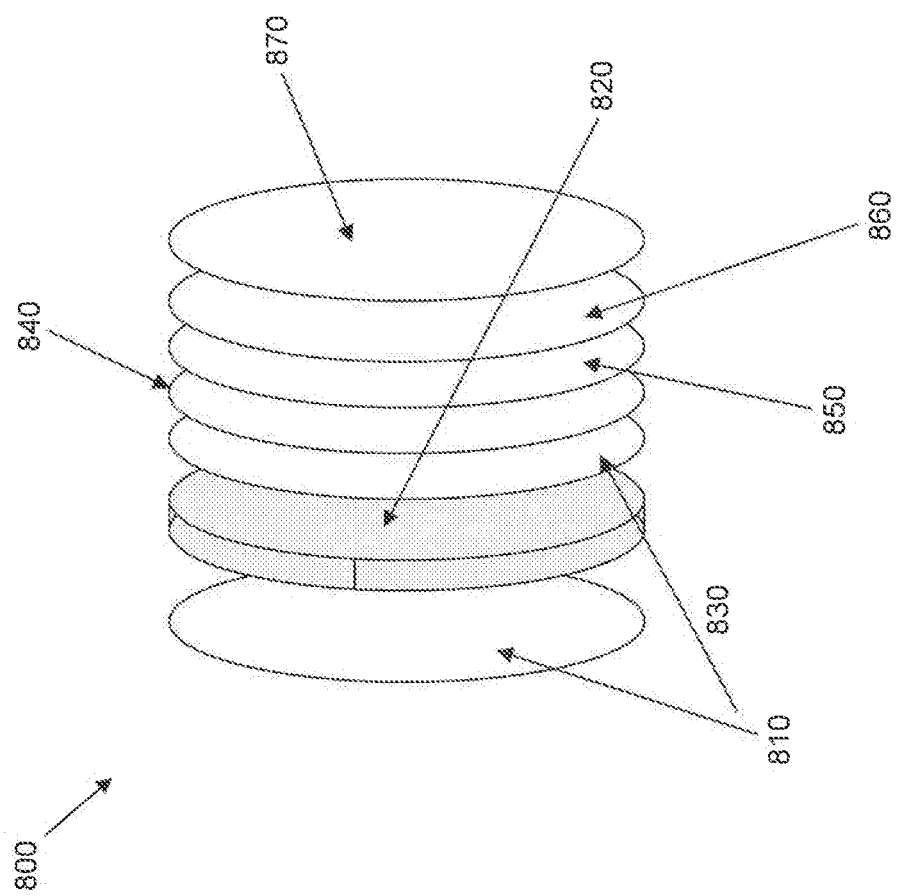
FIG. 8 shows a device 800 having a single photochromatic layer, an SiO2 layer and a single heating layer.

FIG. 8 shows a device 800 having a single photochromatic layer, an SiO2 layer and a single heating layer. The photochromatic layer is separate from the optic. Device 800 includes, in order from closest to a wearer to farthest, a first scratch resistant layer 810, an optic 820, a second scratch resistant layer 830, a photochromatic layer 840, an SiO2 layer 850, a heating element layer 860 and a third scratch resistant layer 870.

The degree of loading of the photochromic polymer layer with electrical conductive particles allow for being able to adjust the electrical resistance to that of a level that is acceptable taking into consideration the degree of resistance required. Also the thickness of the polymer layer comprising the photochromic agent or agents contributes to the level of electrical resistance. The conductive particles can be, by way of example only, those of carbon nano-tubes, conductive polymer, nano-particles. In certain embodiments the polymer matrix comprising the photochromic agent or agents comprises conductive polymers. In certain cases, no electrical conductive particles are utilized. An embodiment of a heating element that comprises a photochromic electrical resistant layer provides a very efficient means of heating the photochromic layer.

Certain embodiments comprise a thermal switchable polarizing element or layer in addition to, or in substitution of that of the photochromic layer. Also certain embodiments of utilize a photochromic polarizing layer or element. Such a polarizing element or layer is taught in U.S. Pat. Nos. 7,978,391 and 7,505,189 which are incorporated by reference herein. However, embodiments disclosed herein utilize a very precise and reliable heating element and heat management system as opposed to heat being provided by the highly variable (non-reliable and non-predictable) actinic radiation as taught in U.S. Pat. Nos. 7,978,391 and 7,505,189. Some embodiments disclosed herein provide for a system comprised of one or more mostly transparent electronic heating element or elements, an energy source, optic, photochromic layer or optic, controller, switch, and one or more sensors. In certain embodiments disclosed herein a timer is incorporated. In other embodiments disclosed herein a thermal switchable polarizing element is included. And in still other embodiments disclosed herein an electronic cooling element or layer is included within or adjacent to the photochromic article. The electronic cooling element or layer may be utilized to switch the polarizing layer back to its non-thermal switched state. In addition, the electronic cooling element or layer can be electrically activated in an outdoor environment to allow for the photochromic layer or optic to remain darker in high temperature outdoor environment.

In some embodiments, the electronic cooling element or layer is comprised of a mostly transparent thermoelectric cooler (TEC), sometimes called a thermoelectric module or Peltier module, is a semiconductor-based electronic component that functions as a small heat pump. By applying a low voltage DC power source to a TEC, heat flows via the semiconductor elements from one face to the other. The electric current cools one's face and simultaneously heats the opposite face. Consequently, a given face of the device can be used for heating or cooling by reversing the polarity of the applied current. The characteristics of TECs make them highly suitable for precise temperature control applications and where space limitations and reliability are paramount or refrigerants are not desired.

The mostly transparent thermoelectric cooler utilized in some embodiments is comprised of a first layer of ITO, a second layer of silicon, a third layer of germanium, a fourth layer of ITO. See FIG. 16. The thickness of the silicon and germanium layers ranges from 200 angstroms to 2,000 angstroms each. The layers are deposited by deposition such as by way of example only sputtering. It should be pointed out that thin layers of SiO2 can be also provided if needed over an ITO layer or layers. Furthermore, other mostly transparent conductive materials can be provided for the outer electrode layers as opposed to ITO such as, by way of example only, conductive polymers.

By placing a positive charge next to the germanium and the negative charge next to the silicon the flow of heat would be from the germanium to the silicon. It is also possible to put a positive charge next to the silicon and the negative charge next to the germanium and reverse the flow of heat in the opposite direction. Therefore by having the mostly transparent thermoelectric cooler located, by way of example only, with its side having the positive charge closest to a photochromic layer it is possible to pull heat off (thus cool down) the photochromic layer outside in sunlight and thus help reduce the internal temperature of the photochromic polymer layer. This will then allow for the lens to remain darker outdoors in sunlight and further less temperature sensitive. The mostly transparent thermoelectric cooler can also be located next to a thermally activated polarized layer or element. In this case the thermoelectric cooler can be utilized to thermally switch the order of the liquid crystal by cooling, thus turning on or off the polarized state. By reversing the charge or polarity of the thermoelectric cooler it will become a heater and can heat the thermally polarized layer or element. This could also be true for heating a photochromic layer to hasten the clearing or lightening time.

A temperature differential of 1 C to 50 C can be obtained by this method. In addition to silicon and germanium other bimetallic couples can be also be used such as, by way of example only, cadmium silicide-cadmium telluride. When utilized in lenses or optics for eyeglasses or eyewear these stacks may be applied along a plane normal to direction of the incidence of light, or parallel to the direction of the incidence of light. Or said another way can be applied to the edges of a lens or to the sides of the lens in optical communication with the line of sight of the eye. The internal temperature of the layer or optic comprising the photochromic agent or agents will be hotter than that of the outside ambient temperature and therefore the heat can be pulled/transported from the photochromic layer or optic towards that of the air surrounding the eyeglasses or eyewear on the front or sides of the lens or it can be pulled/transported from the photochromic layer or optic back towards the back bulk of the lens closest to the eye of the wearer.

FIG. 16 shows an electronic cooling element 1600. Heat flows from a front of the lens 1610 to a back of the lens 1620. The cooling element includes, in order, a first layer of ITO 1630, a layer of silicon 1640, a layer of germanium 1650 and a second electrode 1660. Other appropriate transparent materials may be used.

Figure 17:
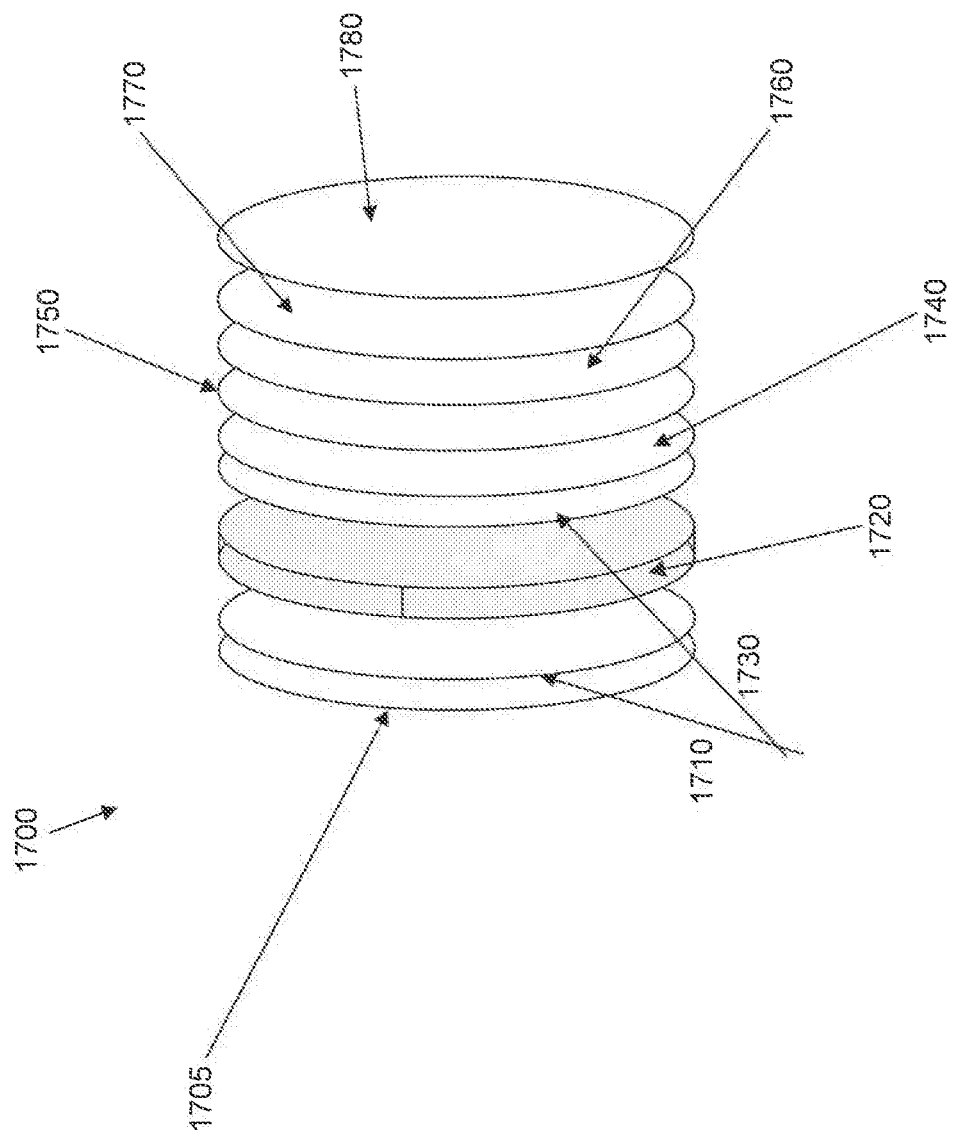
FIG. 17 shows a lens 1700 incorporating a cooling element, a heating element, an optic, and a photochromic layer.

FIG. 17 shows a lens 1700 incorporating a cooling element, a heating element, an optic, and a photochromic layer. Lens 1700 includes, from the back of the lens (closest to the eye) to the front, a first anti-reflection coating layer 1705, a first hard coat layer 1710, an optic 1720, a second hard coat layer 1730, a cooling element 1740, a photochromatic layer 1750, a heating element 1760, a hard coat layer 1770 and a second anti-reflection coating layer 1780. Cooling element 1740 may have further layers, such as those illustrated in FIG. 16. FIG. 17 corresponds to the tenth embodiment.

Figure 18:
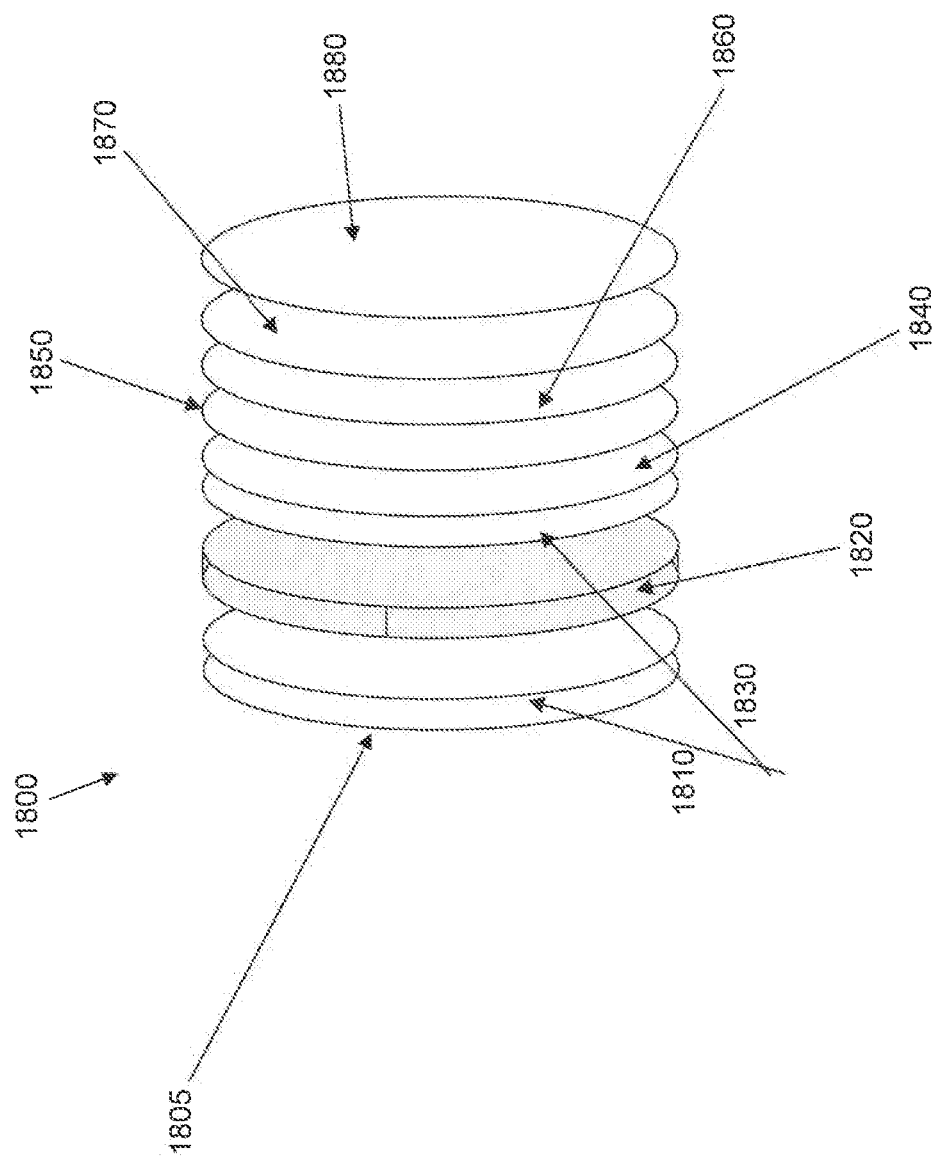
FIG. 18 shows a lens 1800 incorporating a thermally switchable polarized layer, a heating element, an optic, and a photochromic layer.

FIG. 18 shows a lens 1800 incorporating a thermally switchable polarized layer, a heating element, an optic, and a photochromic layer. Lens 1800 includes, from the back of the lens (closest to the eye) to the front, a first anti-reflection coating layer 1805, a first hard coat layer 1810, an optic 1820, a second hard coat layer 1830, a thermally switchable polarized layer 1840, a photochromatic layer 1850, a heating element 1860, a hard coat layer 1870 and a second anti-reflection coating layer 1880. FIG. 18 corresponds to the eleventh embodiment.

Embodiments disclosed herein comprise a system which includes the photochromic optic or layer and associated electronics. While some embodiments disclosed herein discuss the optic or layer comprising a photochromic agent or agents being that of a polymer layer, such a layer or optic in certain embodiments could be that of glass. Some embodiments are a very elegant way to solve a pressing long term unmet need. It should be understood when the term optic is used in this patent application it is meant to be any optic that transmits light. By way of example only; vehicle windshield, window, motor cycle helmet face shield, non-prescription eyeglasses, prescription eyeglasses both of static focus and electronic focus, intra-ocular lens, contact lens. Embodiments can also be used depending upon the level of photochromic loading and or dye chemistry for creating a light altering range of transmission spectra that can be moved within a range up or down the desired level of light transmission or blockage desired.

Some embodiments contemplate the use of a timer. The timer can be added to automatically switch the heating member or element on and off. In certain cases the heating element continuously cycles between being on and off. The time of switch can also be altered depending upon the consumer needs or requirements. Thus the amount of darkness or lightness of the photochromic optic behind the windshield of a car or other vehicle can be altered or controlled manually by the wearer or can be placed into an automatic mode. The purpose of the timer is to not allow the heating element or member to heat the optic's substrate material housing the photochromic agent beyond a level whereby the material becomes too soft and the photochromic agent begins to bleach. By not allowing the material comprising the photochromic agent to become overheated (meaning heated beyond a specific point) the level of darkening and the speed of darkening can be optimized.

This is due to the fact that the heating element or member allows for much faster switch between the two states of: darkening and lightening, but to maximize the degree of darkening or lightening the heating element must take strongly into consideration the temperature of the optic's substrate housing the photochromic agent and the TG of the polymer material associated therewith.

Some embodiments contemplate a temperature sensor which may or may not be used in association with a timer. Once a heating temperature is achieved for a given optic's substrate comprising a photochromic agent (this can be measured on its surface or internal to the surface) the heating element or member is turned off. And once the temperature falls back to a lower level if need be the heating element can be turned back on. This cycle can be continuous for a preset period of time or manually set and altered. Once again this can be achieved automatically if desired (meaning by way of example only, hands free). Some embodiments contemplate the use of a thermocouple.

Electricity can be supplied by any applicable energy source means of providing such electricity such as by way of example only, fuel cell, battery, inductively chargeable battery, AC electrical current, DC electrical current, solar cell, motion, kinetic energy, chemical, mechanical. With eyeglass applications it has been found that for each photochromic lens two small Varta V6HR batteries will allow for heating the ITO heating element 10 degrees C. above the ambient room temperature approximately 25 times before needing to be recharged. The energy source can be located within the optic, lens or article, on the optic, lens, or article or removed from the optic, lens or article. It should be pointed out with eyewear applications that much if not all of the electronics other than that of the heating element can be off loaded and contained/housed within, by way of example only, an eyeglass frame, ski goggle, motor cycle helmet.

The term optic, substrate, lens, for the purposes of this disclosure all have the same meaning. The term bleach or bleaching as used herein is meant to have the same meaning as that of clearing or lightening up of the photochromic tinted layer or matrix.

In a first embodiment a performance enhanced photochromic optic that comprises a heating element, by way of example only, that of a mostly transparent electrically enabled heated surface or layer is located close to or adjacent to a layer of material comprising a photochromic agent. The mostly transparent electrically enabled heated surface or layer is comprised of a layer, by way of example only, of thin glass or plastic having a heating element or member on its surface or buried within. The heating element of member can be that, by way of example only, of indium tin oxide (ITO) which is capable of being energized or activated by the application of electricity and de-energized or de-activated by the removal of electricity. Any electrically conductive material (including that of a conductive polymer) can be used to make the heating element provided it meets the transparency needs for the performance of the optic. In a preferred embodiment (see FIG. 1 for example) the heating element is located on the side of the layer or optic comprising the photochromic agent closest to the eye of the user or furthest away from the incident UV light waves. In another preferred embodiment two heating elements are used such that one is on each side of the layer or optic comprising the photochromic agent. In still another embodiment one heating element is located on the side of the layer or optic comprising the photochromic agent and closest to the incident UV and/or long wavelength blue light. The electricity can be supplied by any applicable means of providing such electricity such as by way of example only, fuel cell, battery, inductively chargeable battery, AC electrical current, DC electrical current, solar cell, motion, kinetic energy, chemical, mechanical. In this first embodiment the heating element is turned on or off by the user; meaning the person using the optic can simply turn the heating element on or off at will depending upon the level of photochromic performance desired.

In a second embodiment a performance enhanced photochromic optic that comprises a heating element, by way of example only, that of a mostly transparent electrically enabled heated surface or layer is located close to or adjacent to a layer of material comprising a photochromic agent. The mostly transparent electrically enabled heated surface or layer is comprised of a layer, by way of example only, of thin glass or plastic having a heating element or member on its surface or buried within. The heating element or member can be that, by way of example only, of indium tin oxide which is capable of being energized or activated by the application of electricity and de-energized or de-activated by the removal of electricity. Any electrically conductive material (including that of a conductive polymer) can be used to make the heating element provided it meets the transparency needs for the performance of the optic. In a preferred embodiment the heating element is located on the side of the layer or optic comprising the photochromic agent closet to the eye of the user or furthest away from the incident UV light waves. In another preferred embodiment (see FIG. 2 for example) two heating elements are used such that one is on each side of the layer or optic comprising the photochromic agent. In still another embodiment one heating element is located on the side of the layer or optic comprising the photochromic agent and closest to the incident UV and/or long wavelength blue light. The electricity can be supplied by any applicable means of providing such electricity such as by way of example only, fuel cell, battery, inductively chargeable battery, AC electrical current, DC electrical current, solar cell, motion, kinetic energy, chemical, mechanical.

In this second embodiment the heating element is turned on or off by way of a photo-detector or photo-sensor located on the side of the photochromic layer or surface closest to the user. The photo-sensor can, but does not always have to be linked to a controller. The controller can be by way of example only that of an ASIC. The sensor determines the level of light transmission or blockage and communicates this level to the controller. The controller then turns on or off the heating element.

In a third embodiment a performance enhanced photochromic optic that comprises a heating element, by way of example only, that of a mostly transparent electrically enabled heated surface or layer is located close to or adjacent to a layer of material comprising a photochromic agent. The mostly transparent electrically enabled heated surface or layer is comprised of a layer, by way of example only, of thin glass or plastic having a heating element or member on its surface or buried within. The heating element of member can be that, by way of example only, of indium tin oxide which is capable of being energized or activated by the application of electricity and de-energized or de-activated by the removal of electricity. Any electrically conductive material (including that of a conductive polymer) can be used to make the heating element provided it meets the transparency needs for the performance of the optic. In a preferred embodiment the heating element is located on the side of the layer or optic comprising the photochromic agent closet to the eye of the user or furthest away from the incident UV light waves. In another preferred embodiment (see FIG. 2 for example) two heating elements are used such that one is on each side of the layer or optic comprising the photochromic agent. The use of the two heating elements (one on each side of the photochromic layer) allows for the photochromic layer to provide the electrical resistance needed for the ITO layers on the front and back of the photochromic layer. In still another embodiment (see FIG. 3 for example) one heating element is located on the side of the layer or optic comprising the photochromic agent and closest to the incident UV and/or long wavelength blue light. The electricity can be supplied by any applicable means of providing such electricity such as by way of example only, fuel cell, battery, inductively chargeable battery, AC electrical current, DC electrical current, solar cell, motion, kinetic energy, chemical, mechanical.

In this third embodiment the heating element is turned on or off by way of a photo-detector or photo-sensor located on the side of the photochromic layer or surface closest to the user. The photo-sensor can, but does not always have to be linked to a controller. The controller can be by way of example only that of an ASIC. The sensor determines the level of light transmission or blockage and communicates this level to the controller. The controller then turns on or off the heating element. This third embodiment further comprises as part of the controller or separate to the controller a timer. The timer can the set the timing of an ongoing continuous cycle or the timer can be set to turn on and off the heating element after specified period of time once a desired level of light transmission or blockage is reached.

In a fourth embodiment (not illustrated) a composite optic having two layers or optics comprising a photochromic agent or agents are placed such that they are both in the optical path of Ultra Violet radiation and/or violet (long blue wavelength) radiation. These two layers or optics are located such that layer #1 or optic #1 is closest to the incident UV radiation and layer #2 or optic #2 is located behind layer #1 or optic #1 and further away from the incident UV and/or long blue wavelength light wavelengths and closest to the eye of the user. Layer #1 or optic #1 is more reactive or sensitive to UV light and/or long blue light wavelengths than layer #2 or optic #2 and is comprised of a material having a lower TG than of layer #2 or optic #2 and/or has domains of lower TG material within its higher TG material structure that allow for the photochromic agent to be much more reactive and sensitive to UV light and/or long blue light wavelengths (within the domains) than that of layer #2 or optic #2. In addition a heating element is close or adjacent to the surface of layer #1 or optic #1.

In this fourth embodiment the heating element is turned on or off by way of a controller coupled to a sensor. The controller in certain cases alternates the heating element on and off such to allow periodic transmission of UV light and/or long wavelength blue light such to penetrate layer #1 or optic #1 with a sufficient amount of transmission thus to darken layer #2 or optic #2. By doing this the net darkening of the composite optic is enhanced due to the photochromic layers being enhanced and the darkening and clearing times are also enhanced. The thickness and TG of layer #1 or optic #1 is optimized to allow for this transmission upon the application of heat thus raising the temperature of layer #1 or optic #1.

In a fifth embodiment (not illustrated) a performance enhanced photochromic optic that comprises a heating element, by way of example only, that of a mostly transparent electrically enabled heated surface or layer is located close to or adjacent to a layer of material comprising a photochromic agent. The mostly transparent electrically enabled heated surface or layer is comprised of a layer, by way of example only, of thin glass or plastic having a heating element or member on its surface or buried w° thin. The heating element of member can be that, by way of example only, of indium tin oxide which is capable of being energized or activated by the application of electricity and de-energized or de-activated by the removal of electricity. Any electrically conductive material (including that of a conductive polymer) can be used to make the heating element provided it meets the transparency needs for the performance of the optic. In a preferred embodiment the heating element is located on the side of the layer or optic comprising the photochromic agent closet to the eye of the user or furthest away from the incident UV light waves. In another preferred embodiment two heating elements are used such that one is on each side of the layer or optic comprising the photochromic agent. In still another embodiment one heating element is located on the side of the layer or optic comprising the photochromic agent and closest to the incident UV and/or long wavelength blue light.

In this fifth embodiment the heating element is turned on or off (directly or indirectly) by way of a thermo-sensor located either adjacent to the surface of the optic's substrate comprising a photochromic agent or buried within the optic's substrate comprising a photochromic agent. The photo-sensor can, but does not always have to, be linked to a controller. The controller can be by way of example only that of an ASIC. The sensor determines the temperature of the optic's substrate material which comprises the photochromic agent and communicates this level to the controller. The controller then turns on or off the heating element. This action can be continuous in an ongoing cycle or for a specific time interval.

In a sixth embodiment (see FIG. 6) a composite optic having layer #1 or optic #1 and layer #2 or optic #2 have the same TG but either or both can have domains within the lens material such that layer #2 or optic #2 is more photoreactive/sensitive to lower levels of light than layer #1 or optic #1. In certain cases in this sixth embodiment a heating element is placed between layer #1 or optic #1 and that of layer #2 or optic #2. In other cases in this fifth embodiment the heating element is located on or near to the front surface of layer #1 or optic #1. A controller which is coupled to a sensor directs the heating element to turn on and off to allow for the appropriate transmission of UV light and/or long wavelength blue light to darken layer #2 or optic #2 as well as layer #1 or optic #1. By doing this the net darkening of the composite optic is enhanced due to the photochromic layers being enhanced and the darkening and clearing times are also enhanced. The thickness and TG of layer #1 or optic #1 is optimized to allow for this transmission upon the application of heat thus raising the temperature of layer #1 or optic #1. Layer #1 corresponds to first photochromatic layer 630 of FIG. 6, and Layer #2 corresponds to second photochromatic layer 650. FIG. 6 illustrates the case where the photochromatic layers are separate from the optic, but the same concept may be applied where there are two photochromatic optics, optic #1 and optic #2.

In a seventh embodiment (see FIG. 4, for example) an electrical potential is applied across a layer of material comprising a photochromic agent. Such a layer must have a relatively low dynamic viscosity or modulus so that the molecules that make up the photochromic agent are free to tumble and or rotate in order to align them to the direction of the applied potential. The electrical potential is created by two mostly transparent electrodes each being on opposing sides of the layer or optic housing the photochromic agent. By applying the electrical potential to the photochromic agent it is possible to alter the performance in a positive way of the photochromic agent and thus the darkening of lightening of the optic. The structure of embodiment seven provides not only an electrical potential being applied across the photochromic layer but also the production of heat.

In an eight embodiment (see FIG. 7, for example) a composite lens or optic comprises an outer scratch resistant layer being of the thickness 2 microns to 5 microns commercially applied to lens blanks (semi-finished or finished). The layers under this hard coat layer starting from the front of the lens proceeding inward and backward are: a photochromic polymer layer of a thickness between approximately 25 microns and 200 microns with a more preferred thickness of approximately 30 microns to 125 microns, a SiO2 layer of approximately 2 microns to 20 microns with a more preferred thickness of approximately 3 microns to 10 microns, a ITO heating element of a thickness of 0.1 microns to 1.0 microns and more preferred 0.1 microns to 0.5 microns (which can be continuous or in the form of an oven burner like design (see figures) across the surface of the hard coating layer (by way of example only SiO2) which it is deposited upon, a hard coating layer that can be between 1 micron and 10 microns with a more preferred thickness of 1 microns and 5 microns. The hard coat layer is located adjacent to that of the front surface of an optic that comprises the bulk thickness matrix making up most of the lens. The optic by way of example only is MR 10 (by Mitsui) having an index of refraction of 1.67. It is the front of this optic which sets the curvature for that of the front curve of the lens as all the layers just mentioned are applied upon it. This is because all of the layers added to the front surface of the optic for the most part are applied in a conformal manner. The back surface of the optic can be that of an unfinished surface (when utilized as that of a semi-finished lens blank or finished when utilized as a finished lens blank) also comprises a hard coat and an anti-reflection coating can then be further applied to the front and back surfaces.

In an experiment utilizing embodiment #8, a first photochromic article containing a photochromic layer comprising a photochromic agent contributing to a grey tint is darkened to its darkest state outside in sunlight when the outdoor temperature is 95 degrees F. The fully darkened first photochromic article is measured to have a transmission of approximately 30%. The first photochromic article comprises a layered structure as illustrated in FIG. 7. Once the first photochromic article was darkened to its darkest state the transmission of approximately 30% outdoors in sunlight the photochromic article was returned indoors whereby the ambient temperature was 70 degrees F. The heating element shown in FIG. 7 was activated immediately upon returning indoors such to heat the darkened first photochromic coating layer to a temperature of approximately 120 F or that of 10 C above an indoor ambient room temperature of 70 F for a period of 2 minutes. The darkened coating (and thus the first photochromic article) lightened or cleared in its tint color to have a light transmission of 85% in approximately 2 minutes. To provide a comparison the same experiment was then repeated with a second photochromic article without the activation of the heating element (thus applying no heat) and the time for clearing to the same point of light transmission was in excess of 15 minutes. All variables of this comparison where exactly the same with the exception that the first photochromic article comprised a heating element.

In a ninth embodiment which is identical to that of embodiment #8 of a photochromic article which comprises a heating element with the exception that the polymer matrix comprising the first photochromic article has a higher TG than that of the second photochromic article. Thus the experiment of embodiment #8 was repeated with a photochromic article containing a photochromic layer comprising a photochromic agent contributing to a grey tint being darkened to its darkest level outside in sunlight when the outdoor temperature is 100 degrees F. The fully darkened first photochromic article is measured to have a transmission of approximately 20%. The first and second photochromic articles comprised a layered structure as illustrated in FIG. 7. Once the first photochromic article was darkened to its darkest level of transmission of approximately 20% outdoors in sunlight the photochromic article was returned indoors whereby the ambient temperature was 70 degrees F. The heating element shown in FIG. 7 was activated immediately upon returning indoors such to heat the darkened first photochromic coating layer to a temperature of approximately 120 F or 10 C above an indoor ambient room temperature of 70 F for a period of 2 minutes. The darkened coating (and thus the first photochromic article) lightened or cleared in its tint color to have a light transmission of 85% in approximately 2 minutes. To provide a comparison the same experiment was then repeated with the second photochromic article without the activation of the heating element (thus applying no heat) and the time for clearing to the same point of light transmission was in excess of 15 minutes. All variables of this comparison were exactly the same with the exception of the heating element and the TG of the polymer matrix. The first photochromic article comprised a heating element and a higher TG polymer matrix housing the photochromic agent. The second photochromic article did not comprise a heating element and was of a lower TG than that of the first photochromic article.

In a tenth embodiment an electronic cooling element is located within the photochromic lens. The electronic cooling element is located such that its negative charge or polarity faces the back of the lens and the positive charge or polarity faces the photochromic layer. In this embodiment the heating element is located in front of the photochromic layer closer to the front of the lens and the electronic cooling element is located behind (in back of the photochromic layer), but very close, if not adjacent to the photochromic layer. Thus the tenth embodiment provides a photochromic lens or article that allows for heating the photochromic lens, by way of example only, when #1 going from in doors to outdoors if needed to slightly soften the matrix of the photochromic layer to speed up the darkening effect and/or #2 going inside from outside to heat up and bleach out the darkening effect provided by the photochromic layer thus speeding up indoor light transmission or said another way speeding up the tint clearing time. In addition, the electronic cooling element provides for, by way of example only, maintaining the degree of darkening outdoors for a longer period of time in a high temperature outdoor environment of 80 F and above. See FIG. 17. It should be pointed out that for cold environments it is possible to put the cooling element in front of the photochromic layer and the heating element behind the photochromic layer closer to the back of the lens.

In an eleventh embodiment a thermally switchable polarizing element is located within the photochromic lens. In this eleventh embodiment a thermally switchable or activated polarizer layer is located behind the photochromic layer. A heating element is located between the photochromic layer and that of the thermally switchable polarizer layer. The thermally switchable layer is comprised of polymer dispersed dichroic liquid crystal without a photochromic agent. The photochromic agent or agents are incorporated into the photochromic polymer layer. The photochromic layer is located anterior or in front of that of the thermally switchable polarized layer. Thus the eleventh embodiment provides a photochromic lens or article that allows for heating the photochromic lens, by way of example only, when #1 going from in doors to outdoors if needed to slightly soften the matrix of the photochromic layer to speed up the darkening effect, and/or #2 going inside from outside to heat up and bleach out the darkening effect provided by the photochromic layer thus speeding up indoor light transmission or said another way speeding up the tint clearing time, and/or #3 when in a car or a vehicle behind a UV blocking or filtering windshield to provide heat to thermally switch a polarized layer.

In addition, the thermally polarized layer provides for, by way of example only, #1 a polarized layer that reduces glare and reflected light when outdoors in sunlight in addition to that of the tint darkening contribution of the photochromic layer, and/or #2 a polarized layer that can be switched on and off thermally in the absence of a proper amount of UV light required to properly darken the photochromic layer such as behind that of a UV blocking or filtering windshield. See FIG. 18.

The outer protective layer placed over that of the photochromic layer can be that of Non-limiting examples of protective coatings can include abrasion-resistant coatings comprising organo silanes, abrasion-resistant coatings comprising radiation-cured acrylate-based thin films, abrasion-resistant coatings based on inorganic materials such as silica, titania and/or zirconia, organic abrasion-resistant coatings of the type that are ultraviolet light curable, oxygen barrier-coatings, UV-shielding coatings, and combinations thereof. For example, the protective coating can comprise a first coating of a radiation-cured acrylate-based thin film and a second coating comprising an organo-silane. Non-limiting examples of commercial protective coatings products include SILVUE® 124 and HI-GARD® coatings, available from SDC Coatings, Inc. and PPG Industries, Inc., respectively.

In a twelfth embodiment a transparent heat management system comprising a heating element is applied to either an edged or non-edged lens having been fabricated to the optical power required for a wearer. The heating element or member can be that, by way of example only, of indium tin oxide which is capable of being energized or activated by the application of electricity and de-energized or de-activated by the removal of electricity (see FIGS. 9 and 10, for example). Any electrically conductive resistive material (including that of a conductive polymer) can be used to make the heating element provided it meets the conductive, resistance, and transparency needs for the performance of the optic or lens as well as that of the heating element. In addition, if the electrically conductive material is applied forward towards the front of the lens as compared to the layer or matrix where the photochromic agent or agents are located the heating element must allow for the transmission of UV light. By this it is meant that an amble transmission of UV light is required to strike a photochromic agent or agents found in a photochromic lens whereby the UV light passes thru the heating element before striking the photochromic agent or agents. Thus the electrically conductive resistive material utilized within the heat management system must be selected so to transmit enough UV light to cause the photochromic agent to alter its tint darkening.

In certain, but not all, cases of the twelfth embodiment an edged lens comprising a photochromic agent (a photochromic lens) may be ordered by an optical shop or optical dispensary (which sell eyeglass frames and lenses) from an optical laboratory which is not on the site of the optical shop or optical dispensary which grinds and polished the lens the prescription of the wearer and then edged it to the shape of the eyeglass frame which was selected by the wearer. It should be pointed out that in the case of single vision lenses and certain bifocal or progressive addition lenses are stocked in a finished optical power form it is not necessary to grind and polish or digitally surface (free form) the prescription. Also in certain cases the optical laboratory can be located on the site of the optical shop. Also in certain cases the optical shop or optical dispensary can be that of a commercial location available on the internet. In still other cases the wearer of a photochromic lens after having received their photochromic eyewear (photochromic lens and the eyeglass frame housing a photochromic lens) from one of an optical shop, optical dispensary, optical laboratory, internet decides to have the performance of their photochromic eyewear enhanced. In this case the wearer can send their photochromic eyewear to a converter whereby a transparent heat management system is applied.

One approach to provide photochromatic lenses having a heat management system to a consumer is illustrated in FIG. 30. In a first step 3001, the consumer orders an electronic photochromic lens from an eyecare provider (ECP). In a second step 3002, a lab processes a standard (no heating element) photochromic blank to prescription and edges, and sends to a converter with the frame. In a third step 3003, the converter converts the lens to an electronic photochromic lens. The converter may add other optional layers, such as antireflective coating. The converter electrically connects the lens to a controller, and mounts the lens into frames. The converter ships the lens to the ECP. In a fourth step 3004, the ECP dispenses the lens to a patient. This process is only one of many conversion approaches.

However the ordering of the heat management system is accomplished, whether by that of an optical shop, optical dispensary, wholesale optical laboratory, internet, lens manufacturer or wearer the following method of adding the heat management system is followed. The addition of the heat management system to that of finished (both surfaces comprising the right curvature) photochromic eyeglass lenses comprising the optical power of the wearer is described herein as "converting conventional photochromic eyewear to that of electronic photochromic eyewear" or "converting a photochromic lens to that of an electronic photochromic lens".

Once the lens comprising a photochromic agent (known as a photochromic lens) is edged in certain cases it is coated with a scratch resistant coating in other cases the edged lens is not hard coated. In either event the photochromic lens after being edged to the proper shape required for the frame is prepared to receive the transparent heat management system. In certain cases, but not all, the photochromic lens is cleaned carefully by a known cleaning processes in the lens manufacturing industry. In certain cases, but not all, a layer of SiO2 is applied (by deposition) on the outer surface once the photochromic lens is cleaned.

The transparent heat management system which comprises the heating element is applied on the top outer front surface of the lens comprising the optical power required by the wearer. In the case of the twelfth embodiment either an ITO or a conductive polymer coating is applied by deposition in the form of a resistive conductive layer that with the application of electricity causes the layer to heat up. The heating element can be in the shape such as by way of example only, that of an oven like burner or a coating which covers the entire surface of the lens closest to that of the photochromic agent. Following the application of the heating element a hard scratch resistant coating is applied by dip coating. In certain cases, but not all, an antireflective coating is then applied on top of the hard scratch resistant coating.

It should be pointed out that when converting a photochromic lens or lens blank which has been finished to that of the wearer's optical prescription (having the required optical power for the wearer) and has a scratch resistant coating already applied on its outer surface in certain embodiments the heat management system (heating element) is applied directly on top of the surface comprising the scratch resistant coating provided the outer surface of the lens is cleaned carefully prior to the application of the heat management system. In some cases the external surface of the scratch resistant coating is chemically etched in other cases the surface is prepared by way of an ion treatment. The chemical etching and/or ion treatment serves to promote the bonding of the heat management system to the external surface to which it is applied. In certain other embodiments when the outer most coating of the photochromic lens or lens blank being converted to that of a photochromic comprising a heat management system is that of an anti-reflection coating, in most, but not all cases the anti-reflection coating is stripped off prior to the heating element being applied. Such stripping can be accomplished by way of a chemical bath.

Once the edged lens has had the heating element applied, has received a scratch resistant coating covering its outer surface, and in certain, but not all cases may receive an anti-reflection coating the edged lens is then prepared for being electrically connected to the energy source. The electrical connection can be by way of connective electrodes which penetrate its outer surface and which connect with the positive and negative poles (terminals) of the heating element or by way of connective electrodes which connect the positive and negative poles thru the peripheral edge of the edged lens. In certain, but not all, cases the connection can be by way of example only, by way of the use of a compressible electrical contact such as, by way of example only, that of conductive rubber when conductive rubber is used two pieces are used one of which makes connection with the positive and negative pole (terminals) of the heat management system. In other cases an electrical conductive spring loaded pins are used either on the peripheral edge of the edged lens or on the surface of the edged lens. In other cases electrical conductive tabs are provided on the peripheral edge or surface of the lens which connects to the positive and negative poles (or terminals) of the heating element and the conductive electrodes are connected to the electrical tabs. And in still other cases a conductive polymer or a conductive epoxy is utilized.

Once the electrical connection is made the edged photochromic lens which comprises a heating element is then mounted into the eyeglass frame that was selected by the wearer. In certain cases this frame would be that of a frame comprising electronics (see FIG. 12, for example) (known as an electronic frame). In other cases the frame is that of a non-electronic frame whereby an external electrical module or adapter (see FIGS. 14 and 15, for example) has been applied to the inside of one or both temples of the eyeglass frames. In certain embodiments one external module can work for both photochromic lenses comprising a heat management system. In other embodiments one external module is utilized for each of the two photochromic lenses housed in the non-electronic eyeglass frame. When one external module is utilized to electrically connect to both photochromic lenses the electrical leads must be applied or affixed to the non-electronic frame such to provide for the appropriate electrically connectivity.

Figure 12:
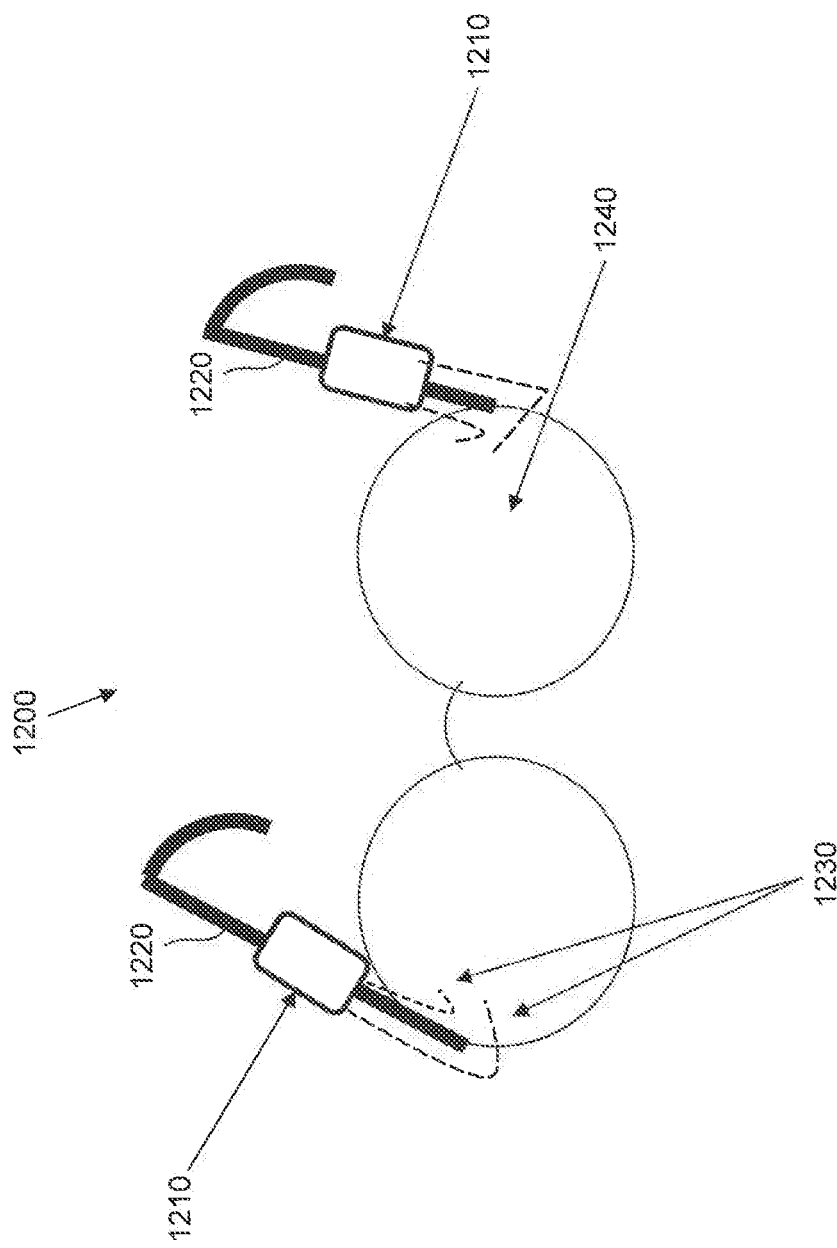
FIG. 12 shows photochromatic eyewear 1200 with a heat management system.

FIG. 12 shows photochromatic eyewear 1200 with a heat management system. Electrical components 1210 are illustrated as housed within temples 1220 of the eyewear. Electrical connections 1230 electrically connect the electrical components 1220 to lenses 1240. Electrical components 1210 are illustrated as housed within both temples of the eyewear. But all electrical components 1210 could be housed in a single location, and electrical connections made from that location to both lenses. Lenses 1240 include at least one photochromatic layer and at least one heating layer, and may have any of the specific structures described herein or a related structure.

Figure 13:
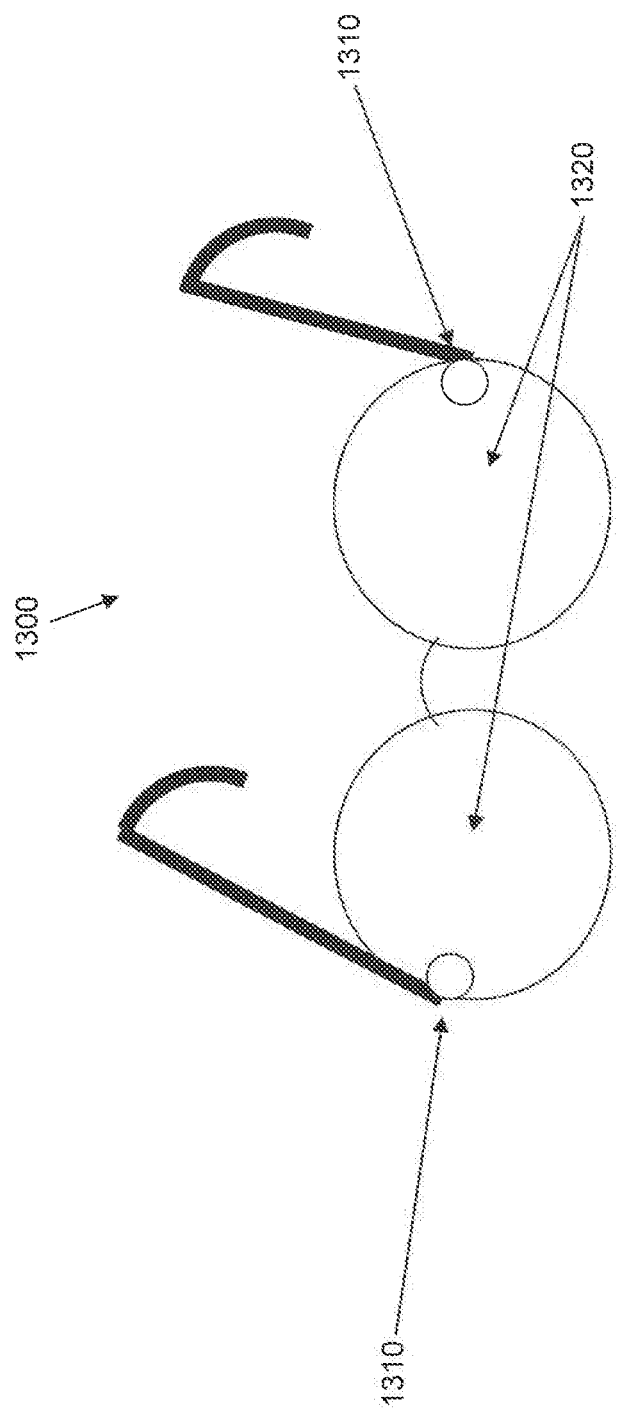
FIG. 13 shows photochromatic eyewear 1300 with a heat management system.

FIG. 13 shows photochromatic eyewear 1300 with a heat management system. Electrical components 1310 are illustrated as housed within photochromatic lenses 1320, at the periphery. In this embodiment, the eyeglass frame need not include electrical components. Lenses 1320 include at least one photochromatic layer and at least one heating layer, and may have any of the specific structures described herein or a related structure.

Figure 14:
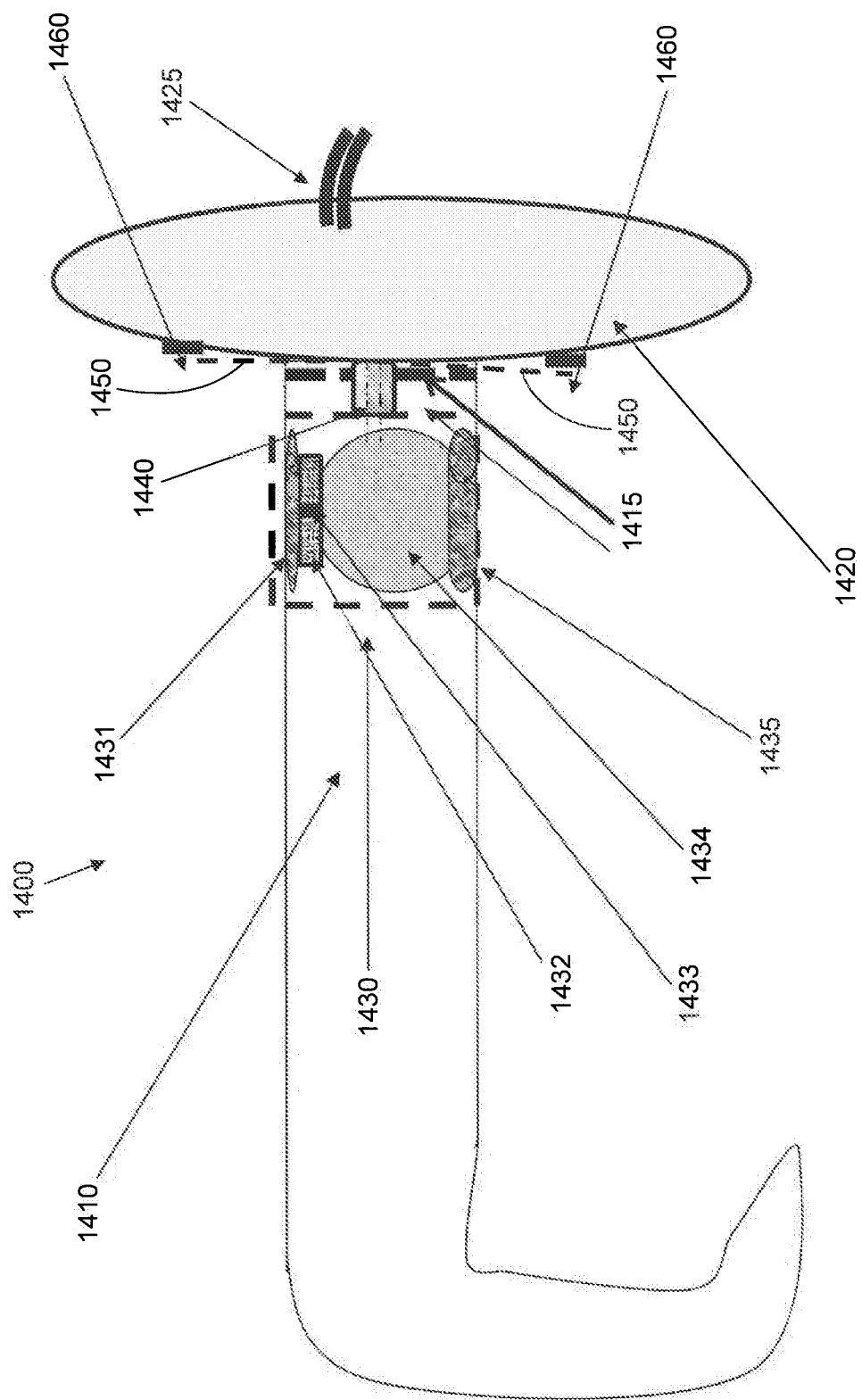
FIG. 14 shows one way that electronics may be housed in eyewear and electrically connected to a photochromatic lens with a heating element.

FIG. 14 shows one way that electronics may be housed in eyewear and electrically connected to a photochromatic lens with a heating element. Eyewear 1400 includes a temple 1410. Temple 1410 is connected to photochromatic lens 1420 by a temple hinge 1415. Nose bridge 1425 connects lens 1420 to another lens (not shown). The inside of a left temple 1410 and the back of a lens 1420 are illustrated. Electronics are housed in a self-contained module 1430, which may be external to temple 1410, or embedded in temple 1410. Module 1430 houses a controller 1432. Controller 1432 is electrically connected to a photosensor 1431, a switch 1433, a battery 1434 and an inductive coil 1435. Depending upon input from photosensor 1431 and switch 1433, controller 1432 provides power to heaters in lens 1420. Module 1430 is electrically connected to lens 1420 by an electronic flex cable 1440 having at least two leads, insulated leads 1450, and conductive rubber 1460.

Figure 15:
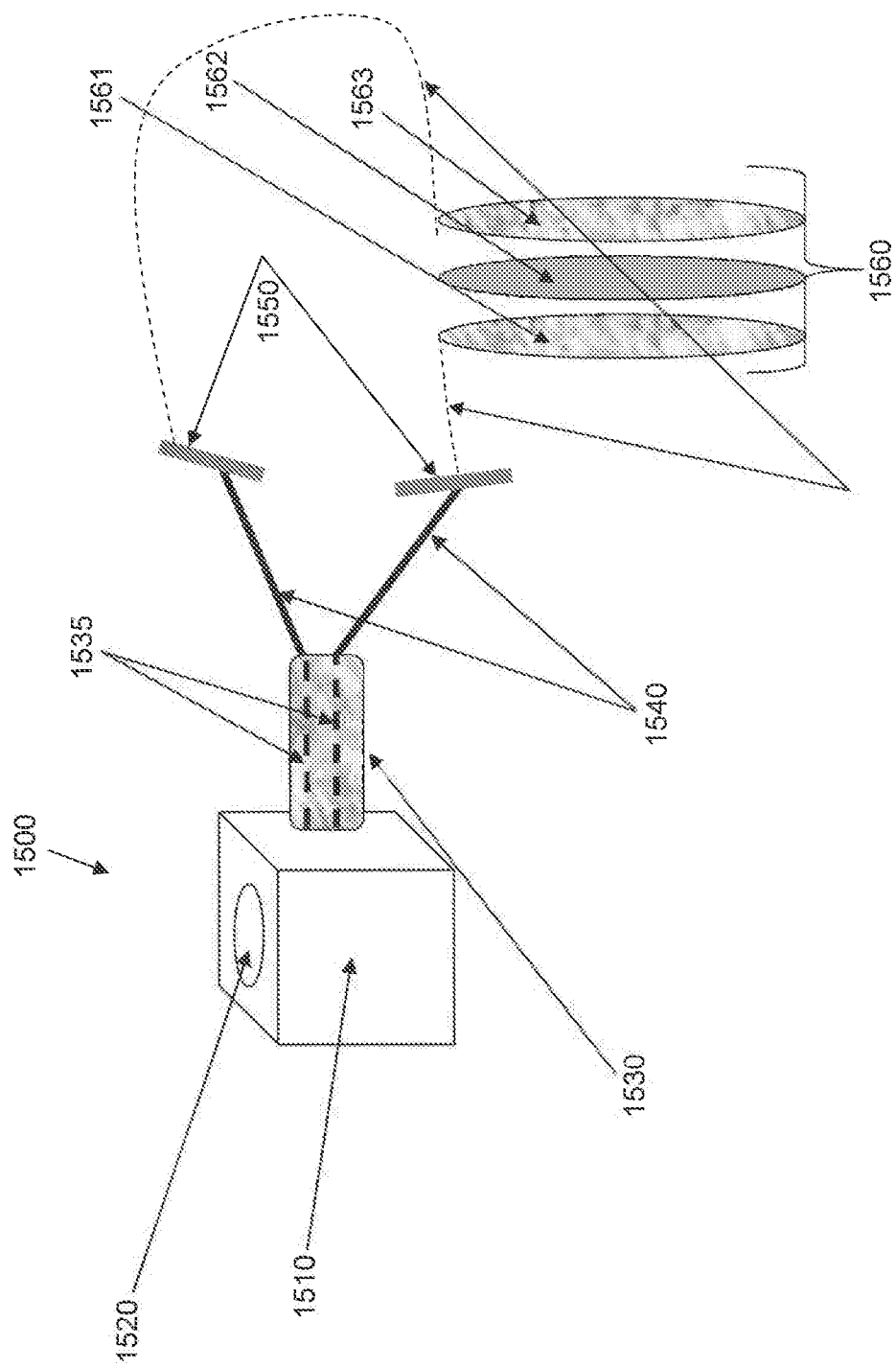
FIG. 15 illustrates detail for the connection of an electronics module to a photochromatic lens having a heating element.

FIG. 15 illustrates detail for the connection of an electronics module to a photochromatic lens having a heating element. Module 1500 includes a sealed housing 1510. Housing 1510 has a transparent window 120 to allow light to reach a sensor inside housing 1510. Housing 1510 may house any appropriate combination of electronics. One appropriate combination of electronics is illustrated in FIG. 14. An electronic flex cable 1530 having two leads 1535 carries a signal from housing 1510 to flexible insulated leads 1540. Leads 1540 are electrically connected to conductive rubber 1550, which is in turn electrically connected to an edge of a transparent electrode layer, as illustrated by lines 1590. Heating element 1559 of FIG. 15 includes a first electrode 1561, a photochromic layer 1562 and a second electrode 1563. When energized, a voltage is applied across photochromic layer 1562.

FIG. 27, which is drawn to scale, shows a photograph of a temple 2710 having an embedded electronics module 2720. A dime 2730 is also shown for scale.

FIG. 28 shows a top view of a portion of eyeglasses having a clip on electronics module. Eyeglasses 2810 include a temple 2850 and a lens 2860. Clip-on module 2820 is clipped on to temple 2820. An electrical connection is provided between module 2820 and lens 2860 by a flexible cable 2830 and electronic leads 2840.

FIG. 29 shows a module adapted for use with regular eyeglasses having non-electronic frames, to provide electronics capability to eyeglasses. Module 2910 houses electronics, and may be attached to an eyeglass frame. Flexible cable 2920 and electronic leads 2930 may be used to carry signals and/or power from the module to lenses in the frame.

A first method as taught by way of embodiment twelve is as follows:

Step #1: Providing a photochromic lens comprising the required optical power of a wearer Step #2: Edging the photochromic lens into the shape of an eyeglass frame selected by a wearer Step #3: Applying a heat management system comprising a heating element to the edged lens Step #4: Applying a scratch resistant coating on the outer surface of the heating element Step #5: Applying in certain, but not all cases an anti-reflective coating Step #6: Electrically connecting the positive pole and negative pole of the heating element to an energy source FIG. 31 is a flowchart of the first method of embodiment 12. Steps 1-6 are illustrated in boxes 3110, 3120, 3130, 3140, 3150 and 3160.

A second method of embodiment twelve is as follows:

Step #1: Providing a photochromic lens comprising the required optical power of a wearer Step #2: Applying a heat management system comprising a heating element to a non-edged, but finished lens Step #3: Applying a scratch resistant coating on the outer surface of the heating element Step #4: Edging the photochromic lens into the shape of an eyeglass frame selected by a wearer Step #5: Applying in certain, but not all cases an anti-reflective coating Step #6: Electrically connecting the positive pole and negative pole of the heating element to an energy source FIG. 32 is a flowchart of the second method of embodiment 12. Steps 1-6 are illustrated in boxes 3210, 3220, 3230, 3240, 3250 and 3260.

A third method as taught by way of embodiment twelve is as follows:

Step #1: Providing a photochromic lens comprising the required optical power of a wearer Step #2: Applying a heat management system comprising a heating element to a non-edged, but finished lens Step #3: Applying a scratch resistant coating on the outer surface of the heating element Step #4: Applying in certain, but not all cases an anti-reflective coating Step #5: Edging the photochromic lens into the shape of an eyeglass frame selected by a wearer Step #6: Electrically connecting the positive pole and negative pole of the heating element to an energy source FIG. 33 is a flowchart of the third method of embodiment 12. Steps 1-6 are illustrated in boxes 3310, 3320, 3330, 3340, 3350 and 3360.

A fourth method as taught by way of embodiment twelve is as follows:

Step #1: Providing a photochromic lens comprising the required optical power of a wearer Step #2: Edging the photochromic lens into the shape of an eyeglass frame selected by a wearer Step #3: Cleaning the photochromic lens comprising the required optical power of a wearer Step #4: Applying a heat management system comprising a heating element to the edged lens Step #5: Applying a scratch resistant coating on the outer surface of the heating element Step #6: Applying in certain, but not all cases an anti-reflective coating Step #7: Electrically connecting the positive pole and negative pole of the heating element to an energy source FIG. 34 is a flowchart of the fourth method of embodiment 12. Steps 1-7 are illustrated in boxes 3410, 3420, 3430, 3440, 3450, 3460 and 3470.

A fifth method as taught by way of embodiment twelve is as follows:

Step #1: Providing a photochromic lens comprising the required optical power of a wearer Step #2: Step #2: Cleaning the photochromic lens comprising the required optical power of a wearer Step #3: Applying a heat management system comprising a heating element to a non-edged, but finished lens Step #4: Applying a scratch resistant coating on the outer surface of the heating element Step #5: Edging the photochromic lens into the shape of an eyeglass frame selected by a wearer Step #6: Applying in certain, but not all cases an anti-reflective coating Step #7: Electrically connecting the positive pole and negative pole of the beating element to an energy source FIG. 35 is a flowchart of the fifth method of embodiment 12. Steps 1-7 are illustrated in boxes 3510, 3520, 3530, 3540, 3550, 3560 and 3570.

A sixth method as taught by way of embodiment twelve is as follows:

Step #1: Providing a photochromic lens comprising the required optical power of a wearer Step #2: Cleaning the photochromic lens comprising the required optical power of a wearer Step #3: Applying a heat management system comprising a heating element to a non-edged, but finished lens Step #4: Applying a scratch resistant coating on the outer surface of the heating element Step #5: Applying in certain, but not all cases an anti-reflective coating Step #6: Edging the photochromic lens into the shape of an eyeglass frame selected by a wearer Step #7: Electrically connecting the positive pole and negative pole of the heating element to an energy source FIG. 36 is a flowchart of the sixth method of embodiment 12. Steps 1-7 are illustrated in boxes 3610, 3620, 3630, 3640, 3650, 3660 and 3670.

A seventh method as taught by way of embodiment twelve is as follows:

Step #1: Providing a photochromic lens comprising the required optical power of a wearer Step #2: Edging the photochromic lens into the shape of an eyeglass frame selected by a wearer Step #3: Cleaning the photochromic lens comprising the required optical power of a wearer Step #4: Applying a layer of SiO2 onto the surface of the photochromic lens whereby the heating element is to be applied Step #5: Applying a heat management system comprising a heating element to the edged lens Step #6: Applying a scratch resistant coating on the outer surface of the heating element Step #7: Applying in certain, but not all cases an anti-reflective coating Step #8: Electrically connecting the positive pole and negative pole of the heating element to an energy source FIG. 37 is a flowchart of the seventh method of embodiment 12. Steps 1-8 are illustrated in boxes 3810, 3820, 3830, 3840, 3850, 3860, 3870 and 3880.

An eighth method as taught by way of embodiment twelve is as follows:

Step #1: Providing a photochromic lens comprising the required optical power of a wearer Step #2: Cleaning the photochromic lens comprising the required optical power of a wearer Step #3: Applying a layer of SiO2 onto the surface of the photochromic lens whereby the heating element is to be applied Step #4: Applying a heat management system comprising a heating element to a non-edged, but finished lens Step #5: Applying a scratch resistant coating on the outer surface of the heating element Step #6: Edging the photochromic lens into the shape of an eyeglass frame selected by a wearer Step #7: Applying in certain, but not all cases an anti-reflective coating Step #8: Electrically connecting the positive pole and negative pole of the heating element to an energy source FIG. 38 is a flowchart of the eighth method of embodiment 12. Steps 1-8 are illustrated in boxes 3810, 3820, 3830, 3840, 3850, 3860, 3870 and 3880.

A ninth method as taught by way of embodiment twelve is as follows:

Step #1: Providing a photochromic lens comprising the required optical power of a wearer Step #2: Cleaning the photochromic lens comprising the required optical power of a wearer Step #3: Applying a layer of SiO2 onto the surface of the photochromic lens whereby the heating element is to be applied Step #4: Applying a heat management system comprising a heating element to a non-edged, but finished lens Step #5: Applying a scratch resistant coating on the outer surface of the heating element Step #6: Applying in certain, but not all cases an anti-reflective coating Step #7: Edging the photochromic lens into the shape of an eyeglass frame selected by a wearer Step #8: Electrically connecting the positive pole and negative pole of the heating element to an energy source FIG. 39 is a flowchart of the ninth method of embodiment 12. Steps 1-8 are illustrated in boxes 3910, 3920, 3930, 3940, 3950, 3960, 3970 and 3980.

A tenth method as taught by way of embodiment twelve is as follows:

Step #1: Providing a photochromic lens comprising the required optical power of a wearer Step #2: Edging the photochromic lens into the shape of an eyeglass frame selected by a wearer Step #3: Applying a layer of SiO2 onto the surface of the photochromic lens whereby the heating element is to be applied Step #4: Applying a heat management system comprising a heating element to the edged lens Step #5: Applying a scratch resistant coating on the outer surface of the heating element Step #6: Applying in certain, but not all cases an anti-reflective coating Step #7: Electrically connecting the positive pole and negative pole of the heating element to an energy source FIG. 40 is a flowchart of the tenth method of embodiment 12. Steps 1-7 are illustrated in boxes 4010, 4020, 4030, 4040, 4050, 4060 and 4070.

An eleventh method as taught by way of embodiment twelve is as follows:

Step #1: Providing a photochromic lens comprising the required optical power of a wearer Step #2: Applying a layer of SiO2 onto the surface of the photochromic lens whereby the heating element is to be applied Step #3: Applying a heat management system comprising a heating element to a non-edged, but finished lens Step #4: Applying a scratch resistant coating on the outer surface of the heating element Step #5: Edging the photochromic lens into the shape of an eyeglass frame selected by a wearer Step #6: Applying in certain, but not all cases an anti-reflective coating Step #7: Electrically connecting the positive pole and negative pole of the heating element to an energy source FIG. 41 is a flowchart of the eleventh method of embodiment 12. Steps 1-7 are illustrated in boxes 4110, 4120, 4130, 4140, 4150, 4160 and 4170.

A twelfth method as taught by way of embodiment twelve is as follows:

Step #1: Providing a photochromic lens comprising the required optical power of a wearer Step #2: Applying a layer of SiO2 onto the surface of the photochromic lens whereby the heating element is to be applied Step #3: Applying a heat management system comprising a heating element to a non-edged, but finished lens Step #4: Applying a scratch resistant coating on the outer surface of the heating element Step #5: Applying in certain, but not all cases an anti-reflective coating Step #6: Edging the photochromic lens into the shape of an eyeglass frame selected by a wearer Step #7: Electrically connecting the positive pole and negative pole of the heating element to an energy source FIG. 42 is a flowchart of the twelfth method of embodiment 12. Steps 1-7 are illustrated in boxes 4210, 4220, 4230, 4240, 4250, 4260 and 4270.

For the twelve methods disclosed above for embodiment twelve, the steps should be performed in the order listed. Other orders may also be used in other embodiments.

The application of the heat management system can be provided by an optical laboratory on the site of the optical shop, a wholesale optical laboratory, or by way of an independent facility comprising the required deposition and electronics equipment.

It should be understood that the optic disclosed herein can be that of a finished lens blank or a semi-finished lens blank. A lens can be that of a finished lens meaning processed or manufactured to the optical power required by the wearer. If that of a semi-finished lens blank the blank is surfaced and polished or free formed or digitally surfaced to achieve the final optical power or required prescription. Following this it is edged and mounted into an eyeglass or eyewear frame comprising the required electronics to enable the heating element. When the electronics are located outside of the lens other than the heating element the electronics housed within the eyeglass from must be electrically connected to that of the heating element which is located within the lens or lens blank. In certain other cases the electronics can be all incorporated within the optic, lens or lens blank. The lens blank can be processed into any optical prescription required for a wearer, including that of plano optical power.

The optic or optical substrate suitable for use as the optical substrate of photochromic articles include, by way of example only, (a) can include any of the plastic optical substrates known in the art and can include non-plastic substrates such as glass. Suitable examples of plastic optical substrates, can include by example only, MR7, MR8, MR10, products which are trademarked by Mitsui Corporation, polyol(allyl carbonate) monomers, e.g., allyl diglycol carbonates such as diethylene glycol bis(allyl carbonate), which monomer is sold under the trademark CR®-39 by PPG Industries, Inc; polyurea-polyurethane (polyurea urethane) polymers, which are prepared, for example, by the reaction of an isocyanate-functional polyurethane prepolymer and a diamine curing agent, a composition for one such polymer being sold under the trademark TRIVEX® by PPG Industries, Inc; polyol(meth)acryloyl terminated carbonate monomer; diethylene glycol dimethacrylate monomers; ethoxylated phenol methacrylate monomers; diisopropenyl benzene monomers; ethoxylated trimethylol propane triacrylate monomers; ethylene glycol bismethacrylate monomers; poly(ethylene glycol) bismethacrylate monomers; urethane acrylate monomers; poly(ethoxylated bisphenol A dimethacrylate); poly(vinyl acetate); poly(vinyl alcohol); poly(vinyl chloride); poly(vinylidene chloride); polyethylene; polypropylene; polyurethanes; polythiourethanes; thermoplastic polycarbonates, such as the carbonate-linked resin derived from bisphenol A and phosgene, one such material being sold under the trademark LEXAN; polyesters, such as the material sold under the trademark MYLAR; poly(ethylene terephthalate); polyvinyl butyral; poly(methyl methacrylate), such as the material sold under the trademark PLEXIGLAS, and polymers prepared by reacting polyfunctional isocyanates with polythiols or polyepisulfide monomers, either homopolymerized or co- and/or terpolymerized with polythiols, polyisocyanates, polyisothiocyanates and optionally ethylenically unsaturated monomers or halogenated aromatic-containing vinyl monomers. Also contemplated are copolymers of such monomers and blends of the described polymers and copolymers with other polymers, e.g., to form interpenetrating network products.

The photochromic materials used in the optical articles of embodiments can be appended to the optical substrate by imbibition as discussed above. In addition the photochromic agent can be micro encapsulated within a liquid, such as by way of example only an oil, and surrounded by an outer polymer shell. Alternatively, the photochromic materials can be applied to the optical substrate as a coating composition to form an at least partial photochromic coating on the surface of the optical substrate. Non-limiting examples of conventional photochromic coatings include coatings comprising any of the conventional photochromic compounds that are discussed in detail above. For example, although not limiting herein, the photochromic coatings can be photochromic polyurethane coatings, such as those described in U.S. Pat. No. 6,187,444; photochromic aminoplast resin coatings, such as those described in U.S. Pat. Nos. 4,756,973, 6,432,544 and 6,506,488; photochromic polysilane coatings, such as those described in U.S. Pat. No. 4,556,605; photochromic poly(meth)acrylate coatings, such as those described in U.S. Pat. Nos. 6,602,603, 6,150,430 and 6,025,026, and WIPO Publication WO 01/02449; polyanhydride photochromic coatings, such as those described in U.S. Pat. No. 6,436,525; photochromic polyacrylamide coatings such as those described in U.S. Pat. No. 6,060,001; photochromic epoxy resin coatings, such as those described in U.S. Pat. Nos. 4,756,973 and 6,268,055; and photochromic poly(urea-urethane) coatings, such as those described in U.S. Pat. No. 6,531,076. The specifications of the aforementioned U.S. Patents and international publications are hereby specifically incorporated by reference herein.

It should be understood that with various embodiments disclosed herein, the photochromic agent can be that of any photochromic agent or agents. These agents and their chemical and material make up are well known and described within the literature. Such photochromic agents are those, by way of example only, a photochromic agent may be any photochromic compound known to those of ordinary skill in the art. The term, "photochromic agent," is given its ordinary meaning in the art and refers to any compound which exhibits a reversible change of color upon exposure to light. In some cases, the light is ultraviolet light and or long wavelength blue light. A photochromic agent may include the following classes of materials: chromenes (e.g., naphthopyrans, 30 benzopyrans, indenonaphthopyrans, phenanthropyrans), spiropyrans (e.g., spiro(benzindoline) naphthopyrans, spiro(indoline) benzopyrans, spiro(indoline) naphthopyrans, spiro(indoline) quinopyrans, spiro(indoline) pyrans, oxazines (e.g., spiro(indoline) naphthoxazines, spiro (indoline) pyridobenzoxazines, spiro (benzindoline) pyridobenzoxazines, spiro (benzindoline) naphthoxazines, spiro (indoline benzoxazines), mercury dithizonates, fulgides, fulgimides, or the like, or combinations thereof. In a particular embodiment, the photochromic agent is 6'-(2,3dihydro-1H-indole-1-yl)-1,3-dihydro-3,3-dimethy 1-I-propyl-spiro[2H-indole-2,3'-(3H)naphtha (2,1-b)(1,4) oxazine, a spiro-naphthoxazine.

As used herein, a "photochromic amount" means an amount of a photochromic agent that is at least sufficient to produce a photochromic effect discernible to the naked eye upon activation. The concentration of photochromic agent in the polymerizable mixture may be selected based on a number of considerations such as the photochromic efficiency of the photochromic compound, the solubility of the photochromic compound (e.g., in the polymerizable material, the thickness of the material or article (e.g., lens), and the desired darkness of the material or article (e.g., lens) when exposed to light. Typically, the more photochromic agent incorporated into an article, the greater the color intensity is up to a certain limit. Generally, there may be a point after which the addition of more photochromic agent does not have a noticeable effect. The polymerizable mixture or article may include more than one photochromic agent. In addition, the concentration of the photochromic agent in the article or material may be varied in different locations of the article, as described herein. Finally, it is possible in some embodiments to provide different photochromic agents having different spectra. This may allow for altering the color of the final emPower! finished lenses in addition to speeding up the darkening and lightening effects.

The photochromic agent can be found within a layer, layers, close or adjacent to an optic or embedded within the optic. The layer, layers, or optic that comprises the photochromic agent can be fabricated with appropriate TG (glass transition temperature or material softening point) and material that provides the optimum or desired sensitivity to heat thus providing the optimum performance. Materials having various TGs are known within the industry and taught in the literature. Embodiments contemplate photochromic polymer matrix TGs (of the photochromic layer or optic) within the range of 30 C to 140 C, preferably 50 C to 100 C. This is preferred, as not only is it preferred to provide the heat to alter in a positive manner the desired photochromic performance, it is preferred to remove the heat once the desired photochromic performance is reached so to maintain the level of photochromic activation or deactivation at a level desired. By way of example only, upon heating to a lightened tint or cleared state indoors the heating element is turned off to save the battery or electrical power. When going outdoors should the heater be used at first it is preferred that the heating element does not heat the matrix to a point whereby bleaching occurs.

This is definitely the case when going from inside (indoors) to outside (outdoors) and is less the case when going from outside to inside. By turning on the heating element or member when going from inside to outside the darkening of the photochromic agent and/or optic is speeded up and maintains the peak darkness assuming the heating element is turned off soon after or right before this peak darkness being achieved. In most inside environments the photochromic tint is desired to be removed as much as possible. Therefore when going from outside to inside once again the heating element or member is turned on but given the inside environment turning of the heating element or member is not so time sensitive. But as indicated above with embodiments when going from inside to outside in sunlight it is not only desirable to quickly switch to that of a darkened photochromic stated, but to maintain the level of the darkened photochromic state and even see this state become even more darkened. Thus in this outside environment the heating element is turned on, but then off after a certain level of darkened or light blockage is achieved the heating element is turned off so that the chemistry of the photochromic agent and/or material housing the photochromic agent can allow for the photochromic agent to then either stabilize its photochromic activity at this level or increase its photochromic activity or blockage from this level.

Embodiments disclosed herein act as that of an accelerator for the photochromic activity by way of example only, (becoming darker more quickly, maintaining a peak darkening for a longer period of time, lightening back up more quickly). This is achieved thru the combination of 1) the heating element, 2) the appropriate timing of turning on and off the heating element combined with 3) the appropriate photochromic chemistry and 4) the appropriate material TG housing the photochromic agent. One or more of a sensor, sensors, timer, timers, controller, controllers, help to enable the optimization of the photochromic optic for its intended use.

It is known the lower the TG of the material housing the photochromic agent the more quickly the lens will change both going from indoors to outdoors and vice versa. The problem is that the lower TG material in high outdoor heat will not retain its maximum peak darkness. Embodiments disclosed herein allows for the ability to provide a darkening and lightening effect to the lens or optic much more quickly than previously possible. Contrary to that of a low TG material housing the photochromic agent which bleaches out in a high temperature environment thus lowering the darkening effect, embodiments disclosed herein provide a proprietary way thru the application of the heating element to allow for the use of a higher TG material to quickly switch or change the darkening or lightening of the photochromic agent while preserving the peak maximum darkness in a high temperature outdoor environment.

This is a preferred aspect of the teachings disclosed herein. Present photochromic manufacturers are always working to find an acceptable balance of the polymer matrix TG of an article and the photochromic switching time indoors of the same article. Embodiments allow for using a TG higher than provided in commercially available products used indoor and outdoor such as by way of example only, eyeglass lenses. Present commercially available polymer matrix TGs comprising a photochromic agent or agents are in the 40 C to 80 C range. Embodiments disclosed herein allow for polymer matrix TGs of 80 C to 90 C and higher while providing a faster switching time outdoors and indoors. With these material TGs bleaching of the photochromic tint occurs at a higher temperature compared to that of present commercially available photochromic lenses. Thus they are less temperature sensitive and allow for darker and more long lasting tints at higher ambient temperatures.

By way of example only, should the TG of a existing photochromic material be of 50 C/122 F it may begin to bleach out at an internal matrix temperature (not outdoor ambient) of 40 C/104 F. Embodiments allow, by way of example only, for the use of a 80 C/176 F TG material thus beginning to bleach out at the higher internal matrix temperature of 70 C/158 F compared to that of the 40 C/104 F. For clarity it should be noted that when outdoors in sunlight even though the ambient outdoor temperature is (by way of example only) that of 95 F/35 C the internal polymer matrix temperature will become far in excess of 95 F/35 C. Once again the reason embodiments allow for using a matrix material comprising a higher TG than other commercially available and acceptable photochromic products is that the heating element provides the ability to heat the matrix material such to allow for photochromic bleaching and thus fast clearing of the photochromic tint indoors. This higher TG matrix combined with the heating element then allows for a darker and less temperature dependent photochromic tint outdoors and faster clearing indoors.

In certain embodiments utilizing a higher TG material the heating element is turned on briefly when going from indoors to outdoors. The heating element can be directed to be turned on by way of a controller in response to a sensor or sensors that senses, by way of example only one or more of, a change in the UV light level, the level of UV light, and/or visible light level, the level of ambient temperature, a change in the ambient temperature. The heating element heats the photochromic: layer in order to begin to soften the high TG matrix to increase the mobility of the photochromic agent or agents. In this embodiment, it is preferred that the heating does not proceed to a level whereby bleaching begins to occur. Thus the heater is carefully controlled to turn on for a defined period of time and then turn off, or to turn off after a thermo-sensor senses the photochromic layer has reached a certain temperature below its TG. The result of this temporary heating is to allow for the higher TG matrix to speed the darkening of the photochromic agent or agents. Once darkened the higher TG matrix will be far less temperature sensitive and therefore will maintain its darkness longer and at a higher outdoor temperature when compared to a lower TG matrix.

Upon re-entering indoors from outdoors the heating element is turned on once again, but this time to heat to a higher level and/or for a longer period of time and until the photochromic layer is heated near or at its softening point whereby the layer or optic is bleached to a mostly clear or lightened state. Once again a sensor or sensors, sense by way of example only, one or more of, a change in the UV light level, the level of UV light, and/or visible light level, the level of ambient temperature, a change in the ambient temperature can communicate with a controller to then turn on the heater when going from outdoors to indoors. Also the same sensor can turn the heater off once the lens or optic is bleached to a level acceptable for the consumer or wearer. The point at which the heater is turned off can also be controlled by way of example only, by one or more of a timer, UV sensor, Visible light sensor, thermo-sensor. In addition, the thermal polarized layer can also be thermally switched on and switched off by one or more of the same sensors, timer and/or controller. The thermal switch can be activated by the heating element and/or cooling element.

The following is a table showing the various TG ranges, darkening and clearing times of today's commercially available photochromic products.

| At Outdoor Temp 95 F/35 C. | Commercially Available | Embodiments Disclosed Herein |
|---|---|---|
| Material TG Range | 40 C-70 C. | Up to 120 C. |
| Outdoor Darkening time | 1 minute-2 minutes | 1 minute or less |
| Darkening Transmission | 25%-35% Transmission | 15%-25% Transmission |
| Indoor Clearing Time to 80% transmission or greater | 6 minutes- 15 minutes | 2 minutes or less* |
| Cooling element option | No | Yes |
| Heating element present | No | Yes |
| Tint Color of Grey or Brown | Yes | Yes |

*It should be pointed out that embodiments can speed the indoor time of clearing of the photochromic tint to that of less than 1 minute, even less than 30 seconds. The speed of clearing can be speeded up even more quickly depending upon the TG of the matrix and the heating element providing a higher temperature to the photochromic layer. Lower TG matrixes clear much faster than higher TG matrixes with the application of heat. Also by providing heating temperatures in excess of 60 C. will0 speed up the clearing of the photochromic tint much faster than that of, by way of example only a heating temperature of 50 C.

In certain embodiments, in addition to that of the higher TG matrix and heating element, a cooling element or layer is provided. This allows for maintaining the polymer matrix TG of such embodiments to remain at a temperature for a longer period of time that is below its bleaching point thus allowing for the photochromic article or lens to be darker and more temperature stable.

In certain uses or applications, such as by way of example only, wearing photochromic eyeglasses behind that of the windshield of a car or vehicle normally the photochromic activity or level of darkening of the eyeglasses is for all practical purposes very low, if any act all, due to the windshield of the vehicle filtering out ultra-violet light wavelengths. By utilizing embodiments and turning on the heating element such embodiments make the photochromic agent more sensitive and active to not only that of UV light, but also that of longer light wavelengths such as, by way of example only, long wavelength blue light that are not fully filtered out by the windshield of the car or vehicle. In addition when the thermally switchable polarizing element or layer is also provided the heating element can be used to thermally switch on the polarizing element or layer thus reducing reflected light. The thermally switchable polarizing element or layer can be used in combination with that of the photochromic layer or optic or without the photochromic layer or optic. In certain environments whereby the photochromic agent or agents cannot be properly activated or darkened the thermally switchable polarizing element provides comfort to one's eyes by way of the reduction of glare or reflected light. Heat can be provided to switch the thermally switchable polarizing element when not in sunlight or UV light by way of the heating element taught herein. When heat is required to be applied by the heating element for an extended period of time for use, by way of example only, behind that of the windshield of a car while the car's internal air conditioning system is active, some embodiments provide for plugging the electronic photochromic eyewear into, by way of example only, the cigarette lighter of a car. This allows for not draining the charge of the battery housed within the electronic photochromic eyewear. Therefore by a combination of turning on and off the heating element when wearing photochromic eyeglasses in a car or vehicle (behind the windshield) it is possible to significantly enhance the performance of the electronic photochromic eyeglasses.

In this embodiment an electric or electric mechanical switch is provided to switch the eyeglasses and/or controller from that of sensing and reacting to that of going from outside to inside or inside to outside to that of turning on the heating element when inside, by way of example only, behind a UV blocking windshield of a vehicle. The switch can be that of a manual switch, a touch switch, a capacitor switch, a photo-switch. For this specific use/application of wearing photochromic eyeglasses or eyewear behind that of a UV and/or long wavelength blue light filtering windshield the heating element is turned on and off more frequently, or left on longer than that of the embodiments involving going from inside to outside or outside to inside. This is done as heat must be applied for a longer period of time and in certain cases, but not all, in an alternating manner to maintain the appropriate sensitivity of the photochromic agent to long wave UV light wave lengths behind a UV filtering windshield and/or when applicable to switch on that of the thermally switchable polarizing element or layer. It should be understood that when discussed within this patent application whether or not the heat is applied for #1) a longer period of time or #2) in an alternating manner the heat being applied for either #1 or #2 can be in the form of a rapid burst of thermal energy or a series of bursts of thermal energy.

The controller is programmed to provide for directing this mechanism of action. In most but not all cases the controller taking communication from a sensor which is one of a thermo-sensor, photo-sensor, and UV sensor. The controller also can in certain cases control the timer; by way of example only, if the timer is used for cycling on and off over a continuous period of time or for a specified period of time, or if the timer is used for cycling on and off (on, off, on, off etc.) over a continuous period of time or for a specified period of time while taking into consideration the temperature of the optic's substrate material comprising the photochromic agent. The timer is used for cycling on and off over a continuous period of time or for a specified period of time while taking into consideration the light transmission level passing thru the optic etc. The timer may or may not communicate with the controller.

The mostly transparent heating element can be located within a layer, layers, or adjacent to the changeable tint element or agent. In a preferred embodiment the heating element is located on the side of the layer or optic comprising the photochromic agent closet to the eye of the user or farthest away from the incident UV light and long wavelength blue light. In another preferred embodiment two heating elements are used such that one is on each side of the layer or optic comprising the photochromic agent. In still another embodiment one heating element is located on the side of the layer or optic comprising the photochromic agent and closest to the incident UV and/or long wavelength blue light. It is known that an increase in temperature of 5 C can increase the rate of interconversion of the photochromic molecules by 25% to 80%, preferably 35%-65%. The heating element can provide thermal energy in the range of, by way of example only, 0.1 to 5.0 joules/minute with the preferred range being from 0.1 to 2.0 joules/minute, leading to a rise in temperature within the range of 1 C to 25 C, more preferably from 7 C to 10 C. For eyeglass applications 1.2 joules per lens have provided a 10 C increase in temperature. The heating element can be controlled by a microprocessor such to provide for a preprogrammed timed sequence of electrical bursts thus causing a sequence of thermal bursts of heat. The burst can be maintained for a defined period of time or can be sequenced to be that of a rapid series of short timed bursts. Embodiments also contemplate manual control of the heating element such that the wearer can turn on and off the heating element manually. When using a manual controlled heating element the heating element can once again be programmed to provide for a sequenced series of bursts or a constant burst that is maintained until turned off.

The heating element generally can increase the temperature of the layer, matrix or optic comprising the photochromic agent by a temperature of 1 C to 25 C. A 10 C increase in temperature above that of room ambient temperature of 70 F can have a significant effect in speeding the clearing of a photochromic lens like that of Transitions (manufactured by Transitions Optical). By way of example only, this is especially true when the outdoor ambient temperature is cool such as less than 70 F and even more pronounced in the winter time with an outdoor ambient temperature of 32 F or lower. In these outdoor temperature environments the photochromic article will with time take on the outdoor ambient temperature. This cooler temperature will then cause the photochromic article to take even longer to clear when coming indoors. Thus under these temperature conditions the heating element has a profound effect on speeding the clearing or lightening of the photochromic tint when coming indoors.

The controller can be located within the optic, on the surface of the optic, or external to the optic. The photo-sensor or detector senses a change in light transmission such to turn on the heating element when first going from inside to outside or from outside to inside. The controller can turn off the heater when the temperature rise of the layer or optic comprising the photochromic agent rises by that of 1 C to 25 degrees C. When going from in doors to outdoors the controller can turn off the heater when the sensor senses that the light transmission falls below 50% light transmission, when going from outside to inside the controller can turn off the heating element when sensor senses the light transmission increases above 80% light transmission. In certain embodiments a UV sensor is also provided such to sense a level of UV light and thereby communicate to the controller such that the controller will turn on and off the heating element. The use of a long wave length UV and blue light sensor (380 to 480 nanometers) is extremely helpful when going from indoors to outdoors and from outside to inside. In most, but not all cases, the sensor communicates (directly or indirectly) to the controller when one of UV light, long wavelength blue light transmission changes within the range of 5% to 30%. When a sensor is used the UV sensor is usually, but not always, located on the side of the photochromic agent located closest to the incident UV and long wave length blue light and furthest away from the eye of the user.

The timer can be part of the controller or separate to the controller. When separate to the controller the timer can be located within the optic, on the surface of the optic and external to the optic. It should be understood that the term timer can be that of any timing element, mechanism or software whether within the controller or outside of the controller. The timer can communicate to the controller to turn off the heating element after a time period of 1 millisecond to 5 minutes once a thermo-sensor senses a temperature rise of the layer or optic comprising a photochromic agent within the range of 1 C to 25 C. The timer can also provide for a rapid sequence or series of short bursts of thermal energy which each will peak at a temperature which will have the thermal effect desired.

The sensor can be located within the optic, on the surface of the optic, or external to the optic. The sensor can be that of a photo-sensor or photo-detector, a thermo-sensor, a UV light sensor, a long wavelength blue light sensor. In a preferred embodiment the photo-sensor or photo-detector is located behind the layer or optic comprising the photochromic agent. In another preferred embodiment a photo-sensor is provided facing up such to measure ambient light coming from above. This allows for measuring the degree or intensity of ambient light. In this case the photo-sensor can sense a difference between the intensity of indoor light and outdoor light as opposed to light coming thru the lens or optic comprising the photochromic agent or agents. By knowing thru sensing if the device is outdoors or indoors the controller will know when to activate the heater and heat management system. The photo-sensor can be that of a UV light sensor, and/or a visible light sensor. Multiple photo-sensors can also be used if needed.

When a thermo-sensor is used the thermo-sensor would sense the temperature level of one or more of the heating element, optic, photochromic layer or photochromic optic. Upon sensing a certain temperature has been achieved the controller can then turn on or off the heating element or member and/or increase or decrease the heat of the heating element. The thermo-sensor can be located on either side of the layer or optic comprising the photochromic agent. The thermo-sensor can be utilized in addition to that of a photo-sensor. In another preferred embodiment the thermo-sensor is located adjacent to that of the photochromic layer. The power source providing the electrical energy can be located within the optic, on the surface of the optic or external to the optic. The power source can be one or more of (by way of example only) that of a rechargeable battery, rechargeable batteries, non-rechargeable battery, non-rechargeable batteries, solar cell, solar cells, fuel cell, fuel cells, kinetic energy source, kinetic energy sources. Note: in certain embodiments, power source and/or electrical components are located within or on a component or components of the eyeglass frame, in other embodiments the power source is located within the eyeglass lens, and in still other embodiments the power source is located within both the eyeglass frame and the lens.

In one preferred embodiment the electronics needed to properly provide the energy, sensing, control and timing are all located within a module housed within the temple of the eyeglass frame. In another preferred embodiment the certain of the electronics are housed within the module housed within the temple of the eyeglass frame and certain of the electronics are located outside of the module either on or in the lens or on the surface of the eyeglass frame.

In still another preferred embodiment, that of FIGS. 14 and 15, a self contained external electronics module is affixed on to the inside temple of the eyeglass frame. The manner in which this can be affixed can be that of any means such as, by way of example only, magnetic, adhesive, Velcro, screw, mechanical pressure or force. In this embodiment the self contained electronic module contains all (or most) required electronics and provides a highly moisture resistant barrier to the outside environment. The self contained external electronics module also comprises that of a photo-sensor housed within the self contained module and located such to sense through a transparent, but moisture resistant sealed window also located as part of the self contained module for sensing the level of ambient light. The sensor can be that of a UV sensor and/or a visible light sensor.

The self contained external electronics module further comprises an insulated member that is flexible which protrudes from the self contained external module and comprises two electrical leads which also connect to the electronics within the external highly moisture resistant electronics module (directly or indirectly). The manner in which this flexible member (by way of example only, that of an insulated electronic flexible cable) enters or is connected to the self contained external module provides once again for a sealed moisture resistant connection. The two electrical leads protrude out of the end of the flexible member farther away from the self contained external electronics module. These two electrical leads then connect to the heating element which is contained within the electronic photochromic lens thus providing the required electrical power.

This preferred embodiment of FIGS. 14 and 15 allows for mounting the electronic photochromic lens in non-electronic eyeglass frames, meaning eyeglass frames that do not contain electronics. By affixing the self-contained external highly moisture resistant, salt and sweat resistant electronics module to the temple of an eyeglass frame having no electronics and/or electronic connectivity, this preferred embodiment provides the needed/required electrical power and electrical connectivity to the heating element that is located within the photochromic lens which is housed within a non-electronic eyeglass frame. This is accomplished by passing the hinge of the eyeglass frame with an insulated flexible member allowing for the eyeglass frame temple to be opened and closed while maintaining electrical connection to that of the photochromic lens. It should be pointed out that while FIG. 14 shows that of a rechargeable battery source, such a battery could be a non-rechargeable, or the power source (instead of a battery) could be that, by way of example only, a fuel cell and/or solar cell, or any combination of one or more of a rechargeable battery, non-rechargeable battery, fuel cell, solar cell, and kinetic energy source.

Embodiment Using Liquid Crystal Changeable Tint Element

By thermally controlling the polymer within the liquid crystal cell at, above, and below its TG the liquid crystal can be actively controlled such that the cell becomes a bi-stable cell from an electrical power requirement perspective and a multi-stable orientation cell from a liquid crystal orientation perspective. As used herein multi-stable orientation means controlling the liquid crystal such that upon achieving a certain orientation of the liquid crystal the liquid crystal can be actively frozen into position or released from that position. By way of example only, once the temperature of the polymer is at or above the TG of the polymer and an electrical potential is applied to a liquid crystal cell such to reorient the liquid crystal alignment or positioning by any amount the new alignment or position of the liquid crystal can be frozen by lowering the temperature of the polymer below its TG and later released by elevating the temperature of the polymer at or above its TG to further alter its alignment or positioning, or to re-establish its earlier position. Further once the liquid crystal is frozen the electrical potential can be removed (electrical power turned off) and the liquid crystal will remain in its frozen alignment or position.

Thus the attributes of the embodiment allows for a device to be made that is, by way of example only; being able to provide one of more of the following: #1) bi-stable (on & off), #2) multi-stable liquid crystal orientation, #3) selectively tune refractive index of liquid crystal, #4) selectively tuning birefringence, #5) make most, if not all, liquid crystal capable of becoming bi-stable, #6) electrical power savings, thus more power efficient, #7) capable of being shaped when the liquid crystal is frozen (below the TG of the polymer) without fear of the liquid crystal leaking out and destroying or compromising functionality, #8) ability to make a liquid crystal device having a plurality of different regions comprising liquid crystal each having a different desired liquid crystal alignment or positioning and doing this with or without walls between said regions, #9) providing a means for creating a refractive gradient, #10) providing a means for increasing the robustness stability of a memory device over a wider temperature range, #11) providing for increasing memory storage of each pixel while maintaining megahertz level or higher speed resulting in an increased band-with without unduly compromising switching speed or rate.

Embodiments disclosed herein allows for a liquid crystal cell or cells comprising a polymer, whereby the liquid crystal cell is bi-stable, whereby the bi-stability of the liquid crystal cell is controlled largely by controlling the temperature of the polymer such to be below, at, or above the TG of the polymer. These embodiments may further provide for thermally controlling the polymer within the liquid crystal cell at, above, and below its TG. This allows the liquid crystal to be actively controlled such that the cell becomes bi-stable cell from an electrical power perspective and a multi-stable cell from a liquid crystal orientation perspective. As used herein multi-stable means controlling the liquid crystal such that upon achieving a certain orientation of the liquid crystal the liquid crystal can be actively frozen into position or released from that position. By way of example only, once the temperature of the polymer is at or above the TG of the polymer and an electrical potential is applied to a liquid crystal cell such to reorient the liquid crystal alignment or positioning by any amount the new alignment or position of the liquid crystal can be frozen by lowering the temperature of the polymer below its TG and later released by elevating the temperature of the polymer at or above its TG to further alter its alignment or positioning, or to re-establish its earlier position. Further once the liquid crystal is frozen the electrical potential can be removed (electrical power turned off) and the liquid crystal will remain in its frozen alignment or position.

Depending upon the application and thus the type of liquid crystal used: by way of example only cholesteric or pneumatic, bi-stability is accomplished by way of the polymer stabilizing the liquid crystal in one orientation and/or alignment when below the TG of the polymer and in a different orientation and/or alignment when at or above the TG of the polymer. The term monomer stabilized liquid crystal as used herein can be that of a polymer stabilized liquid crystal.

The alignment is influenced greatly by the alignment layer or layers. By way of example only, in certain embodiments the electrical potential is applied when the temperature of the polymer which stabilizes the polymer stabilized liquid crystal is at or above the TG of the polymer. The electrical potential provides for a certain orientation and/or alignment of the liquid crystal. Once the temperature of the polymer which stabilizes the polymer stabilized liquid crystal falls below the TG of the polymer the electrical potential can be removed and the liquid crystal will be locked or frozen into the orientation and/or alignment as of the time the electrical potential was applied. Should a change in the orientation and/or alignment of the liquid crystal be desired the temperature of the polymer which stabilizes the polymer stabilized liquid crystal is elevated to be at or above the TG of the polymer. Once this temperature is reached the electrical potential can be reapplied to alter the orientation and/or alignment of the liquid crystal or it may not be applied (whichever is desired).

It should be pointed out that such an orientation and/or alignment of the liquid crystal affects the refractive index of the liquid crystal. Thus bi-stability can provide one or more of: a switch between an electrical potential and no electrical potential, urnming on and off electrical power to provide the electrical potential, altering the orientation and/or alignment of the liquid crystal between two states, altering the alignment of the liquid crystal between being in alignment and being not in alignment (being disorganized), altering the refractive index of the liquid crystal between two states, altering birefringence between two states, altering transmission of liquid passing through the polymer stabilized liquid crystal cell between two states, and a state whereby the liquid crystal is locked or frozen into one orientation and/or alignment versus that of a different state of when the liquid crystal can freely move.

Embodiments disclosed herein allow for depositing (by way of example only) #1) a monomer stabilized liquid crystal and/or #2) a polymer stabilized liquid crystal into an electrical cell to produce a polymer stabilized liquid crystal cell (See FIG. 43). In a preferred embodiment 3 electrodes are utilized two of which provide for creating an electrical potential in the Z axis and one which can create an electrical potential in the X axis. In another preferred embodiment 4 electrodes are utilized; two or which provide for creating an electrical potential in the Z axis and two of which can create an electrical potential in the Z axis. The purpose for using either 3 or 4 electrodes is so that the electrical potential can be created to align the liquid crystal molecules in one direction thus providing for a darkened color (less light transmission), then while maintaining the electrical potential along by example only, the Z axis then lower the temperature of the polymer below that of the TG of the polymer to freeze the liquid crystal alignment of the molecules. Once the temperature is below that of the TG of the polymer then remove the electrical potential. When it is desired to lighten the color (increased light transmission) then raise the temperature at or above the TG of the polymer and create an electrical potential along (by example) the X axis and once this next liquid crystal alignment of molecule occurs lower the temperature of the polymer below that of the TG of the polymer and then remove the electrical potential thus freezing the liquid crystal molecules such to provide for a lighten color (increased light transmission).

When depositing monomer stabilized liquid crystal within an electrical cell the monomer stabilized liquid crystal is cured, by example only; by light and/or heat causing the monomer to become a polymer. Following being cured the polymer stabilized liquid crystal cell can be thermally controlled, programmed and reprogrammed. When depositing a polymer stabilized liquid crystal in to an electrical cell the polymer stabilized liquid crystal is deposited at a temperature at or above the TG of the polymer used to stabilize the liquid crystal.

In either case the liquid crystal at first if free to move, orient and align upon first being deposited. In the case of the monomer stabilized liquid crystal, once the monomer becomes a polymer (following curing) and the polymer is of a temperature below its TG the liquid crystal becomes stabilized. And in the case of a polymer stabilized liquid crystal deposited at a temperature at or above the TG of the polymer once the temperature falls below the TG of the polymer the liquid crystal becomes stabilized. In most, but not all cases, an electrical potential is applied to align the liquid crystal molecules during the curing of the monomer. Additionally an electrical potential is applied to align the liquid crystal molecules during the period when the temperature of the polymer is at or above its TG. Generally, (but not always) an electrical potential is not applied when the monomer has been cured into a polymer, and also an electrical potential is generally not (but not always) applied when the temperature of the polymer is below that of its TG.

The polymer dispersed liquid crystal that is best utilized with this embodiment meets the following criteria:

Creation of a bi-stable state requires enough anchoring force between LC and polymer sufficient to suppress the phase transition of the LC in the vitrified phase The miscibility between the polymer and the LC has to be minimized in order to create small droplets (~5 microns)

The anchoring energy between the droplet surface has to be sufficient to maintain the droplet in the aligned state in the absence of a field when the polymer chain mobility is reduced.

The above can be accomplished by way of example only; using an amphiphilic polymer and a LC with groups capable of hydrogen bonding forming a micelle to encapsulate a LC droplet. Pluronic acids, PEG-phospholipid conjugates, PEG b-polyesters, PEG-b-poly amino acids.

If the temperature of the polymer is elevated by way of a thermal heater above the TG of the polymer which stabilizes the liquid crystal the liquid crystal is free to change its alignment or orientation within the cell. Once the temperature of the polymer provided in the polymer stabilized liquid crystal cell falls below its TG the liquid crystal becomes trapped as the polymer returns to a solidified state. This can be accomplished by way of example only, ambient cooling temperature or the use of a Peltier cooler.

Embodiments taught herein provides for the first time the ability to one or more of shape, edge, and cut into an optic or device comprising liquid crystal. This allows for being able to shape such a cell or device into any shape needed without the liquid crystal leaking out and the cell or device becoming cosmetically defective or functionally compromised so long as the polymer is maintained at a temperature below its TG. The shaping can take place by way of any electrical, mechanical or light means, such as by way of example only, a lathe, optical edger, grinder, polisher, and laser.

FIGS. 43 to 45 illustrate an embodiment using liquid crystal changeable tint element.

FIG. 43 shows a device incorporating a liquid crystal changeable tint element. Over a lens blank 4380, the following are disposed, in order: an SiOx layer 4370; a heating element 4360; a substrate layer 4350; a liquid crystal cell 4340; a substrate 4330; a hard coat 4320; and an antireflective coat 4310. SiOx layer 4370 acts as a sealant and/or hard coat, and other appropriate materials may also be used. This is true here, and elsewhere where SiOx or SiO2 is disclosed for use as a sealant and/or hardcoat. Heating element 4360 may have any of the variety of structures taught herein and variants thereof. Liquid crystal cells are well known. Liquid crystal cell 4340 includes various substructure, such as optional alignment layers, electrodes, and the liquid crystal itself. The electrodes of liquid crystal cell 4340 are preferably as illustrated in FIG. 44 or 45, and variants thereof. "Substrates" 4330 and 4350 are referred to as "substrates"

because they may serve as the structural elements upon which the liquid crystal cell is built.

FIG. 44 shows electrode configurations for liquid crystal cell 4340. A first electrode configuration 4400 and a second electrode configuration 4450 are disclosed.

First electrode configuration 4400 includes a first electrode structure 4410 and a second electrode structure 4420. Second electrode structure 4420 has two separate "E" shaped electrodes 4425. In the liquid crystal cell, first electrode structure 4410 and a second electrode structure 4420 are disposed parallel to each other, with a space in between for the liquid crystal (not shown). When a potential is applied between first electrode structure 4410 and second electrode structure 4420, the resulting electric field causes the liquid crystal to orient perpendicular to the plane of the electrode structures. When a potential is applied between "E" shaped electrodes 4425, the resulting electric field causes the liquid crystal to orient along the direction of the three lines of the "E," i.e., right to left in FIG. 44, and parallel to the plane of the electrode structures.

Second electrode configuration 4450 is similar to first electrode configuration 4400. Second electrode configuration includes first electrode structure 4460 and second electrode structure 4470, analogous to first electrode structure 4410 and second electrode structure 4420. Second electrode structure 4470 has two separate "E" shaped electrodes 4475, analogous to "E" shaped electrodes 4425. Second electrode configuration 4450 differs from first electrode configuration 4400 in that the "E" shaped electrodes are situated differently. Second electrode configuration operates in the same way as first electrode configuration 4400.

FIG. 45 shows electrode configurations for liquid crystal cell 4340. A third electrode configuration 4500 and a second electrode configuration 4550 are disclosed.

Third electrode configuration 4500 is similar to first electrode configuration 4400. Third electrode configuration includes first electrode structure 4510 and second electrode structure 4520, analogous to first electrode structure 4410 and second electrode structure 4410. Second electrode structure 4520 has two separate "E" shaped electrodes 4525, analogous to "E" shaped electrodes 4425. First electrode structure 4520 differs from first electrode structure 4420 in that first electrode structure 4520 also includes "E" shaped electrodes 4525. In configuration 4500 (and 4550), a potential may be applied in the same direction across electrode 4525, and across electrodes 4515, when it is desired to orient the liquid crystal sideways.

Fourth electrode configuration 4550 is analogous to third electrode configuration 4500. Fourth electrode configuration includes first electrode structure 4560 and second electrode structure 4570, analogous to first electrode structure 4510 and second electrode structure 4510. First electrode structure 4560 has two separate "E" shaped electrodes 4565, and second electrode structure 4570 each have two separate "E" shaped electrodes 4575, analogous first and second electrode structures 4510 and 4520. Fourth electrode configuration 4550 differs from third electrode configuration 4500 in that the "E" shaped electrodes are situated differently, but the two electrode configurations operate in a similar manner.

While specific geometries are illustrated in FIGS. 43-45, one of skill in the art will appreciate that other geometries may be used to similar effect. For example, an "E" shape is only one of several ways to achieve an electric filed parallel to the planes of the electrodes (left-to-right in the figures), and suitable variations should be readily apparent to one of skill in the art.

Embodiment Using Electrochromic Changeable Tint Element

The performance of electrochromic devices can be enhanced by utilizing embodiments disclosed herein. See FIG. 46. By using a transparent heater it is possible to cause a solid state thermoplastic polymer electrolyte to provide enhanced performance. This is can be accomplished by raising the temperature of the thermoplastic polymer to a temperature at or above the TG of the thermoplastic polymer. When the temperature of the polymer electrolyte is at or near the TG of the polymer the electrolyte will provide the device with increased switching speeds and increased electrical power efficiency (meaning it will take less electrical power to drive the device). Embodiments further provide for using a solid state polymer electrolyte which will not alter the color or light transmission of the device unless the temperature is at or above the TG of the polymer used. Thus when the temperature is below the TG of the solid state polymer electrolyte there is no change in color of light transmission and it remains frozen in color and/or light transmission such that electrical power can be removed, but when the temperature is elevated at or above the TG of the solid state polymer electrolyte it allows for a change in color and/or light transmission. Once the new desired color and/or light transmission occurs then the temperature of the solid state polymer electrolyte is lowered such that the color and/or light transmission is frozen and then the electrical power is removed.

FIG. 46 shows a solid state electrochromic device. The device includes an optic 4650, a transparent heater 4640, a first electrode 4630, a solid polymer electrolyte 4620, and a second electrode 4610. Other layers consistent with the disclosure herein may also be included.

The illustrations attached are not intended to be self-limiting. There are many other combinations of the location of the various layers which will also fall within the scope of embodiments. The optic may be hard coated before applying the heating element or member. Embodiments contemplate the use of one or more SiO2 layers. Embodiments contemplate the various layers and electrodes being put down thru means know and appropriate in the industry such as, by way of example only, deposition, sputtering, vacuum systems, spin, dip coating, in mold transfers, imbibing etc. Times, temperature ranges, TGs (glass transition temperatures or material softening points) provided within the spec are also not intended to be self-limiting. The term "transparent," for example as used in "transparent heater," is not meant to require 100% transparency. Rather, the entire device in its clear state should be at least 80% transparent, and preferably 85% transparent or 90% transparent, and most preferably 95% transparent. Any given layer, such as a transparent electrode, should be sufficiently transparent that these overall transparencies can be met. Commonly used transparent conductors, such as a layer of ITO deposited to a thickness commonly used in the industry for a transparent conductor, should be considered transparent. Embodiments further contemplate choosing the specific polymer for that of the polymer layer by way of the specific environmental temperature where the embodiment will be utilized and taking into account at least one of; the type of changeable tint element or agent and that of the TG of the polymer. The changeable tint element or agent can be by way of example only: photochromic, thermochromic, polymer dispersed dichroic liquid crystal, and electrochromic. The polymer layer can have a thickness of 1 micron to 1.5 millimeters. In most, but not all, embodiments the optical system is housed or affixed to eyewear that comprises the electronics. Furthermore it should be understood that while in the embodiments taught herein may use a photochromic changeable tint element or agent, embodiments should not be limited to that of a changeable tint element or agent that is photochromic. Further while most embodiments disclosed in the preceding teach a photochromic changeable tint layer or element, either a thermochromic, polymer dispersed dichroic liquid crystal element, or solid state electrochromic changeable tint layer or element could be substituted with of course having the required construction and the associated enabling electronics therewith. The construction of each of a; photochromic layer, thermochromic layer, liquid crystal cell, electrochromic device is known. The invention disclosed herein is not intended to limited to that of only ophthalmic lenses or ophthalmic optics. It is contemplated that any optic or device that transmits light can comprise the invention.

As used here, the term "comprising" is used to describe a list of elements that may also include other elements—the term describes an open ended list. A device "comprising" element A, element B and element C must include those elements, but may also include other elements not specifically recited. This usage of the word comprising is common and widespread in patent claims.

As used here, the terms "embodiment" and "invention" refers to examples of inventive activity. These terms are not intended to limit the scope of the overall invention disclosed herein. The various embodiments described herein may or may not have overlap. Nor is it intended that inventive disclosure necessarily be labeled as an "embodiment." Embodiments described herein may be combined in various permutations, as should be readily apparent to one of skill in the art.

What is claimed is:

1. An eyewear, comprising:
   a base ophthalmic lens;
   a photochromic changeable tint element disposed over or within the base ophthalmic lens; and
   a heat management system, the heat management system comprising:
      a transparent heating element adapted to heat the photochromic changeable tint element;
      a photo-sensor, configured to sense a change in ambient light or to sense a level of ambient light;
      a thermo-sensor;
      an energy source electrically connected to the transparent heating element; and
      a controller electrically connected to the photo-sensor and thermo-sensor, wherein the controller is configured to detect input from the photo-sensor and thermo-sensor, and to control the transparent heating element based upon input from the photo-sensor and thermo-sensor, and wherein the controller is configured to turn on the transparent heating element when a decrease of ambient light is detected using the photo-sensor and to turn off the transparent heating element after the photochromic changeable tint element is heated at a predefined temperature below the photochromic changeable tint element's glass transition temperature while bleaching based upon input from the thermo-sensor.

2. The eyewear of claim 1, wherein the photochromic changeable tint element's glass transition temperature is between 80° C. and 140° C.

3. The eyewear of claim 1, wherein the heating element provides a temperature rise between 1° C. and 25° C. to the photochromic changeable tint element.

4. The eyewear of claim 1, wherein the photochromic changeable tint element comprises a first photochromic layer and a second photochromic layer, wherein the first photochromic layer is closer to the eye of a user than the second photochromic layer.

5. The eyewear of claim 1, wherein the photochromic changeable tint element is solid state.

6. The eyewear of claim 1, wherein the photo-sensor is chosen from an ambient light intensity sensor, a visible light sensor, a UV sensor, a UV and blue light sensor working between the range of 380 nanometers and 480 nanometers, or any combination thereof.

7. The eyewear of claim 1, wherein the base ophthalmic lens is an electronic lens.

8. The eyewear of claim 1, wherein at least one of the photochromic changeable tint element and the heating element comprises a conductive polymer, or a conductive polymer further comprising conductive particles.

* * * * *